(12) United States Patent
Filepp et al.

(10) Patent No.: US 6,182,123 B1
(45) Date of Patent: Jan. 30, 2001

(54) INTERACTIVE COMPUTER NETWORK AND METHOD OF OPERATION

(75) Inventors: Robert Filepp, Springfield, NJ (US); Michael L. Gordon, Dobbs Ferry, NY (US); Alexander W. Bidwell, New York, NY (US); Francis C. Young, Pearl River, NY (US); Allan M. Wolf, Ridgefield, CT (US); Sam Meo, New York, NY (US); Duane Tiemann, Ossining, NY (US); Lawrence Abrahams, Hastings-on-Hudson, NY (US); Michael J. Silfen, Croton-on-Hudson, NY (US); Aldo R. Dalsass, Oakland, NJ (US); Florence M. Lee, Stamford, CT (US); Kenneth H. Appleman, White Plains, NY (US)

(73) Assignee: IBM Corp., Armonk, NY (US)

( * ) Notice: Under 35 U.S.C. 154(b), the term of this patent shall be extended for 0 days.

(21) Appl. No.: 08/933,488

(22) Filed: Sep. 18, 1997

Related U.S. Application Data

(63) Continuation of application No. 08/740,043, filed on Oct. 23, 1996, now Pat. No. 5,758,072, said application No. 08/740,043, filed on Oct. 23, 1996, is a division of application No. 08/158,026, filed on Nov. 26, 1993, now Pat. No. 5,594,910, said application No. 08/158,026, filed on Nov. 26, 1993, now Pat. No. 5,594,910, is a division of application No. 07/388,156, filed on Jul. 28, 1989, now Pat. No. 5,347,632, said application No. 07/388,156, filed on Jul. 28, 1989, now Pat. No. 5,347,632, is a continuation-in-part of application No. 07/328,790, filed on Mar. 23, 1989, now abandoned, said application No. 07/328,790, filed on Mar. 23, 1989, now abandoned, is a continuation-in-part of application No. 07/219,931, filed on Jul. 15, 1988, now abandoned.

(51) Int. Cl.[7] .................................................... G06F 13/00
(52) U.S. Cl. ............................................................ 709/217
(58) Field of Search ............................ 345/200.5, 200.51, 345/200.52, 200.33, 200.47, 200.48, 200.49, 712; 705/25, 26, 27; 707/104, 530, 540; 709/201, 203, 217, 218, 219

(56) References Cited

U.S. PATENT DOCUMENTS 4,186,438   1/1980   Benson et al. ..................... 364/200

(List continued on next page.)

FOREIGN PATENT DOCUMENTS 2 105 075   3/1983   (GB) .

OTHER PUBLICATIONS

Blasgen, M.W. et al., *System R: An Architectural Update*, IBM Research Report RJ2581, San Jose, Calif., Jul. 1979.

(List continued on next page.)

*Primary Examiner*—Moustafa M. Meky
(74) *Attorney, Agent, or Firm*—Morgan & Finnegan, LLP

(57) ABSTRACT

A distributed processing, interactive computer network and method of operation is described. The network is designed to provide very large numbers of simultaneous users access to large numbers of applications which feature interactive text/graphic sessions. The network includes one or more host computers having application data stores; a plurality of concentrator computers, also including application data stores, the concentrator computers being connected in groups of one of more to each of the host computers; and a plurality of reception system computers connected in groups of one or more to each of the concentrator computers, the reception system computers being arranged so that respective users can request interactive applications at the reception system computers. In accordance with the design, the reception system computers also include application data stores. The method for operating the network includes steps for generating the interactive text/graphic sessions from objects that include data and/or program instructions. Additionally, the method features steps for distributing objects among the data stores of the network computers, and, thereafter, permitting the reception system computer at which an application is requested to selectively collect objects required for the application from the network and the respective reception system so that the requested application may be presented at the reception system based on the objects collected. This operation decreases processing demand on the higher-level network elements, permitting them to function primarily as data supply and maintenance resources, thereby reducing network complexity, cost and response time.

6 Claims, 16 Drawing Sheets

U.S. PATENT DOCUMENTS

| | | | |
|---|---|---|---|
| 4,289,930 | 9/1981 | Connolly et al. | 179/2 TV |
| 4,359,631 | 11/1982 | Lockwood et al. | 235/381 |
| 4,514,815 | 4/1985 | Anderson | 700/215 |
| 4,558,413 | 12/1985 | Schmidt et al. | 707/203 |
| 4,575,679 | 3/1986 | Simon et al. | 178/4 |
| 4,630,234 | 12/1986 | Holly | 707/3 |
| 4,641,274 | 2/1987 | Swank | 707/531 |
| 4,658,093 | 4/1987 | Hellmann | 705/52 |
| 4,691,340 | 9/1987 | Maeda et al. | 379/96 |
| 4,714,996 | 12/1987 | Gladney | 707/203 |
| 4,748,561 | 5/1988 | Brown | 711/164 |
| 4,751,669 | 6/1988 | Sturgis et al. | 364/900 |
| 4,794,519 | 12/1988 | Koizumi et al. | 707/10 |
| 4,805,119 | 2/1989 | Maeda et al. | 364/518 |
| 4,805,134 | 2/1989 | Calo et al. | 364/900 |
| 4,827,399 | 5/1989 | Shibayama | 707/202 |
| 4,845,665 | 7/1989 | Heath et al. | 703/21 |
| 4,849,879 | 7/1989 | Chinnaswamy et al. | 706/45 |
| 4,858,114 | 8/1989 | Heath et al. | 709/100 |
| 4,866,611 | 9/1989 | Cree et al. | 708/112 |
| 4,891,503 | 1/1990 | Jewell | 235/380 |
| 4,897,782 | 1/1990 | Bennett et al. | 364/200 |
| 4,916,441 | 4/1990 | Gombrich | 340/712 |
| 4,949,300 | 8/1990 | Christenson et al. | 364/900 |
| 4,974,149 | 11/1990 | Valenti | 709/217 |
| 4,984,155 | 1/1991 | Geier et al. | 705/26 |
| 4,992,940 | 2/1991 | Dworkin | 705/26 |
| 5,019,963 | 5/1991 | Alderson et al. | 707/201 |
| 5,023,907 | 6/1991 | Johnson et al. | 710/200 |
| 5,043,919 | 8/1991 | Callaway et al. | 364/521 |
| 5,103,476 | 4/1992 | Waite et al. | 705/59 |
| 5,117,354 | 5/1992 | Long et al. | 705/27 |
| 5,138,712 | 8/1992 | Corbin | 713/200 |
| 5,151,989 | 9/1992 | Johnson et al. | 395/600 |
| 5,155,847 | 10/1992 | Kirouac et al. | 709/221 |
| 5,179,660 | 1/1993 | Devany et al. | 395/200 |
| 5,182,170 | 1/1993 | Marcus et al. | 264/497 |
| 5,283,861 | 2/1994 | Dangler et al. | 395/149 |
| 5,319,542 | 6/1994 | King, Jr. et al. | 364/401 |
| 5,761,649 | 6/1998 | Hill | 705/27 |

OTHER PUBLICATIONS

Lindsay, B.G., *Single and Multi–Site Recovery Facilities*. In *Distributed Data Bases* (Draffan and Poole, Eds.), Cambridge Univ. Press, Cambridge, U.K. (1980), chapter 10, pp. 247–284. Also available as IBM Research Report RJ2517, San Jose, Calif., Jul. 1979.

Lindsay, B.G. *Object Naming and Catalog Management for a Distributed Database Manager*. In Proc. Second International Conference on Distributed Computing Systems (Paris, Apr. 8–10, 1981), pp. 31–40. Also available as IBM Research Report RJ2914, San Jose, Calif., Aug. 1980.

Gray, J., McJones, P., Blasgen, M., Lindsay, B., Lorie, R., Price, T. Putzolu, F., and Traicer, I. *The Recovery Manager of the System R Database Manager*. ACM Comput. Surv. 13.2 (Jun. 1981), 223–242.

Williams, R., Daniels, D., Haas, L., Lopis, G., Lindsay, B., NG, P., Obermarck, R., Selinger, P., Walker, A., Wilms, P., and Yost,, R. R*: *An Overview of the Architecture*. In Improving Usability and Responsiveness (P. Scheurman, Ed.), Academic Press, New York, pp. 1–22. Also available as IBM Research Report RJ3325, San Jose, Calif., Dec. 1981.

Daniels, D., Selinger, P., Haas, L., Lindsay, B., Mohan, C., Walker, A. and Wilms, P. *An Introduction to Distributed Query Compilation in R\**. In Proc. Second International Symposium on Distributed Databases (Berlin, Sep. 1–3, 1982), pp. 291–309. Also available as IBM Research Report RJ3497, San Jose, Calif., Jun. 1982.

Mohan, C. and Lindsay, B. *Efficient Commit Protocols for the Tree of Processes Model of Distributed Transactions*. In Proc. Second SIGACT–SIGOPS Symposium on Principles of Distributed Computing (Montreal, Canada, Aug. 17–19, 1983), ACM, New York, pp. 76–88.

Selinger, P., Daniels, D., Haas, L. et al. *Site Autonomy Issues in R\*: A Distributed Database Management System*. Information Sciences, vol. 29, pp. 249–257 (1983).

Gecsei, J., *The Architecture of Videotex Systems*, Chs. 1–4, 6, 9–12, 14, Prentice–Hall, Inc., Mar. 25, 1983.

Lindsay, B., Haas, L., Mohan, C., Wilms, P. and Yost, R. *Computation and Communication in R\*: A Distributed Database Manager*. In ACM Transactions on Computer Systems, vol. 2, No. 1, Feb. 1984, pp. 24–38.

Lindsay, B. *A Retrospective of R\*: A Distributed Database Management System*. In Proceedings of the IEEE, vol. 75, No. 5, May 1987, pp. 668–673.

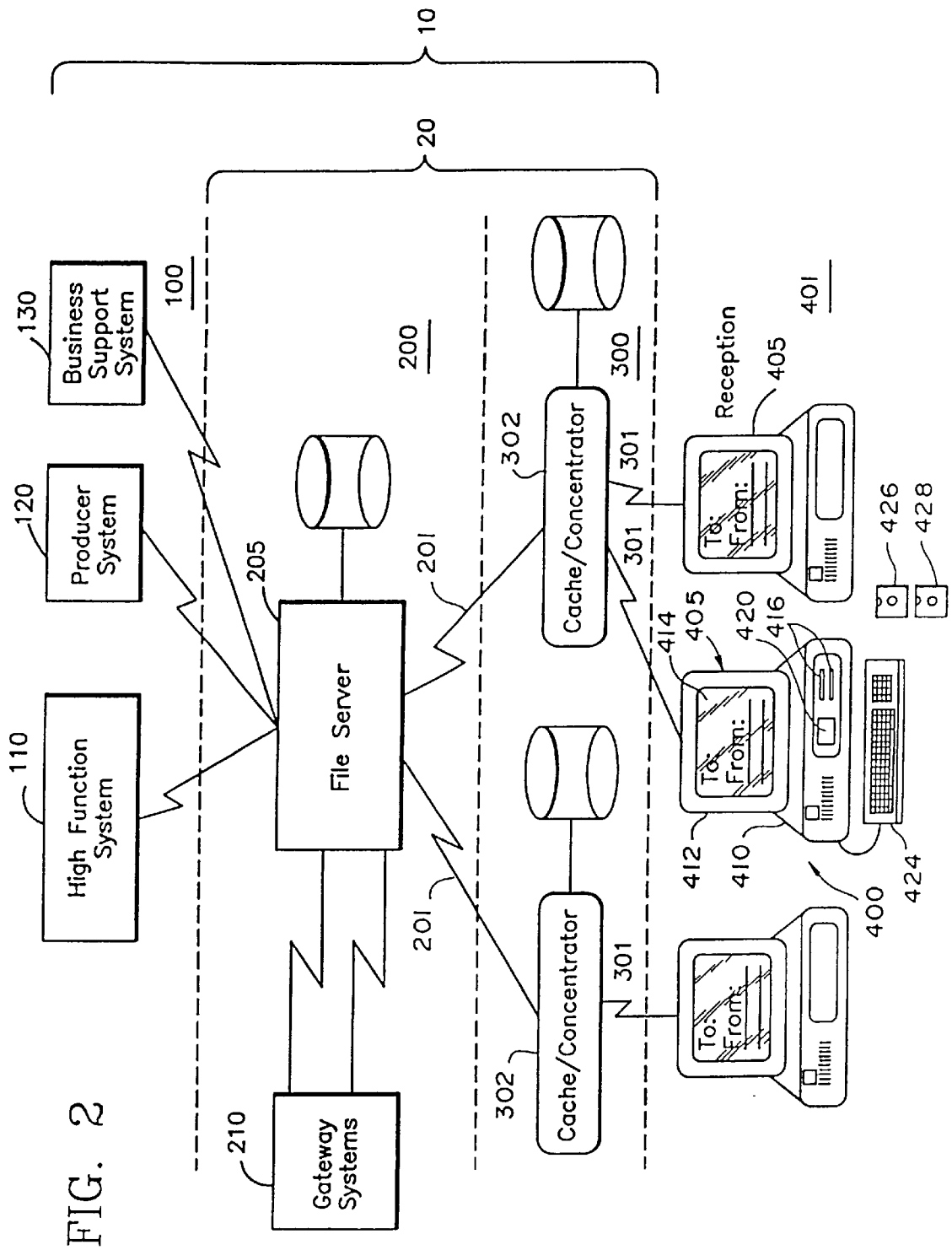

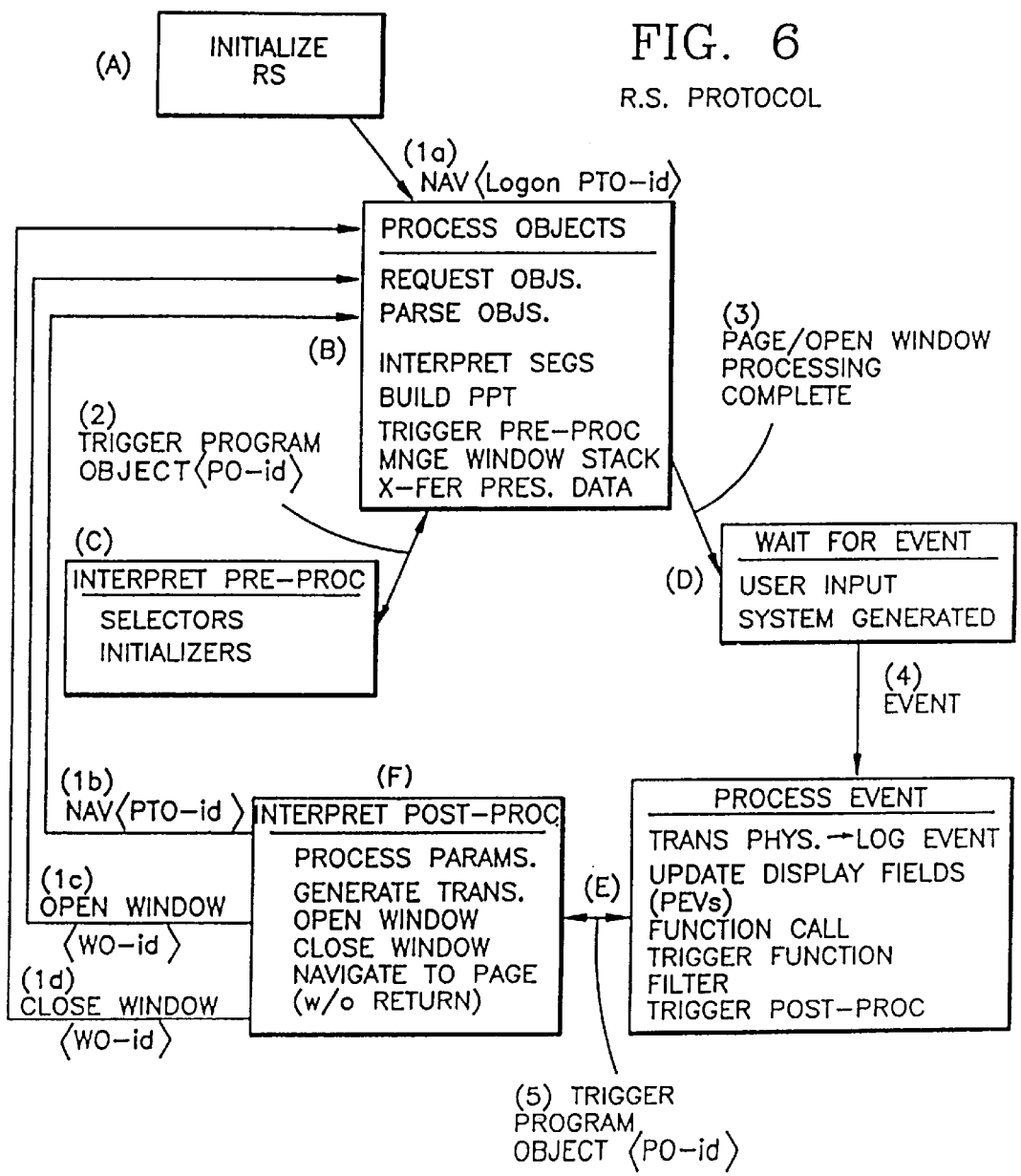

RECEPTION SYSTEM LAYERS

PAGE PROCESSING TABLE (ppt)

INTERACTIVE COMPUTER NETWORK AND METHOD OF OPERATION

This is a continuation of application Ser. No. 08/740,043 filed Oct. 23, 1996, now U.S. Pat. No. 5,758,072. Application Ser. No. 08/740,043 is a division of application Ser. No. 08/158,026 filed Nov. 26, 1993, which issued Jan. 14, 1997 as U.S. Pat. No. 5,594,910. Application Ser. No. 08/158,026 is a division of application Ser. No. 07/388,156 filed Jul. 28, 1989, which issued Sep. 13, 1994 as U.S. Pat. No. 5,347,632. Application Ser. No. 07/388,156 is a continuation-in-part of application Ser. No. 07/328,790 filed Mar. 23, 1989, now abandoned. Application Ser. No. 07/328,790 is a continuation-in-part of application Ser. No. 07/219,931 filed Jul. 15, 1988, now abandoned.

BACKGROUND OF THE INVENTION

1. Field of Use

This invention relates generally to a distributed processing, interactive computer network intended to provide very large numbers of simultaneous users; e.g. millions, with access to an interactive service having large numbers, e.g., thousands, of applications which include pre-created, interactive text/graphic sessions; and more particularly, to a computer network in which the interactive text/graphic sessions are comprised of pre-created blocks of data and program instructions which may be distributed downwardly in the network for execution at software-enhanced user terminals that decrease processing demand on the higher-level network elements, thus permitting the higher-level elements to function primarily as data supply and maintenance resource and, thereby, reduce network complexity, cost and response time.

2. Prior Art

Interactive computer networks are not new. Traditionally they have included conventional, hierarchical architectures wherein a central, host computer responds to the information requests of multiple users. An illustration would be a time-sharing network in which multiple users, each at a remote terminal, log onto a host that provides data and software resource for sequentially receiving user data processing requests, executing them and supplying responses back to the users.

While such networks have been successful in making the processing power of large computers available to many users, problems have existed with them. For example, in such networks, the host has been required to satisfy all the user data processing requests. As a result, processing bottlenecks arise at the host that cause network slowdowns and compel expansion in computing resources; i.e., bigger and more complex computer facilities, where response times are sought to be held low in the face of increasing user populations.

Host size and complexity, however, are liabilities for interactive networks recently introduced to offer large numbers of the public access to transactional services such as home shopping, banking, and investment maintenance, as well as informational services concerning entertainment, business and personal matters.

As can be appreciated, commercial interactive networks must provide interesting and desirable transactional and informational services at low cost and with minimal response times in order to be successful. As a result, unlike military and governmental networks where, because of the compulsory nature of the service performed, costs and content are of secondary concern, in commercial services, the network capital and maintenance expenses must be kept low in order to make the network affordable and, the content maintained interesting to attract both users who would subscribe to the network and merchandisers who would rely on the service as a channel of distribution for their good and services. Further, in addition, to maintaining capital and operating costs low, and quality of content high, it is also essential that network response time be kept to a minimum in order to not only capture and hold the user's attention, but also, quickly free the network to satisfy the requests of other users. Accordingly, and as will be appreciated, the ability of the network to satisfy large numbers of user requests with minimal resources is fundamental to the ultimate success of a commercial, interactive network.

While conventional, previously known time-sharing network designs have attempted to alleviate host complexity and response time problems by providing some processing at the user site; i.e., "smart terminals", still, the storage of the principal data and software resources needed for processing applications at the host continues to create a burden on network complexity and response time which renders the conventional approach unsuited for the large numbers of users contemplated for a commercially viable interactive, informational and transactional network.

SUMMARY OF INVENTION

Accordingly, it is an object of this invention to provide method and apparatus which permit a very large number of users to obtain access to a large number of applications which include interactive text/graphic sessions that have been created to enable the users to obtain informational and transactional services.

It is a further object of this invention to provide method and apparatus which permit the data and program instructions necessary to support applications sessions to be distributed over a computer network.

It is still a further object of this invention to provide method and apparatus that would permit a user to access informational and transactional services available over an electronic gateway.

It is yet a further object of this invention to provide method and apparatus which permit the data and program instructions necessary to support applications sessions to be updated while at the user cites.

It is another object of this invention to provide method and apparatus that would permit informational and transactional services to be provided to users based upon predetermined parameters such as user demographics and/or locale.

It is yet another object of the invention to provide method and apparatus capable of collecting data regarding usage of the network and applications and to condition distribution in the network of data for supporting applications on user reaction to the applications.

Briefly, to achieve the above and other objects and features, the invention includes method and apparatus for operating an interactive network that includes a multiplicity of computer-based user reception systems at which respective users can request applications that include informational and transactional services. In preferred form, the method aspect of the invention includes steps for organizing the applications into objects that collectively include data and executable program instructions for generating the applications, as well as steps for distributing selected objects within the network in accordance with a predetermined plan based on the likelihood a user will request a particular application. Further, in preferred form, the method includes steps for supplying objects to a reception system requesting an application to enable the requesting reception system to selectively collect objects required for the application from the network and the requesting reception system so that the requested application may be presented based on the objects collected.

Further, in the apparatus aspect of the invention, the network in the preferred form includes one or more host computers, a plurality of concentrator computers connected in groups of one or more to each of the host computers, and a plurality of reception system computers connected in groups of one or more to each of the concentrator computers, the reception system computers being configured to permit respective users to enter requests for interactive applications. Additionally, the method aspect of operating the preferred form of the network apparatus includes steps for establishing data stores at the host computers, the concentrator computers and the reception system computers and, thereafter, distributing application data to data stores maintained, respectively, at the host computers, the concentrator computers and the reception system computers in accordance with a predetermined plan designed to reduce the time required to present a requested application.

Still further, the method aspect of operating the preferred form of the network apparatus includes supplying application data to a reception system computer requesting an application so that the requesting reception system computer can assemble the data which makes up the requested application by selectively collecting data from its own data store and the data stores of the respective host computer and concentrator computer to which it is connected.

Further, in preferred form, the method aspect of the invention, features use, of specially structured messages that harmonize and facilitate communications between the different elements of the network and computing elements external to the network that may be called upon to supply information to support the applications.

Also in preferred form, the method aspect of the invention features specially prepared program instructions within the objects that permit the objects to be executed at the reception system in conjunction with the application software.

DESCRIPTION OF THE DRAWINGS

The above and further objects, features and advantages of the invention will become clear from the following more detailed description when read with reference to the accompanying drawings in which:

FIG. 2 is a schematic diagram of the network illustrated in FIG. 1;

FIG. 6 is a schematic diagram that illustrates the protocol used by the reception system to support user applications in accordance with the invention;

DESCRIPTION OF THE PREFERRED EMBODIMENT

GENERAL SYSTEM DESCRIPTION

Figure 1:
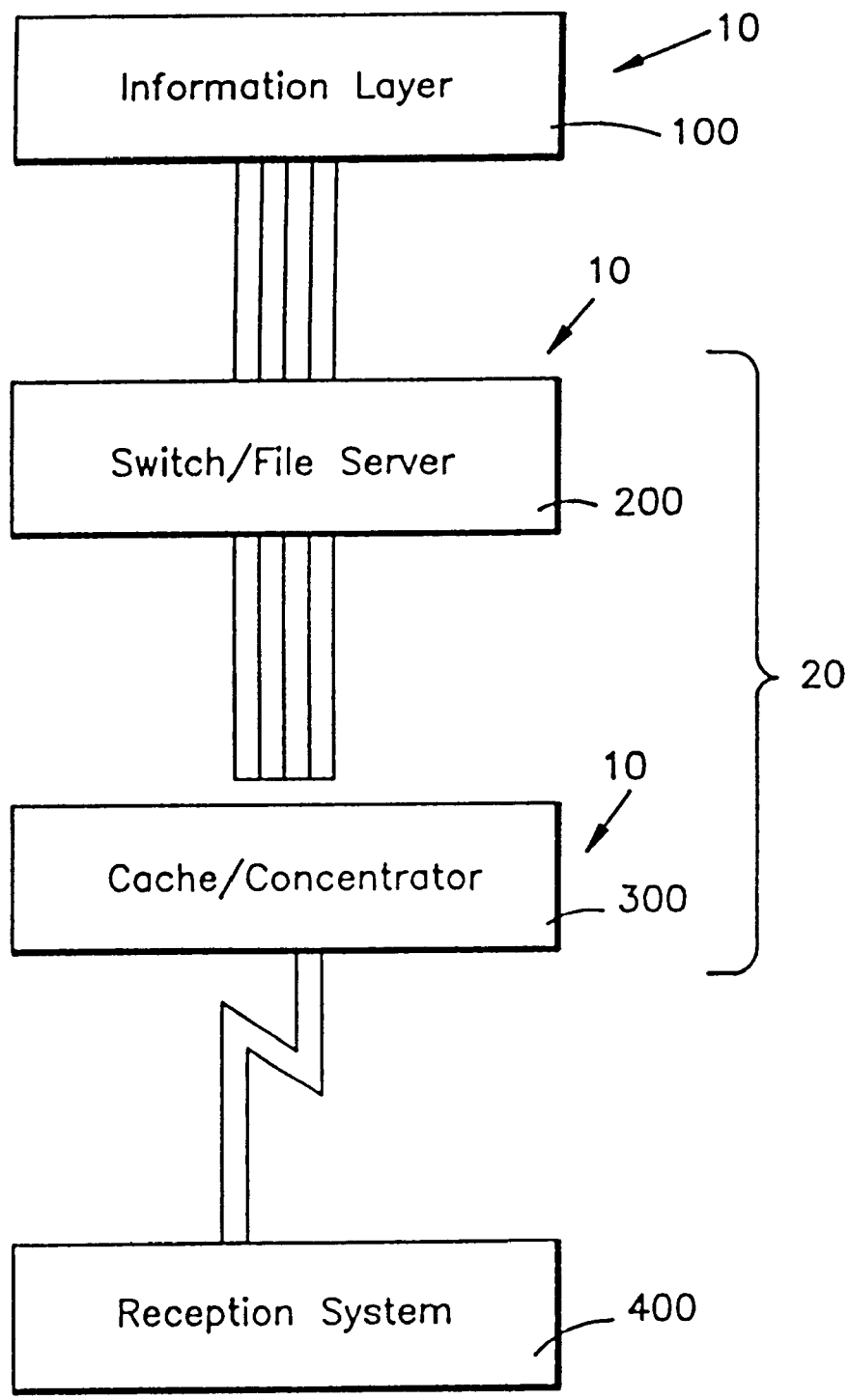
FIG. 1 is a block diagram of the interactive computer network in accordance with the invention.

With reference to FIGS. 1 and 2, the invention features a network 10 including a plurality of reception units within reception layer 401 for displaying information and providing transactional services. In this arrangement, many users each access network 10 with a conventional personal computer; e.g., one of the IBM or IBM-compatible type, which has been provided with application software in accordance with a preferred form of the invention to constitute a reception system (RS) 400.

As shown in FIG. 1, interactive network 10 uses a layered structure that includes an information layer 100, a switch/file server layer 200, and cache/concentrator layer 300 as well as reception layer 401. This structure maintains active application databases and delivers requested parts of the databases on demand to the plurality of RSs 400, shown in FIG. 2. As seen in FIG. 2, cache/concentrator layer 300 includes a plurality of cache/concentrator units 302, each of which serve a plurality of RS 400 units over lines 301. Additionally, switch/file server layer 200 is seen to include a server unit 205 connected to multiple cache/concentrator units 302 over lines 201. Still further, server unit 205 is seen to be connected to information layer 100 and its various elements, which act as means for producing, supplying and maintaining the network databases and other information necessary to support network 10. Continuing, switch/filer layer 200 is also seen to include gateway systems 210 connected to server 205. Gateways 210 couple layer 200 to other sources of information and data; e.g., other computer systems. As will be appreciated by those skilled in the art, layer 200, like layers 401 and 300 could also include multiple servers, gateways and information layers in the event even larger numbers of users were sought to be served.

Continuing with reference to FIG. 2, in preferred form, each RS 400 is seen to include a personal computer 405 having a CPU 410 including a microprocessor (as for example the type made by INTEL Corporation in its X'86 family of microprocessors), companion RAM and ROM memory and other associated elements, monitor 412 with screen 414 and a keyboard 424. Further, personal computer 405 may also include one or two floppy disk drives 416 for receiving diskettes 426 containing application software in accordance with this invention for supporting the interactive sessions with network 10 and diskettes 428 containing operating systems software; e.g., MS-DOS, suitable for the personal computer 405 being used. Personal computer 405 may also include a hard-disk drive 420 for storing the application software and operating system software which may be transferred from diskettes 426 and 428 respectfully.

Once so configured, each RS 400 provides: a common interface to other elements of interactive computer network 10; a common environment for application processing; and a common protocol for user application conversation which is independent of the personal computer brand used. RS 400 thus constitutes a universal terminal for which only one version of all applications on network 10 need be prepared, thereby rendering the applications interpretable by a variety of brands of personal computers of the IBM or IBM-compatible type.

RS 400 formulated in this fashion is capable of communication with the host system to receive information containing either of two types of data, namely objects and messages. Objects have a uniform, self-defining format known to RS 400, and include data types, such as interpretable programs and presentation data for display at monitor screen 414 of the user's personal computer. Applications presented at RS 400 are partitioned into objects which represent the minimal units available from the higher levels of interactive network 10 or RS 400. In this arrangement, each application partition typically represents one screen or a partial screen of information, including fields filled with data used in transactions with network 10. Each such screen, commonly called a page, is represented by its parts and is described in a page template object, discussed below.

Applications, having been partitioned into minimal units, are available from higher elements of network 10 or RS 400, and are retrieved on demand by RS 400 for interpretive execution. Thus, not all partitions of a partitioned application need be resident at RS 400 to process a selected partition, thereby raising the storage efficiency of the user's RS 400 and minimizing response time. Each application partition is an independent, self-contained unit and can operate correctly by itself. Each partition may refer to other partitions either statically or dynamically. Static references are built into the partitioned application, while dynamic references are created from the execution of program logic using a set of parameters, such as user demographics or locale. Partitions may be chosen as part of the RS processing in response to user created events, or by selecting a key word of the partitioned application (e.g., "JUMP" or "INDEX," discussed below), which provides random access to all services represented by partitioned applications having key words.

Objects provide a means of packaging and distributing partitioned applications. As noted, objects make up one or more partitioned applications, and are retrieved on demand by a user's RS 400 for interpretive execution and selective storage. All objects are interpreted by RS 400, thereby enabling applications to be developed independently of the personal computer brand used.

Objects may be nested within one another or referenced by an object identifier (object-id) from within their data structure. References to objects permit the size of objects to be minimized. Further, the time required to display a page is minimized when referenced objects are stored locally at RS 400 (which storage is determined by prior usage meeting certain retention criteria), or have been pre-fetched, or in fact, are already used for the current page.

Objects carry application program instructions and/or information for display at monitor screen 414 of RS 400. Application program objects, called pre-processors and post-processors, set up the environment for the user's interaction with network 10 and respond to events created when the user inputs information at keyboard 424 of RS 400. Such events typically trigger a program object to be processed, causing one of the following: sending of transactional information to the co-applications in one layer of the network 10; the receiving of information for use in programs or for presentation in application-dependent fields on monitor screen 414; or the requesting of a new objects to be processed by RS 400. Such objects may be part of the same application or a completely new application.

The RS 400 supports a protocol by which the user and the partitioned applications communicate. All partitioned applications are designed knowing that this protocol will be supported in RS 400. Hence, replication of the protocol in each partitioned application is avoided, thereby minimizing the size of the partitioned application.

RS 400 includes a means to communicate with network 10 to retrieve objects in response to events occurring at RS 400 and to send and receive messages.

RS 400 includes a means to selectively store objects according to a predetermined storage criterion, thus enabling frequently used objects to be stored locally at the RS, and causing infrequently used objects to forfeit their local storage location. The currency of objects stored locally at the RS 400 is verified before use according to the object's storage control parameters and the storage criterion in use for version checking.

Selective storage tailors the contents of the RS 400 memory to contain objects representing all or significant parts of partitioned applications favored by the user. Because selective storage of objects is local, response time is reduced for those partitioned applications that the user accesses most frequently.

Since much of the application processing formerly done by a host computer in previously known time-sharing networks is now performed at the user's RS 400, the higher elements of network 10, particularly layer 200, have as their primary functions the routing of messages, serving of objects, and line concentration. The narrowed functional load of the higher network elements permits many more users to be serviced within the same bounds of computer power and I/O capability of conventional host-centered architectures.

Network 10 provides information on a wide variety of topics, including, but not limited to news, industry, financial needs, hobbies and cultural interests. Network 10 thus eliminates the need to consult multiple information sources, giving users an efficient and timesaving overview of subjects that interest them.

The transactional features of interactive network 10 saves the user time, money, and frustration by reducing time spent traveling, standing in line, and communicating with sales personnel. The user may, through RS 400, bank, send and receive messages, review advertising, place orders for merchandise, and perform other transactions.

In the preferred embodiment, network 10 provides information and transaction processing services for a large number of users simultaneously accessing the network via the public switched telephone network (PSTN), broadcast, and/or other media with their RS 400 units. Services available to the user include display of information such as movie reviews, the latest news, airlines reservations, the purchase of items such as retail merchandise and groceries, and quotes and buy/sell orders for stocks and bonds. Network 10 provides an environment in which a user, via RS 400 establishes a session with the network and accesses a large number of services. These services are specifically constructed applications which as noted are partitioned so they may be distributed without undue transmission time, and may be processed and selectively stored on a user's RS 400 unit.

SYSTEM CONFIGURATION

As shown in FIG. 1, in preferred form interactive computer network 10 includes four layers: information layer 100, switch and file server layer 200, concentrator layer 300, and reception layer 401.

Information layer 100 handles: (1) the production, storage and dissemination of data and (2) the collection and off-line processing of such data from each RS session with the network 10 so as to permit the targeting of information to be presented to users and for traditional business support.

Switch and file server layer 200 and cache/concentrator layer 300 together constitute a delivery system 20 which delivers requested data to the RSs 400 of reception layer 401 and routes data entered by the user or collected at RSs 400 to the proper application in network 10. With reference to FIG. 2, the information used in a RS 400 either resides locally at the RS 400, or is available on demand from the cache/concentrator 300 or the file server 205, via the gateway 210, which may be coupled to external providers, or is available from information layer 100.

There are two types of information in the network 10 which are utilized by the RS 400: objects and messages.

Objects include the information requested and utilized by the RS 400 to permit a user to select specific parts of applications, control the flow of information relating to the applications, and to supply information to the network. Objects are self-describing structures organized in accordance with a specific data object architecture, described below. Objects are used to package presentation data and program instructions required to support the partitioned applications of a RS 400. Objects are distributed on demand throughout interactive network 10. Objects may contain: control information; program instructions to set up an application processing environment and to process user or network created events; information about what is to be displayed and how it is to be displayed; references to programs to be interpretively executed; and references to other objects, which may be called based upon certain conditions or the occurrence of certain events at the user's personal computer, resulting in the selection and retrieval of other partitioned applications packaged as objects.

Messages are information provided by the user or the network and are used in fields defined within the constructs of an object, and are seen on the user's RS monitor 412, or are used for data processing at RS 400. Additionally, and as more fully described hereafter, messages are the primary means for communication within and without the network. The format of messages is application dependent. If the message is input by the user, it is formatted by the partitioned application currently being processed on RS 400. Likewise, and with reference to FIG. 2, if the data are provided from a co-application database residing in delivery system 20, or accessed via gateway 210 or high function system 110 within the information layer 100, the partitioned application currently being processed on RS 400 causes the message data to be displayed in fields on the user's display monitor as defined by the particular partitioned application.

All active objects reside in file server 205. Inactive objects or objects in preparation reside in producer system 120. Objects recently introduced into delivery system 20 from the producer system 120 will be available from file server 205, but may not be available on cache/concentrator 302 to which the user's RS 400 has dialed. If such objects are requested by the RS 400, the cache/concentrator 302 automatically requests the object from file server 205. The requested object is routed back to the requesting cache/concentrator 302, which automatically routes it to the communications line on which the request was originally made, from which it is received by the RS 400.

The RS 400 is the point of application session control because it has the ability to select and randomly access objects representing all or part of partitioned applications and their data. RS 400 processes objects according to information contained therein and events created by the user on personal computer 405.

Applications on network 10 act in concert with the distributed partitioned applications running on RS 400. Partitioned applications constructed as groups of objects and are distributed on demand to a user's RS 400. An application partition represents the minimum amount of information and program logic needed to present a page or window, i.e. portion of a page presented to the user, perform transactions with the interactive network 10, and perform traditional data processing operations, as required, including selecting another partitioned application to be processed upon a user generated completion event for the current partitioned application.

Objects representing all or part of partitioned applications may be stored in a user's RS 400 if the objects meet certain criteria, such as being non-volatile, non-critical to network integrity, or if they are critical to ensuring reasonable response time. Such objects are either provided on diskettes 426 together with RS 400 system software used during the installation procedure or they are automatically requested by RS 400 when the user makes selections requiring objects not present in RS 400. In the latter case, RS 400 requests from cache/concentrator layer 300 only the objects necessary to execute the desired partitioned application.

Reception system application software 426 in preferred form is provided for IBM and IBM-compatible brands of personal computers 405, and all partitioned applications are constructed according to a single architecture which each such RS 400 supports. With reference to FIG. 2, to access network 10, a user preferably has a personal computer 405 with at least 512K RAM and a single disk drive 416. The user typically accesses network 10 using a 1,200 or 2,400 bps modem (not shown). To initiate a session with network 10, objects representing the logon application are retrieved from the user's personal diskette, including the R.S. application software, which was previously set up during standard installation and enrollment procedures with network 10. Once communication between RS 400 and cache/concentrator layer 300 has been established, the user begins a standard logon procedure by inputting a personal entry code. Once the logon procedure is complete, the user can begin to access various desired services (i.e., partitioned applications) which provide display of requested information and/or transaction operations.

APPLICATIONS AND PAGES

Figure 3A:
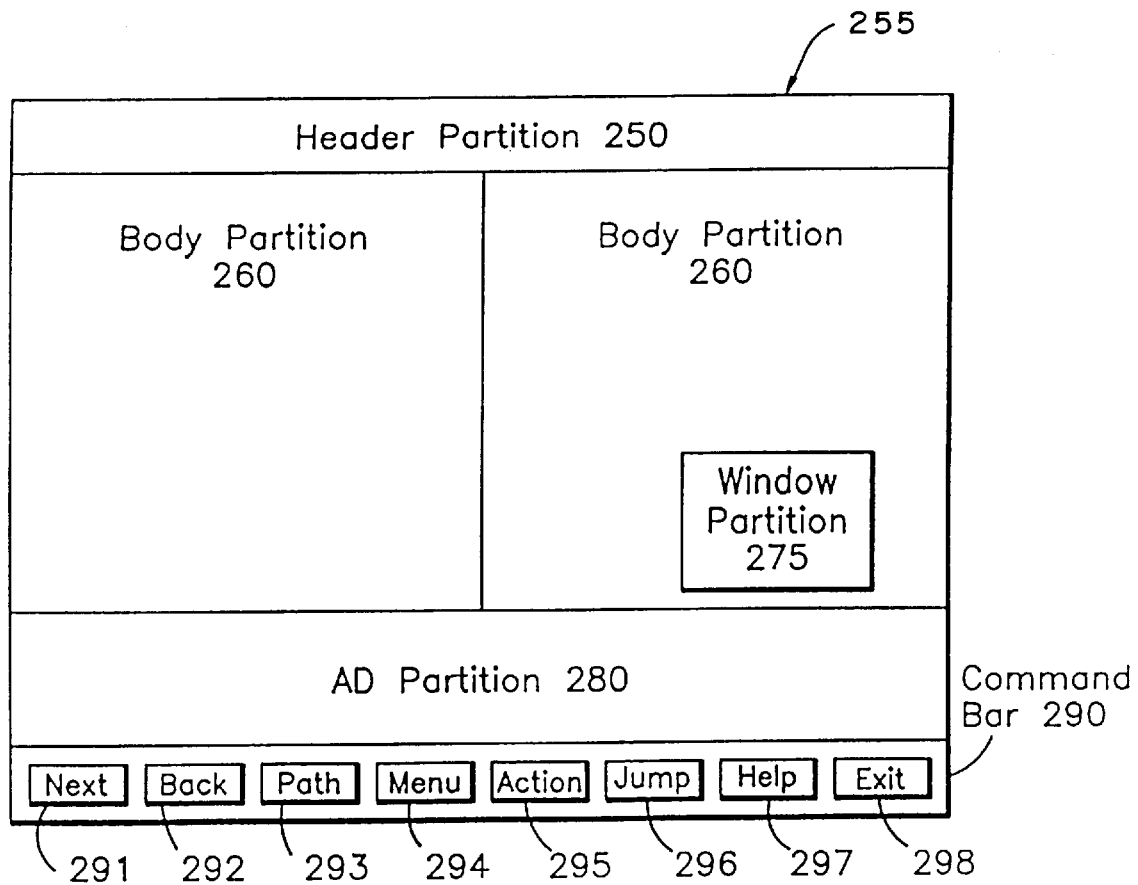
FIGS. 3a and 3b are plan views of a display screen presented to a user in accordance with the invention.

Applications, i.e. information events, are composed of a sequence of one or more pages opened at screen 414 of monitor 412. This is better seen with reference to FIGS. 3*a* and 3*b* were a page 255 is illustrated as might appear at screen 414 of monitor 412. With reference to FIG. 3*a*, each page 255 is formatted with a service interface having page partitions 250, 260, 280, and 290 (not to be confused with application partitions). Window page partitions 275, well known in the art, are also available and are opened and closed conditionally on page 255 upon the occurrence of an event specified in the application being run. Each page partition 250, 260, 280, and 290 and window 275 is made up of a page element which define the content of the partition or window.

Figure 3B:
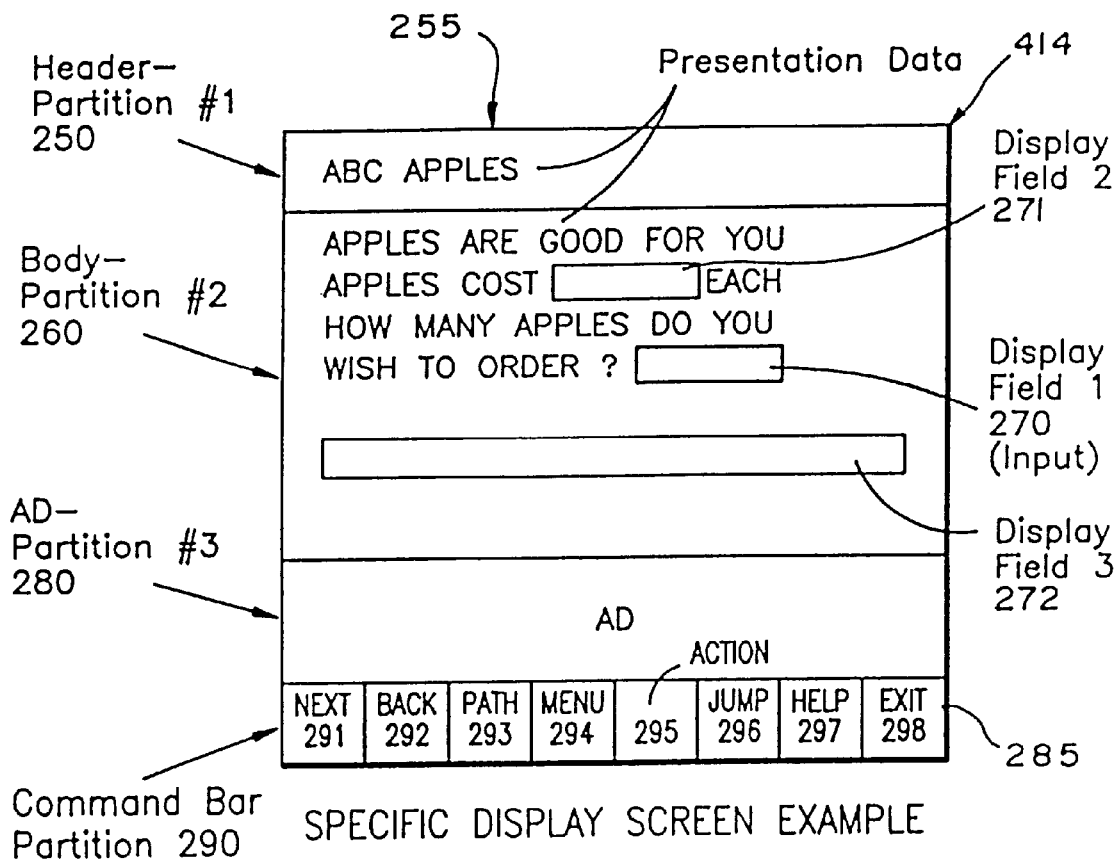

Each page 255 includes: a header page partition 250, which has a page element associated with it and which typically conveys information on the page's topic or sponsor; one or more body page partitions 260 and window page partitions 275, each of which is associated with a page element which as noted gives the informational and transactional content of the page. For example, a page element may contain presentation data selected as a menu option in the previous page, and/or may contain prompts to which a user responds in pre-defined fields to execute transactions. As illustrated in FIG. 3b, the page element associated with body page partition 260 includes display fields 270, 271, 272. A window page partition 275 seen in FIG. 3a represents the same informational and transactional capability as a body partition, except greater flexibility is provided for its location and size.

Continuing with reference to FIG. 3a, advertising 280 provided over network 10, like page elements, also include information for display on page 255, and may be included in any partition of a page. Advertising 280 may be presented to the user on an individualized basis from queues of advertising that are constructed off-line by business system 130, and sent to file server 205 where they are accessible to each RS 400.

Individualized queues of advertising are constructed based upon data collected on the partitioned applications that were accessed by a user, and upon events the user generated in response to applications. The data are collected and reported by RS 400 to a data collection co-application in file server 205 for later transmission to business system 130. In addition to application access and use characteristics, a variety of other parameters, such as user demographics or postal ZIP code, may be used as targeting criteria. From such data, queues of advertising are constructed that are targeted to either individual users or to sets of users who fall into certain groups according such parameters. Stated otherwise, the advertising presented is individualized to the respective users based on characterizations of the respective users as defined by the interaction history with the service and such other information as user demographics and locale. As will be appreciated by those skilled in the art, conventional marketing analysis techniques can be employed to establish the user characterizations based on the collected application usage data above noted and other information.

Also with reference to FIG. 3b, the service interface is seen to include a command region 285 which enables the user to interact with the network RS 400 and other elements of network 10, so as to cause such operations as navigating from page to page, performing a transaction, or obtaining more information about other applications. As shown in FIG. 3b, command region 285 includes a command bar 290 having a number of commands 291–298 which the user can execute. The functions of commands 291–298 are discussed in greater detail below.

NETWORK OBJECTS

As noted above, in conventional time-sharing computer networks, the data and program instructions necessary to support user sessions are maintained at a central host computer. However, that approach has been found to create processing bottlenecks as greater numbers of users are connected to the network; bottlenecks which require increases in processing power and complexity; e.g., multiple hosts of greater computing capability, if the network is to meet demand. Further, such bottlenecks have been found to also slow response time as more users are connected to the network and seek to have their requests for data processing answered.

The consequences of the host processing bottlenecking is to either compel capital expenditures to expand host processing capability, or accept longer response times; i.e., a slower network, and risk user dissatisfaction.

However, even in the case where additional computing power is added, and where response time is allowed to increase, eventually the host becomes user saturated as more and more users are sought to be served by the network. The method and apparatus of this invention are directed at alleviating the effects of host-centered limitations, and extending the network saturation point. In accordance with the invention, this is achieved by reducing the demand on the host for processing resources by structuring the network so that the higher network levels act primarily to maintain and supply data and programs to the lower levels of the network, particularly RS 400, which acts to manage and sustain the user screen displays.

More particularly, the method aspect of the invention features procedures for parsing the network data and program instructions required to support the interactive user sessions into packets, referred to as objects, and distributing them into the network where they can be processed at lower levels, particularly, reception system 400.

In accordance with the invention, the screens presented at the user's monitor are each divided into addressable partitions shown in FIG. 3a, and the display text and graphics necessary to make up the partitions, as well as the program instructions and control data necessary to deliver and sustain the screens and partitions, are formulated from pre-created objects. Further, the objects are structured in accordance with an architecture that permits the displayed data to be relocatable on the screen, and to be reusable to make up other screens and other sessions, either as pre-created and stored sessions or interactive sessions, dynamically created in response to the user's requests.

Figure 4A:
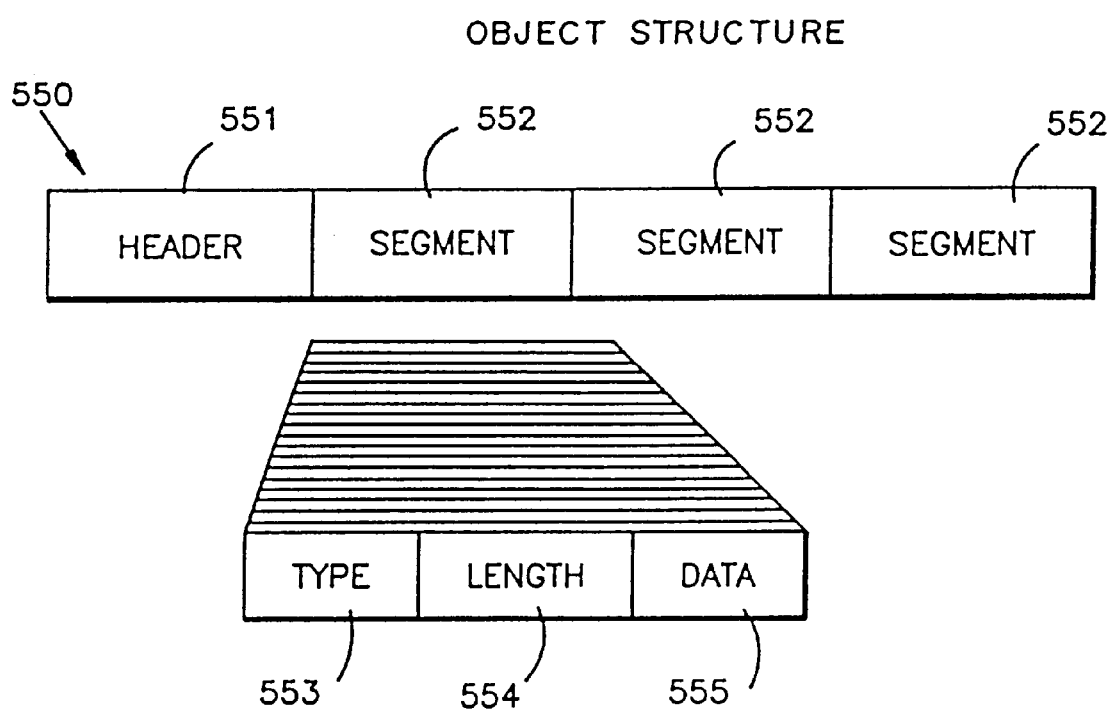
FIGS. 4a, 4b, 4c and 4d are schematic drawings that illustrate the structure of objects, and object segments utilized within the interactive network in accordance with the invention.
Figure 4B:
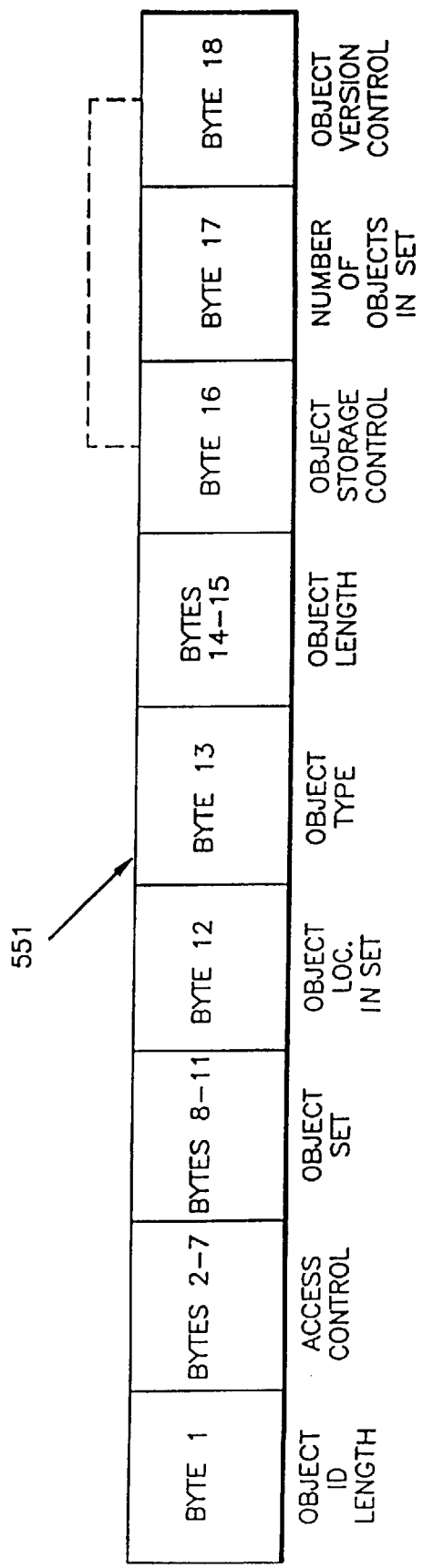
Figure 4C:
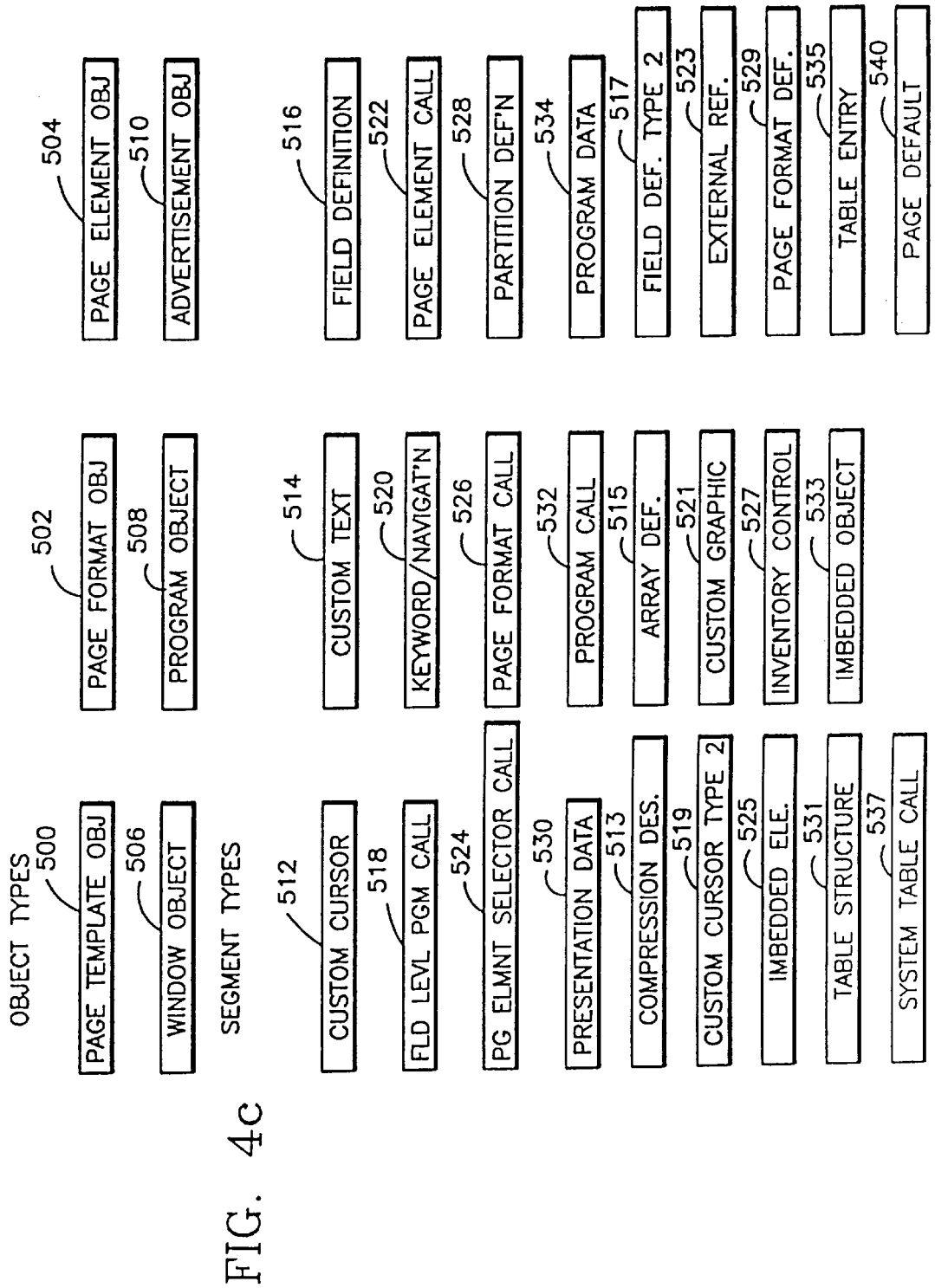

In accordance with the method aspect of the invention and as shown in FIG. 4c, the network objects are organized as a family of objects each of which perform a specific function in support of the interactive session. More particularly, the network object family is seen to include 6 members: page format objects 502, page element objects 504, window objects 506, program objects 508, advertising objects 510 and page template objects 500. Within this family, page format objects 502 are designed to define the partitioning 250 to 290 of the monitor screen shown in FIG. 3a. The page format objects 502 provide a means for pre-defining screen partitions and for ensuring a uniform look to the page presented on the reception system monitor. They provide the origin; i.e., drawing points, and dimensions of each page partition and different values for presentation commands such as palette and background color.

Page format objects 502 are referenced whenever non-window data is to be displayed and as noted ensure a consistent presentation of the page. In addition, page format objects 502 assures proper tessellation or "tiling" of the displayed partitions.

Page element objects 504, on the other hand, are structured to contain the display data; i.e., text and graphic, to be displayed which is mapped within screen partitions 250 to 290, and to further provide the associated control data and programs. More specifically, the display data is described within the object as NAPLPS data, and includes, PDI, ASCII, Incremental Point and other display encoding schemes. Page element objects also control the functionality within the screen partition by means of field definition segments 516 and program call segments 532, as further described in connection with the description of such segments hereafter. Page element objects 504 are relocatable and may be reused by many pages. To enable the displayable data to be relocated, display data must be created by producers in the NAPLPS relative mode.

Continuing with reference to FIG. 4c, window objects 506 include the display and control data necessary to support window partitions 275 best seen in FIG. 3a. Windows contain display data which overlay the base page and control data which supersede the base page control data for the underlying screen during the duration of the window. Window objects 506 contain data which is to be displayed or otherwise presented to the viewer which is relatively independent from the rest of the page. Display data within windows overlay the base page until the window is closed. Logic associated with the window supersedes base page logic for the duration of the window. When a window is opened, the bitmap of the area covered by window is saved and most logic functions for the overlaid page are deactivated. When the window is closed, the saved bit map is swapped onto the screen, the logic functions associated with the window are disabled, and prior logic functions are reactivated.

Windows are opened by user or program control. They do not form part of the base page. Windows would typically be opened as a result of the completion of events specified in program call segments 532.

Window objects 506 are very similar in structure to page element objects 504. The critical difference is that window objects 506 specify their own size and absolute screen location by means of a partition definition segment 528.

Program objects 508 contain program instructions written in a high-level language called TRINTEX Basic Object Language, i.e., TBOL, described in greater detail hereafter, which may be executed on RS 400 to support the application. More particularly, program objects 508 include interpretable program code, executable machine code and parameters to be acted upon in conjunction with the presentation of text and graphics to the reception system monitors.

Program objects 508 may be called for execution by means of program call segments 532, which specify when a program is to be executed (event), what program to execute (program pointer), and how programs should run (parameters).

Programs are treated as objects to conform to the open-ended design philosophy of the data object architecture (DOA), allowing the dissemination of newly developed programs to be easily and economically performed. As noted above, it is desirable to have as many of these program objects staged for execution at or as close to RS 400 as possible.

Still further, advertising objects 510 include the text and graphics that may be presented at ad partition 280 presented on the monitor screen as shown in FIG. 3b.

Finally, the object family includes page template objects 500. Page template objects 500 are designed to define the components of the full screen presented to the viewer. Particularly, page template objects 500 include the entry point to a screen, the name of the page format objects which specify the various partitions a screen will have and the page element object that contain the display data and partitioning parameters for the page.

Additionally, page template object 500 includes the specific program calls required to execute the screens associated with the application being presented to the user, and may serve as the means for the user to selectively move through; i.e., navigate the pages of interest which are associated with various applications. Thus, in effect, page template objects 500 constitute the "recipe" for making up the collection of text and graphic information required to make the screens to be presented to the user.

Also in accordance with the invention, object 500 to 510 shown in FIG. 4c are themselves made up of further sub-blocks of information that may be selectively collected to define the objects and resulting pages that ultimately constitute the application presented to the user in an interactive text and graphic session.

More specifically and as shown schematically in FIG. 4a, objects 500 to 510 are predefined, variable length records consisting of a fixed length header 551 and one or more self-defining record segments 552 a list of which is presented in FIG. 4c as segment types 512 to 540.

In accordance with the invention, and as shown in FIG. 4b, object header 551 in preferred form is 18 bytes in length and contains a prescribed sequence of information which provides data regarding the object's identification, its anticipated use, association to other objects, its length and its version and currency.

More particularly, each of the 18 bytes of object header 551 are conventional hexadecimal, 8 bit bytes and are arranged in a fixed pattern to facilitate interpretation by network 10. Particularly, and as shown in FIG. 4b, the first byte of header 551; i.e., byte 1, identifies the length of the object ID in hexadecimal. The next six bytes; i.e., bytes 2 to 7, are allocated for identifying access control to the object so as to allow creation of closed user groups to whom the object(s) is to be provided. As will be appreciated by those skilled in the art, the ability to earmark objects in anticipation of user requests enables the network anticipate requests and pre-collect objects from large numbers of them maintained to render the network more efficient and reduce response time. The following 4 bytes of header 551; bytes 8 to 11, are used to identify the set of objects to which the subject object belongs. In this regard, it will be appreciated that, again, for speed of access and efficiency of selection, the objects are arranged in groups or sets which are likely to be presented to user sequentially in presenting the page sets; i.e., screens that go to make up a session.

Following identification of the object set, the next byte in header 551; i.e., byte 12, gives the location of the subject object in the set. As will be appreciated here also the identification is provided to facilitate ease of object location and access among the many thousands of objects that are maintained to, thereby, render their selection and presentation more efficient and speedy.

Thereafter, the following bytes of header 551; i.e., byte 13, designates the object type; e.g., page format, page template, page element, etc. Following identification of the object type, two bytes; i.e., bytes 14, 15, are allocated to define the length of the object, which may be of whatever length is necessary to supply the data necessary, and thereby provides great flexibility for creation of the screens. Thereafter, a single byte; i.e., byte 16, is allocated to identify the storage characteristic for the object; i.e., the criterion which establishes at what level in network 10 the object will be stored, and the basis upon which it will be updated. At least a portion of this byte; i.e, the higher order nibble (first 4 bits reading from left to right) is associated with the last byte; i.e., byte 18, in the header which identifies the version of the object, a control used in determining how often in a predetermined period of time the object will be updated by the network.

Following storage characteristic byte 16, header 551 includes a byte; i.e., 17, which identifies the number of objects in the set to which the subject object belongs. Finally, and as noted above, header 551 includes a byte; i.e., 18, which identifies the version of the object. Particularly the object version is a number to establish the control for the update of the object that are resident at RS 400.

As shown in FIG. 4a, and as noted above, in addition to header 551, the object includes one more of the various segment types shown in FIG. 4c.

Segments 512 to 540 are the basic building blocks of the objects. And, as in the case of the object, the segments are also self-defining. As will be appreciated by those skilled in the art, by making the segments self-defining, changes in the objects and their use in the network can be made without changing pre-existing objects.

As in the case of objects, the segments have also been provided with a specific structure. Particularly, and as shown in FIG. 4a, segments 552 consists of a designation of segment type 553, identification of segment length 554, followed by the information necessary to implement the segment and its associated object 555; e.g., either, control data, display data or program code.

In this structure, segment type 553 is identified with a one-byte hexadecimal code which describes the general function of the segment. Thereafter, segment length 554 is identified as a fixed two-byte long field which carries the segment length as a hexadecimal number in INTEL format; i.e., least significant byte first. Finally, data within segments may be identified either by position or keyword, depending on the specific requirements of the segment.

NETWORK MESSAGES

In addition to the network objects, and the display data, control data, and the program instructions they contain as previously described, network 10 also exchanges information regarding the support of user sessions and the maintenance of the network as "messenger". Specifically, messages typically relate to the exchange of information associated with initial logon of a reception system 400 to network 10, dialogue between RS 400 and other elements and communications by the other network elements amongst themselves.

In accordance with the invention, to facilitate message exchange internally, and through gateway 210 to entities externally to network 10, a protocol termed the "Data Interchange Architecture" (DIA) is used to support the transport and interpretation of information. More particularly, DIA enables: communications between RS 400 units, separation of functions between network layers 100, 200, 300 and 401; consistent parsing of data; an "open" architecture for network 10; downward compatibility within the network; compatibility with standard industry protocols such as the IBM System Network Architecture; Open Systems Interconnections standard; support of network utility sessions; and standardization of common network and application return codes.

Thus DIA binds the various components of network 10 into a coherent entity by providing a common data stream for communications management purposes. DIA provides the ability to route messages between applications based in IBM System Network Architecture (SNA), (well known in the art, and more fully described in *Data and Computer Communications*, by W. Stallings, Chapter 12, McMillian Publishing, Inc. (1985)) and non-SNA reception system applications; e.g. home computer applications. Further, DIA provides common data structure between applications run at RS 400 units and applications that may be run on external computer networks; e.g. Dow Jones Services, accessed through gateway 210. As well, DIA provides support for utility sessions between backbone applications run within network 10 as described hereafter.

In make up, DIA is a blend of SNA and non-SNA based modes, and thus provides a means for combining the differences between these modes within network 10. Accordingly, the action of DIA differs depending on whether DIA is operating within an SNA portion of network 10 or whether it is operating within the non-SNA portion of the network. More specifically, within the SNA portion of network 10, DIA and its supporting programs may be considered "applications" facilities. In this context, DIA resides at the transaction services level of SNA, also known as the Specific Application level of Open Systems Interconnections (OSI, also discussed in chapter 12 of *Data and Computer Communications* by W. Stallings above noted). However, in either case, it is a level 7 facility.

Within non-SNA portions of network 10, DIA and its supporting programs provide routing, transport, sessions, and some transaction facilities. Thus DIA provides a comprehensive network architecture providing OSI level 3, 4, 5 and 7 services.

In accordance with the invention, DIA facilitates "utility session" within network 10. Utility sessions allow partner applications to communicate by means of the single session established between two logical units of the SNA type. In order to reduce the number of resources which must be defined to the network support programs, many user messages may be passed to many different application destinations through logical unit to logical unit (LU—LU) "pipes".

Applications exist on either side of the LU—LU pipe which act to concentrate outbound messages in route to applications resident on the other side of the LU—LU pipe; distribute inbound messages to local applications; and maintain and manage application task boundaries. Users may enter into a conversation with a set of transactions, refined to tasks, which are hereafter noted as "user sessions", and the boundaries of these user sessions (tasks) are indicated by begin session/end session flags.

Another application function supported by DIA is the routing of messages between nodes of network 10. Particularly, a switching application will route messages to the appropriate LU—LU session for transmission to another mode by examining and resolving the DIA destination IDs hereafter described.

In accordance with the invention messages conforming to DIA are composed of two functional parts: message headers and message text. Message Headers are transparent to most applications, but are the primary vehicle for passing information for session layer to session layer or transport layer to transport layer communications. Further, Message Text which is processed by end users, and is transparent to session and transport mechanisms.

In order to reduce program complexity and facilitate maintenance and enhancements, DIA has been structured in a layered fashion. In this regard, the DIA-defined data which flows through network 10 consists of a set a headers preface the end-user to end-user message text. Further, as in the case of objects, messages are organized in a family of types based on the specific form of its header. Particularly, there are "FM0" headers which contain routing and control information; FM2 headers which contain transport level information; FM4 headers which contain gateway information; FM8 headers which obtain information for secondary routing; i.e. messages passed through from node to node; FM9 headers which contain network management information; and FM64 headers which contain application-to-application management information, where, for example, applications running at RS 400 need be rendered compatible with applications running on an external computer connected to network 10 through a gateway 210.

In order to provide SNA compatibility, the first two bytes of all DIA FM headers are formatted such that byte 1 defines the length of header in hexadecimal; and byte 2, bit 0, identifies whether concatenation is provided or not; e.g. if bit 1=0 no other headers follow, but if bit 1=1, then the current header is followed by a concatenated header; while bits 1–7 identify the header type in hexadecimal value.

As will be appreciated to those skilled in the art, this layout is the same as that of SNA Function Management Headers. In an SNA LU0 implementation the DIA FM headers may be treated as SNA Function Management Headers (FMHs). Alternatively, the DIA FMs may be treated as pure data within the SNA Request Unit (RU).

With regard to destination routing, the basic premise of DIA is that each message flowing through network 10 carries a DIA header (FM0) that identifies its source and destination ids. Accordingly, switching applications exist which map destination ids to resources and route messages appropriately. In accordance with the invention, in order to send a reply, the recipient application simply swaps the content of the destination and source id fields and return message.

In the context of DIA the totality of ports, devices, and programs which are managed by a particular Switch and defined as destinations, are referred to as "regions". In this regard, each Switch; i.e. server 205 or cache/concentrator 302 shown in FIG. 2, need only be aware of the destination ids of resources within its own region and of the destination ids of switches resident in immediately adjacent nodes. Since server 205 is the central hub within the network 10 for application message routing, messages destined for end-users unknown to a switch are routed toward server 205 for eventual resolution. Destination id naming conventions then enable server 205 to determine the appropriate switch to which the message should be forwarded. Particularly, "destination id" fields "regions" and "unit" are used for this purpose.

Concerning switch responsibility, a switching application has three primary responsibilities. It must forward messages to adjacent switches. It must collect messages from, and distribute messages to resources within its own region. And, it must maintain and manage application task boundaries. Users may enter into a conversation with a set of transactions. This set of transactions is referred to as a "task". These tasks are called user sessions. Further, the boundaries of these tasks are indicated by begin session/end session flags.

In order to fulfill these functions, a resource definition facility must exist for each switch to map each addressable resource to a destination id. In some cases, particularly on the RS 400, it may be desirable for an application to dynamically define subordinate resources to the switch and to interact with the switch to generate unique destination ids for these subordinate resources. It may also be necessary for the switch to either communicate with, or act within an application subsystem. An example of an application subsystem is the Customer Information Control System, (CICS) event, where CICS is a commercially available transaction process controller of the IBM Company, well known in the art. CICS, although subordinate to the operating system, is responsible for initiating and managing application "transaction" programs. Routing to specific transactions under the control of an application subsystem may be accomplished by a secondary address. In this case, the subsystem is defined as the primary destination. The transaction is defined as the secondary destination. A switch must only route incoming messages to the subsystem. The subsystem in turn posts to, or initiates the desired transaction.

The use of secondary addressing provides several advantages. Particularly, switch resource tables are not affected by the coming and going of "transaction" applications. Further, since the DIA headers are SNA compatible, Type 1 application such as CICS need have no special message routing functions. A switch configured in accordance with the IBM standard VTAM could route incoming messages to CICS. Still further, transactions need not go into "receive loops". It is possible for the subsystem to poll on behalf of many transaction programs. In accordance with DIA, secondary addressing is implemented within the application data stream. For instance, CICS transaction ids are, by convention, to be found in the first four bytes of application text.

With regard to the standards for DIA, it will be recalled that DIA messages have a header followed by the message information. In the preferred embodiment, the DIA headers may be concatenated to one another. Further, the presence of concatenated headers is indicated by the setting of the first bit (bit 0) of the Header Type field.

However, there are two restrictions on the use of concatenated headers. Particularly, concatenated headers are required to be sequenced in ascending order left to right by header type numbers and secondary message text prefaced by concatenated headers (such as FM64 architecture message text) are not permitted to span across message block.

The basic structure of all DIA headers is presented below. As presented, "< >" indicate mandatory elements, "( )" indicate optional elements an " . . . " indicate repeat allowed. Further, the "FMX" designations refer to the message header types previously identified and "TTX denotes TRINTEX, the former name of the network developer.

The basic DIA header structure is:

[<Length> <Concatenation flag> <Type> (FM defined data)].

For TTX application-to-application messages, the structure is:

[(<FM0> (FM2) (FM8) (<FM64> (64text)) . . . (Appl. Text))].

For TTX application-to-gateway application messages, the structure is:

[(<FM0> (FM2) (FM4) (FM8) (<FM64> (64text)) . . . (Appl. Text))].

For TTX message to TTX network management, the structure is:

[(<FM0> <<FM9> (9text)> . . . )].

Finally, for internal TTX Switch to Switch messages, the header structure is:

[(<FM0> (Appl. Text))], where the FM0 function code is 2x or Cx.

Continuing, the general rules of implementation for DIA messages in the preferred embodiment are as follows. All inter-messages are prefaced by a single FM0. Further, other header types can be optionally concatenated to the FM0. Also, headers should occur in ascending order by header type; i.e. FM0, FM2, FM4, FM8, FM9, FM64. Header and text length values are carried as binary values. Numeric fields contained within DIA headers are carried with the most significant values in the left-most byte(s).

Further, long gateway messages (greater than 1K bytes including headers) are sliced up into blocks. This segmentation is indicated by the presence of the FM2 Header. In the preferred embodiment, the current block number of the FM2 must be correctly set because it acts as a sequence number and provides a means to guarantee message integrity. In this regard, the total number of blocks field must be set correctly when sending the last block of a logical message. Receiving programs can determine end of message by testing block number=total number blocks. If the sender cannot predetermine the total number of blocks in a beginning or middle of message block, the sender must place binary zeros in the total number of blocks field.

Still further, in the preferred embodiment, FM9 architected text may not span message blocks and may not be longer than 255 bytes. Additionally, FM64 architected text may not span message blocks and may not be longer than 512 bytes long. Yet further, only a single instance of FM2 and/or FM4 can be present in a message block. And, messages using FM9 or FM64 headers must be less than 1K bytes, and these messages should not be segmented into blocks.

Continuing with the DIA implementation rules, FM0 and FM2 must be present in each block of a multi-block message when being transported within the network system. Normal application message flow consists of a request/response pair. In normal processing, reception system applications send requests to host applications. Host applications return responses to these requests. The Reception System application initiates this dialogue. Sending nodes are responsible for inserting the proper "source id" (SID) and "destination id" (DID) into the FM0. Additionally, the communications manager (CM) of the reception system further described hereafter, acts on behalf of reception system transaction programs. Messages destined to the CM should be considered systems messages (FM0 FUNCTION=Cn). Messages destined to subordinate transactions on reception system 400 should be considered applications message (FM0 Function= 0n). Receiving nodes are responsible for swapping SID and DID contents when returning a response. Still further, intermediate nodes (with the exception of CICS switches and Gateways) need only be aware of FM0 and FM2 headers when routing messages to other destinations. CICS switches must be cognizant of all header layouts so that they can find the displacement to the transaction id which is contained within the first four bytes of application text. And server switch 205 provides a facility which allows responses to requests to be deliverable for at least a minimum period after the request was sent, e.g., one minute.

Finally, in the preferred embodiment, CICS switches pass all DIA FM headers on to their subordinate applications. The applications are then responsible for returning the headers (with the SID/DID swap) back to the switch for responses. Both fixed length and variable length message headers are supported by the DIA. It must be noted that variable length headers are designed so that only the last field within the header is variable in length.

With regard to mode of conversation under utility sessions, the server switch 205 may engage in multiple sessions with an external CICS. Messages originating from network users may be routed through any of these sessions. Users are not forced to use the same utility session pipe for each message outbound to CICS. Pipes may be selected dynamically based on loading factors. In a switch-driven environment CICS transactions may typically be initiated by means of start commands from the switch. In this arrangement, CICS transactions will pass outbound data back to the switch through a queue.

In accordance with DIA, the potentially dynamic nature of conversation routing dictates that CICS transaction programs not be written in a conversational mode. Rather, the transaction programs are preferably either pseudo-conversational or non-conversational. In this regard it should be noted that conversational transactions send a message and wait for a reply, and non-conversational transactions send a message and expect no reply. In the case of pseudo-conversational transactions, a message is sent, but no reply is expected. However, such messages are coded so as to be able to accept user input in various stages of completion, thus mimicking conversational transactions.

As will be appreciated by those skilled in the art, communications may arise within network 10 that do not require the standards applied to DIA messages. However, non-DIA messages are allowed in the DIA structure. Particularly, non-DIA messages are designated by setting the length portion of the header (i.e., the first byte) to binary zero.

Considering header layout, and with input first to FM0 headers, it should be noted that the FM0 header provides routing information to both intermediate and boundary switches. In addition the FM0 contains control fields which allow the sending application (which may be a switch) to communicate information to the switch which "owns" the destination application. When an originating application wishes to converse with an application resident on the other side of an utility session it must initially pass an FM0 header with a function code representing an "begin session" to its controlling switch. The begin session code requests the assistance of any intervening switches in the establishment of an application session between the requestor and the destination application specified in the DID.

When either application session partner wishes to terminate its conversation the session partner must pass an FM0 header to its switch, specifying either a function code representing an "end session", or "end session abnormal", or "request terminate". These function codes request the assistance of any intervening switches in the termination of the application session between the requestor and the destination application specified in the DID. In this arrangement an end session function code is unconditional and does not require an acknowledgment. An end session abnormal function code is unconditional and does not require an acknowledgment. And, a request terminate function code is conditional and requires a positive acknowledgement. The positive acknowledgement to a request terminate is an end session. The negative acknowledgement to a request terminate is a function code representing "status Message".

Further, "status/return" function codes "system up", "system down", "echo", "system message" are used by corresponding applications in different regions of network 10 to determine application availability and user session status. Function codes are also used to designate end-to-end user message classes of service. These classes of service refer to a delivery requirement classification and are distinguished from SNA COS. Network class of service allows applications to specify whether or not responses to requests can be delivered after the standard timeout of server 205 has occurred.

Turning next to co called "Backbone States", as will be described below, application sessions may be used as pipes for user transaction traffic. In this regard, it is desirable to establish a set of protocols to be used between originating users and destination users. Further it is important for intermediate nodes to be aware of the status of connectivity with adjacent nodes and specifies some actions to take when messages are known to be undeliverable.

In this context, it is to be noted that the "system up" message is used to signal the start of application traffic between the switch applications. The originating application transmits an FM0 with a system up function code and response expected. The receiving application swaps the SID/DID, sets the Response bit on, and returns the message. If the receiving application is not available no response will be returned and the message will time out.

In the case of "system down" messages, the message is used to prepare the termination of the session between switch applications. The originating application transmits an FM0 with a session down function code and response expected. The originating application sends an FM64 with "status type=terminate", and data mode=EBCDIC. FM64 text follows the header with "action field"=A (Action), "module name"=SSSx0nnnn, "reference number"=0, Text=((timestamp=HHMMSS), Number of current users= NNNNN). The intended result is that the originating application will not accept any messages inbound to the utility session. The responding application will then have the opportunity to return outstanding responses across the utility session. The responding application then returns an FM0 with System Down back to the originating application.

For each "echo" messages, the echo message may be used to determine whether a major application is still available. Specifically, the originating application sends an application message to its gatewayed partner using a FM0 with an echo function. The destination application swaps the SID/DID, set the response bit on and returns the message otherwise untouched, thus effecting echo.

For "APPL status request messages, the message is used to determine the status of a major application between nodes.

Continuing, for "unsolicited application status posting" messages these messages are used for transmission of application status messages by unsolicited application (No response expected) across a nodes. For the message, the originating application wishes to post an application status to its partner in another node. This message may be on the behalf of the originating application itself or on behalf of another application.

Turning next to user to internal APPL messages, and with regard to "session beginning", it is to be noted these messages normally arise at the start of conversation between a user and an internal application. For them the network user sends an FM0 with a "begin session" function code and "response expected". The responding application swaps the SID/DID, supplies a "correlation Id", and returns both the FM0 with the response bit set.

In the case of rejection of a conversation initiation requests, the originating application transmits an FM0 with a "begin session" function code and "response expected". The responding application swaps the SID/DID, and returns the FM0 with the response bit set as well as a function code of "abend" session.

For "applications" messages, these messages normally arise at the middle of conversation between a network user and an internal application. In this case, the originating user transmits an FM0 with an "application" message function code, and "response expected". The responding application swaps the SID/DID, sets the response bit on and returns the response.

"End session" messages typically arise in connection with unconditional termination of user/internal application sessions. The originating transmits an FM0 with an "end sessions" function code. Here however, no response is expected from the corresponding application.

For an "end session abnormal" message, the message unconditionally terminates an application conversation "abend".

Continuing, "request terminate" messages cause conditional termination of session with an internal application.

For messages concerning "rejection of a request due to link failure", in the case of server 205 to host link, the originating application transmits and FM0 with "response expected". The message is intercepted by server 205 which recognizes it as undeliverable. A server 205 application returns the message with an FM64 message after stripping the application text.

For messages concerning rejection of request due to link failure, in the case of communication between the cache/concentrator 302 and server 205, the originating application transmits an FM0 with Response Expected. The message is intercepted by the cache/concentrator 302 which recognizes it as undeliverable. A cache/concentrator application returns the message with an FM64 message after stripping the application text.

For messages concerning "conditional terminate rejected", the message is issued where a conditional termination of application conversation is not accepted by partner application.

For "user continuity posting" messages, the message is used where the originating application wishes to post the status of a user to its partner application across the gateway 210.

Continuing, for "user continuity requests", the message is used where an external application requests logon status of a particular network user.

In the case of "application error" messages, the messages is used where transmission of application error message by responding application is required.

Still further, for "timeout scenarios", and specifically, "timeout scenario with timeout response required", the originating user sends an application message to an internal application with "data mode"="response expected" and "timeout response" required. The originating switch sets a timer for each "response expected" outbound message. If a response is not received before the switch timeout value is reached the switch 205 sends a message with an FM64 header having a "timeout reference" code to the originating application.

For "response occurs after timeout" messages, the originating user sends an application message to an internal application with "response expected". The originating switch sets a timer for each "response expected" outbound message. If a response is received after the timeout value is exceeded, server 205 switch routes the message to a server 205 application which may log the message as non-deliverable, ship the message to the user, or drop it depending on the FM0 class of service option specified on the original request message.

In the case of "maximum resources scenario" messages, the originating user transmits a message to a destined internal application. The destination switch determines that no resources are currently available to support the transmission, and returns the message to the originator, after inserting an FM64 with a "status=error and FM64 text with an "action=wait. The originating user may then retry or take other action.

Finally, the following graphic example illustrates normal message flow.

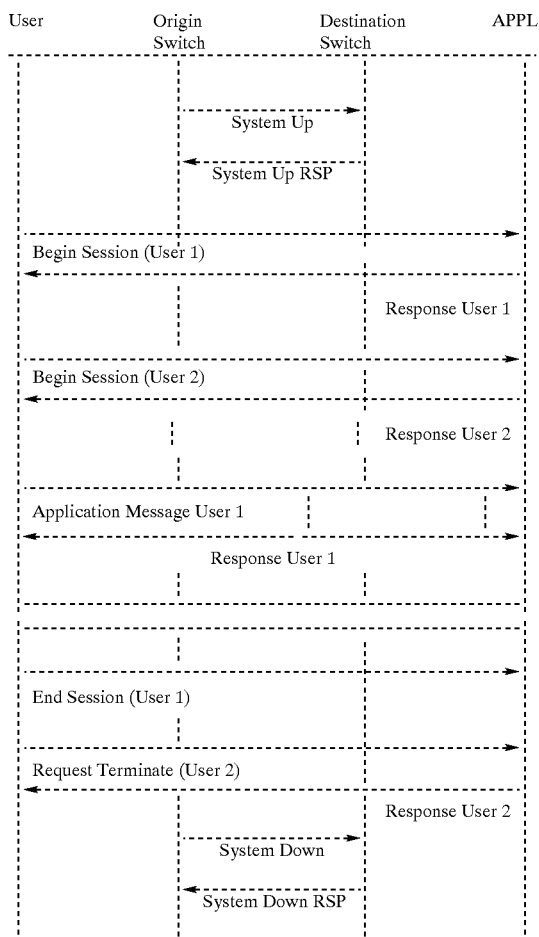

Turning next to messages passed over gateways 210, the normal exchange of messages between the network and external parties occurs between two applications; i.e., the server 205 network message handler (NMH). The server Switch 205 is an application which is written and maintained by network 10 and resides on it. The message handler resides on the other side of gateway 210 from network 10 and may be written and maintained by the external party; i.e., suppliers of information to network 10 such as Dow Jones.

The session between the two applications is used as a pipe for the communications between many network users and a variety of applications external to the network. In this design, the switch server 205 has three primary responsibilities. It must pass network originated messages across the gateway to the network message handler. It must distribute messages returning across gateway 210 to the appropriate network applications or users, i.e. RS 400. Additionally, it must manage the continuity of a network user session with the external service provider. Typically, users enter into a conversation with a set of transactions. This set of transactions is referred to as a task. These tasks are called user sessions. The boundaries of these tasks are indicated by begin session/end session flags.

The network message handler also has several responsibilities. It must pass externally originated messages across gateway 210 to the switch server 205 at network 10. It must distributed messages returning across gateway 210 to the appropriate external applications. And, it must be able to communicate the availability of external applications to network switch server 205.

With regard to gateway messages, in the case of "application to application" messages, and for "system up" messages, the system up message is used to signal the start of application traffic between switch 205 and the network message handler. The originating application transmits an FM0 with function code "system up", and "response expected". The receiving application swaps the SID/DID, sets the response bit on, and returns the message. If the receiving application is not available no response will be returned and the message will time out.

Continuing for gateway "system down" messages, the system down message is used to prepare the termination of the session between the switch 205 and the NMH. The originating application transmits an FM0 with function code "session down" and "response expected. The originating application sends an FM64 with "status type"="terminate", "data mode"="EBCDIC". FM64 Text follows the header with "action field"="A" (Action), "module name"="SSSx0nnnn", "reference number"="0", "text"=((timestamp=HHMMSS), number of current users=NNNNN). The intended result is that the originating application will not accept any messages inbound to the utility session. The responding application will then have the opportunity to return outstanding responses across the utility session. The responding application then returns an FM0 with system down back to the originating application.

Further, for "prepare to bring system down" messages, the message is used to prepare the termination of the session between the Switch 205 and the NMH. The originating application transits an FM0 with function code "prepare system down". The responding application transmits an FM0 with function code "session down" and "response expected". The responding application sends an FM64 with "status type"="terminate", "data mode"="EBCDIC". FM64 Text follows the header with "action field"="A" (action), "module Name"="SSSx0nnnn", "reference number"="0", "text"=((Timestamp=HHMMSS), number of current users=NNNNN). The intended result is that the responding application will not accept any messages inbound to the utility session. The originating application will then have the opportunity to return outstanding responses across the utility session. The originating application then returns an FM0 with "system down" back to the responding application.

For "echo" messages, the message may be used to determine whether a major application is still available. The originating application sends an application message to its gatewayed partner using a FM0 with function echo. The destination application swaps the SID/DID, set the response bit on and returns the message otherwise untouched.

In the case of "APPL status request", the request is used to determine the status of a major application across the gateway.

Continuing, for "unsolicited application status posting messages, the message is used for transmission of application status messages by unsolicited applications no response expected across a gateway. In this case the originating application wishes to post an application status to its partner across the gateway. This message may be on the behalf of the originating application itself or on behalf of another application.

For network to use "external APPL" messages, within the case of "begin session" messages, the message is used for normal start of conversation between a and an external application. The user, i.e. RS 400 sends an FM0 with function "begin session" and "response expected", as well as an FM4 with null value in the "correlation id". The responding application swaps the SID/DID, supplies a Correlation ID, and returns both the FM0 with the response bit set and the FM4.

For rejection of a conversation initiation request, the originating application resident application, transmits an FM0 with function Begin Session and Response Expected as well as an FM4 with NULL value in the Correlation ID. The responding application swaps the SID/DID, and returns the FM0 with the response bit set as well as a function code of ABEND session. The responding application also returns the FM4.

Further, for "applications" message, the message is used for normal middle of conversation between a network user and an external application. The originating user transmits an FM0 with function code "application" message, and "response expected". It also supplies the TTXUID and the correlation id received on the begin session response back to the corresponding application across the gateway. The responding application swaps the SID/DID, sets the response bit on and returns the FM0 and FM4.

For "end session" message, the message is used for unconditional termination of user/external application sessions. The originating user transmits an FM0 with function code "end session", no "response expected". Additionally it sends an FM4 containing the TTXUID and the echoed "correlation id" in an FM4. No response is expected from the corresponding application.

For "end session abnormal" messages, the message is used for unconditional termination ABEND of gatewayed application conversation.

In the case of "request terminate", the message is used for conditional termination of user session with an external application.

For "conditional terminate rejected" messages, the message is used for a conditional termination of application conversation not accepted by partner application across a gateway.

For "user continuity posting" messages, the message is used where the originating application wishes to post the status of a user to its partner application across the gateway.

In the case of "user continuity" request, external application requests logon status of a particular user, i.e. RS 400.

For "application error" messages, the message is used for transmission of application an error message by responding application across a gateway.

In the case of "delayed response" messages, the originating application sends an application message to its gatewayed partner using the minimally a FM0 and a FM4 FM64 may be present. The destination switch signals an application on the originating side that the response may be slow by sending a FM0 with function code "status/return", the response bit is not set. The FM4 is returned, and an FM64 "status", FM64 text "Action"="Information" is also sent. Slow response may be due to a number of factors such as function shipping requirements or many I/Os. In parallel, the gateway partner application processes the message according to normal flow.

For "timeout scenario", the originating user sends an application message to an external application with "response expected". The switch server sets a timer for each "response expected" outbound message. If a response is received after the timeout value is exceeded, the TPF switch routes the message to a TPF application which may log the message as non-deliverable, ship the message to the user, or drop it depending on the FM0 class of service option specified on the original request message.

For the "maximum resources scenario" messages, the originating user transmits a message to a destined external application. The network message handler determines that no resources are currently available to support this transmission. The network message handler returns the message to the originator, after inserting an FM64 with a "Status"= "Error" and FM64 text with an "action=wait". The originating user may then retry or take other action.

Finally, an example illustrates normal message flow.

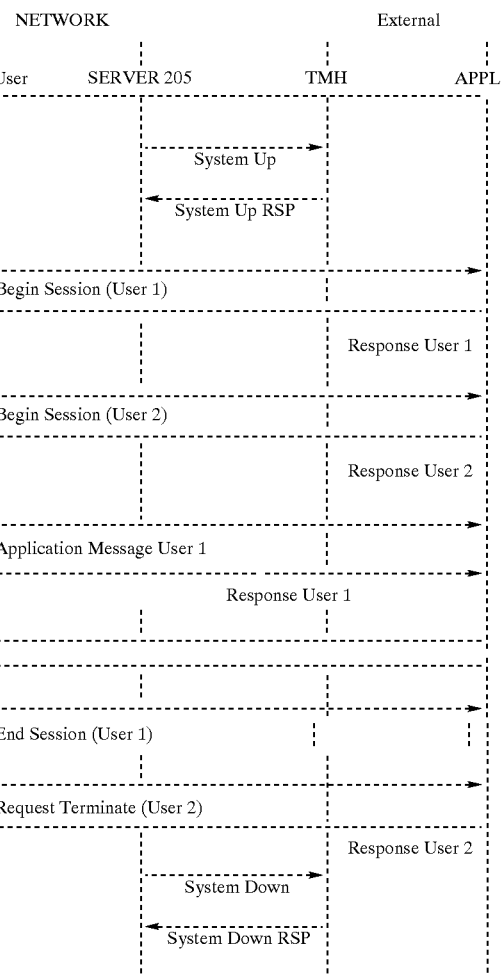

And, the following is an example that illustrates premature loss of user connectivity due to the loss of connection between the network switch server 205 and a cache/concentrator 302. In this case, an application peripheral to switch 205 posts the user status inactive to the NMH using an FM64 Ref=0008 user inactive. External application reaction to this posting is implementation dependent. In this example, the external application returns outstanding responses using the FM64 "ref"="mailbox option".

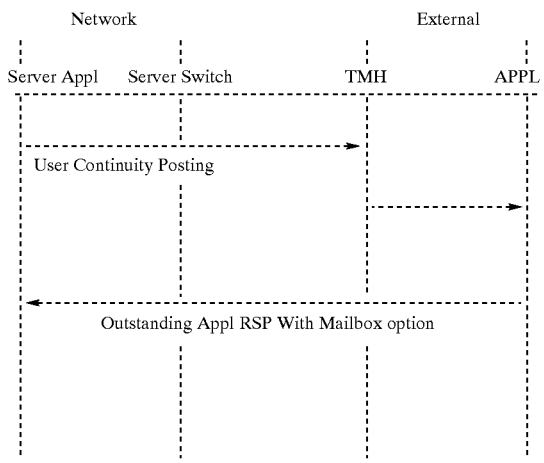

OBJECT LANGUAGE

In accordance with the invention, in order to enable the manipulation of the network objects, the application programs necessary to support the interactive text/graphic sessions are written in a high-level language referred to as "TBOL", (TRINTEX Basic Object Language, "TRINTEX" being the former company name of one of the assignees of this invention). TBOL is specifically adapted for writing the application programs so that the programs may be compiled into a compact data stream that can be interpreted by the application software operating in the user personal computer, the application software being designed to establish the network Reception System 400 previously noted and described in more detail hereafter.

In accordance with the invention, the Reception System application software supports an interactive text/graphics sessions by managing objects. As explained above, objects specify the format and provide the content; i.e., the text and graphics, displayed on the user's screen so as to make up the pages that constitute the application. As also explained, pages are divided into separate areas called "partitions" by certain objects, while certain other objects describe windows which can be opened on the pages. Further, still other objects contain TBOL application programs which facilitate the data processing necessary to present the pages and their associated text and graphics.

As noted, the object architecture allows logical events to be specified in the object definitions. An example of a logical event is the completion of data entry on a screen; i.e., an application page. Logical events are mapped to physical events such as the user pressing the <ENTER> key on the keyboard. Other logical events might be the initial display of a screen page or the completion of data entry in a field. Logical events specified in page and window object definitions can be associated with the call of TBOL program objects.

RS 400 is aware of the occurrence of all physical events during the interactive text/graphic sessions. When a physical event such as depression of the forward <TAB> key corresponds to a logical event such as completion of data entry in a field, the appropriate TBOL program is executed if specified in the object definition. Accordingly, the TBOL programs can be thought of as routines which are given control to perform initialization and post-processing application logic associated with the fields, partitions and screens at the text/graphic sessions.

RS 400 run time environment uses the TBOL programs and their high-level key-word commands called verbs to provide all the system services needed to support a text/graphic session, particularly, display management, user input, local and remote data access.

In accordance with the invention, the TBOL programs have a structure that includes three sections: a header section in which the program name is specified; a data section in which the data structure the program will use are defined; and a code section in which the program logic is provided composed of one or more procedures. More specifically, the code section procedures are composed of procedure statements, each of which begins with a TBOL key-word called a verb.

In accordance with the invention, the name of a procedure can also be used as the verb in a procedure statement exactly as if it were a TBOL key-word verb. This feature enables a programmer to extend the language vocabulary to include customized application-oriented verb commands.

Continuing, TBOL programs have a program syntax that includes a series of "identifiers" which are the names and labels assigned to programs, procedures, and data structures. An identifier may be up to 31 characters long; contain only uppercase or lowercase letters A through Z, digits 0 through 9, and/or the special character underscore (); and must begin with a letter. Included among the system identifiers are: "header section identifiers" used in the header section for the program name; "data section identifiers" used in the data section for data structure names, field names and array names; and finally, "code section identifiers" used in the code section for identification of procedure names and statement labels.

The TBOL statement syntax adheres to the following conventions. Words in uppercase letters are key-words and must be entered exactly as shown in an actual statement. When operand are allowed, descriptive operand names and lowercase letters follow the key word. In this arrangement, operand names or laterals are entered in an actual statement. Operand names enclosed in square brackets ([ ]) are optional and are not required in an actual statement. Operand names separated by a bar (|) mean that one, and only one, of the separated operand can be included in an actual statement. Operand names followed by an ellipsis ( . . . ) can be entered 1 or more times in an actual statement. Model statement words not separated by punctuation must be separated by at least one blank (or space character) in actual statements. Model statement punctuation such as comma (,), semicolon (;), less than sign (<), equal sign (=), greater-than (>), and parentheses (( )) must be included where shown in actual statements. Square brackets ([ ]), bars (|), and ellipses ( . . . ) should not be included in actual statements.

An example of a model statement would be as follows:
GOTO_DEPENDING_ON index,label (.label . . . ).

This model says that a valid GOTO_DEPENDING_ON statement must begin with the word "GOTO_DEPENDING_ON" followed by at least one blank. Thereafter, an "index" and a "label" separated by a comma must be included. The index and at least one label are required. Additional labels may also be used, provided each is preceded by a comma. Further, the statement must have a semicolon as the last character.

Comments can be included in a TBOL program on a statement line after the terminating semicolon character or on a separate comment line. Comment text is enclosed in braces ({ }). For example: {comments are enclosed in braces}. Comments can be placed anywhere in the source code stream since, in accordance with the invention they are ignored by the TBOL compiler. Additionally, blanks (or space characters) are ignored in TBOL statement lines except where they function as field separators.

As noted, TBOL programs have a structure that includes a header section, data section and code section. More particularly, every TBOL program must have a header section. The header section contains a PROGRAM statement. The PROGRAM statement contains the key word PROGRAM followed by the name of the program. For example:

PROGRAM program_name;

where "program name" is an identifier; i.e., the name of the program.

Accordingly, the header section for a TBOL program called LOGON would look like as follows:

PROGRAM LOGON: {User logon program}

The data section in a TBOL program begins with the key word DATA which is followed by data structure statements. The structure statements contain the data structure definitions used by the program. If the data structure does not have to be defined for the program it can be omitted. However, if a TBOL program does not include a data section, it must use a more restricted structure, more fully explained hereafter. As an example, the data syntax would be:

DATA structure [structure . . . ];

where "structure" is a data structure statement. The data structure statement contains a definition, which consists of the data structure name followed by an equal sign and then the names of one or more variables. For example:

structure_name=variable_name [, variable_name . . . ];

where "structure_name" is an identifier; i.e., the name of the data structure; and "variable_name" is an identifier for the variable; i.e., the name of a variable.

All of the variables in the data structures are defined as string (or character) variables. TBOL string variables are of two kinds, fields and arrays. In the case of filed definitions, a variable field is defined with and identifier; i.e., the name of the field. No data type of length specification is required. An individual field is referenced by using the field name. Further, subsequent fields can be referenced by using a field name followed by a numeric subscript enclosed in parentheses (( )). The subscript however, must be an integer number.

A field name followed by a subscript refers to a following field in the data section of a TBOL program. The subscript base is 1. For example, if a field CUST_NBR were defined, then CUST_NBR refers to the field CUST_NBR, CUST_NBR(1) also refers to the field CUST_NBR and CUST_NBR(2) refers to the field following CUST_NBR.

In the case of array definitions, the TBOL array is a one-dimensional table (or list) of variable fields, which can be referenced with a single name. Each field in the array is called an element.

An array can be defined with an identifier, particularly, the name of the array, followed by the array's dimension enclosed in parentheses (( )). The dimension specifies the number of elements in the array. By way of illustration, if an array is defined with a dimension of 12, it will have 12 elements. An individual element in an array is referenced by using the array name followed by a numeric subscript enclosed in parentheses (( )). The subscript indicates the position of the element in the array. The first element in an array is referenced with a subscript of 1. The subscript can be specified as either an integer number or an integer register as described, hereafter.

With regards to variable data, data contained in variables is always left-adjusted. Arithmetic operations can be formed on character strings in variables if they are numbers. A number is a character string that may contain only numeric characters 0 through 9, an optional decimal point, an optional minus sign in the left-most position, commas and the dollar sign ($).

When you perform an arithmetic operation on a character string, leading and trailing zeros are trimmed and fractions are truncated after 13 decimal places. Integer results do not contain a decimal point. Negative results contain a minus sign (−) in the left-most position.

Each field and each array element has a length attribute which is initialized to zero by the Reception System at program start-up. The LENGTH verb, to be described more fully hereafter, can be used to set the current length of a field or array element during program execution. The maximum length of a field or an array element is 65,535.

Further, the maximum number of variables that can be defined in the data section of a TBOL program is 222. This number includes fields and array elements.

The following example data section contains five data structure statements, each defining a data structure. Each structure statement begins with the name of the data structure followed by an equal sign.

Next, are the names of the variables which make up the structure. The variable names are separated by commas. The last variable name in each structure statement is followed by a semicolon which terminates the statement.

The third data structure given, i.e. SALES_TABLE, contains two arrays. The others contain fields. The last structure statement, i.e. WK_AREA is and example of a single line.

| | |
|---|---|
| DATA | {Key word DATA begins data section} |
| BILL_ADDR= | {data structure BILL_ADDR} |
|    BILL_NAME, |    {field1 BILL_NAME} |
|    BILL_ADDR1, |    {field2 BILL_ADDR1} |
|    BILL_ADDR2, |    {field3 BILL_ADDR2} |
|    BILL_ADDR3, |    {field 4 BILL_ADDR3} |
| SHIP_ADDR,= | {data structure SHIP_ADDR}} |
|    SHIP_NAME, |    {field1 SHIP_NAME} |
|    SHIP_ADDR1, |    {field2 SHIP_ADDR1} |
|    SHIP_ADDR2, |    {field3 SHIP_ADDR1} |
|    SHIP_ADDR3, |    {field4 SHIP_ADDR1} |
| SALES TABLE= | {data structure SALES_TABLE} |
|    MONTH QUOTA (12), |    {array1 MONTH_QUOTA} |
|    MONTH SALES (12), |    {array2 MONTH_SALES} |
| MISC_DATA= | {data structure MISC_DATA} |
|    SALESPERS_NAME, |    {field1 SALESPERS_NAME} |
|    CUST_TELNBR; |    {field2 CUST_TELNBR} |
| WK_AREA= | {data structure WK_AREA} |
|    TEMP1, | |
|    TEMP1; | |

Continuing, TBOL contains a number of predefined data structures which can be used in a TBOL program even though they are not defined in the program's data section. There are two kinds of TBOL-defined data structures, these are "system registers" and "external data structures".

In the case of systems registers, tree different types exist. The first type are termed "integer registers", and are used primarily for integer arithmetic. However, these registers are also useful for field or array subscripts. The second type are termed "decimal registers", and are used for decimal arithmetic. The third type are called, "parameter registers" and are used to pass the data contained in procedure statement operand when the name of a procedure is used as the verb in the statement rather than a TBOL keyword.

The variables defined in the data section of a program are string (or character) variables, and the data in them is kept in string format. In most cases there is no need to convert this data to another format, since TBOL allows substantially any kind of operation (including arithmetic) on the data in string form. As will be appreciated by those skilled in the act, this eliminates the clerical chore of keeping track of data types and data conversion.

There are some cases where it is desirable to maintain numeric data in binary integer or internal decimal format. For example, an application involving a great deal of computation will execute more efficiently if the arithmetic is done in binary integer or internal decimal format data rather than string data. In these cases, data conversion can be performed by simple moving the numeric data to the appropriate register. When data is moved from a register to a variable, it is converted to string format.

Integer registers are special-purpose fields for storing and operating on integer numeric data in binary format. The integer registers are named I1 through I8. Numeric data moved to an integer register is converted to an integer number in binary format. Further, an attempt to move non-numeric data to an integer register will cause an error. The largest negative number an integer register can hold is −32,7767, while the largest positive number than can be held is 32,767. An noted arithmetic operations in integer registers will execute more efficiently than arithmetic operations in string variables.

Decimal registers are special-purpose fields for storing and operating on numeric data in internal decimal format. The decimal registers are named D1 through D8. Numeric data moved to a decimal register is converted to a decimal number in internal decimal format. An attempt to move non-numeric data to a decimal register will cause an error. The largest negative number a decimal register can hold is −9999999999999.9999999999999, while the largest positive number a decimal register can hold is 9999999999999.9999999999999. Additionally, decimal registers can not be used as field or array subscripts. And, again, arithmetic operations in decimal registers will perform better than arithmetic operations in string variables.

As pointed out above, the code section of a TBOL program contains the program logic, which itself is composed of one or more procedures. In the logic, the procedures are expressed as procedure statements. Each procedure statement begins with a TBOL keyword called a verb which is followed by operand, or parameters containing the data on which the verb is to operate. The name of a procedure can be used as the verb in a procedure statement exactly as if it were a TBOL keyword verb. As noted this enables the creator of a TBOL program; i.e. the party creating the text/graphic session, to extend the language vocabulary to include his own application-oriented verb commands.

When a procedure is used as the verb in a procedure statement, TBOL saves the current parameter register values, and the parameter data in the verb operand is moved into the parameter registers where it is available to the "called" procedure. When the "called" procedure returns, TBOL restores the saved parameter register values.

Parameter registers are special-purpose fields for passing parameter data to "called" procedures. The parameter registers are named P0 through P8. When a procedure is "called" by using its name as the verb in a procedure statement, the current contents of P0 through P8 are saved. Further, data from the first operand in the procedure statement is placed in P1; data from the second operand is placed in P2; and so on, up to eight operand. If no operand, or less than eight operand are specified, the parameter registers corresponding to the missing operand are set to null. In accordance with this arrangement, the number of operand is placed in P0, and the "called" procedure is given control.

When control returns to the "calling" procedure from the "called" procedure, the previous contents of P0 through P8 are restored. Following execution of the "called" procedure, execution of the "calling" procedure continues.

The "calling" procedure can pass along its own parameters to the "called" procedure by naming parameter registers as operand. The TBOL internal stack can be used to pass additional data to the "called" procedure, or to pass data back to the "calling" procedure.

There are two kind of TBOL-defined external data structures; they are partition structures and global structures. With regard to partition external data structures, as noted above the screens displayed during a test/graphic session are called pages. As also noted, pages may be divided into separate areas called "partitions". Each page partition has its own predefined partition external data structure. Each partition external data structure can contain up to 256 variables for data pertaining to that partition. A TBOL program associated with a particular partition has access to the partition's external data structure and the variables it contains. However, the program cannot access another partition's external data structure.

The variable in a partition external data structure are character string variables like those defined in the data section of a program. The variables within each partition external data structure are named &1 through &256. The DEFINE compiler directive enables the program to use meaningful names for these variables in the program source code.

Partition external variables are used to hold screen field data, program flow data and applications data. In the case of screen field data, when page and window objects are defined, the fields in the screen partitions are assigned to partition external variables. The TBOL Object Linker resolves these references and at program execution time the Reception System transfers data between the screen fields and their associated partition external variables. The TBOL program has access to the variables, which contain the data entered in the screen fields by the user, and the user has access to the screen fields of which contain the data placed in the variables by the program.

For program flow data, partition external variables are used to hold the object identifiers needed by a TBOL program for transferring control. These may be page object identifiers for transfer to another text/graphic screen page, or window object identifiers needed to open a window on the current page. As in the case of screen field data, flow data values are placed in partition external variable by the TBOL Object Linker.

Finally, for application data, partition external variables can be used to hold partition-specific application data such as tables of information needed by the program to process the expected screen field input.

With regard to the global external data structure, the predefined global external data structure can contain up to 32,000 variables for TBOL system data. All TBOL programs have access to the global external data structure and the variables it contains. The variables in a global external data structure are character string variables like the ones one defines in the data section of a program. The global external variables are named #1 through #32,000. These variables are assigned and controlled by the TBOL database administrator which maintains a file of DEFINE compiler directive statements which assign meaningful names to the global external variables in use. In the preferred embodiment, the MS-DOS file specification for this file can, for example be TBOLLIB\TBOL.SYS. In this regard, the COPY compiler directive is used to copy TBOL.SYS into a source code input stream. Subsequent statements in the program source code can reference the global external system variables by using the meaningful names assigned by the DEFINE statements in this file.

Examples of global external variables are: SUS_RETURN_CODE, which is assigned a return code value after the execution of certain TBOL program verb statements; SYS_DATE, which contains the current system date; and SYS_TIME, which contains the current system time.

With regard to the TBOL program code section, as noted above, every TBOL program must have a code section. The code section contains the program logic which is composed of one or more procedures. In accordance with this arrangement, a procedure begins with the keyword PROC followed by an equal sign (=) and then the name of the procedure. The body of the procedure is composed of procedure statements, ending with the END_PROC statement. For example:

PROC=proc_name statement [statement . . . ] END_PROC;

where "proc_name" is an identifier; i.e. the name of the procedure, and "statement" is a TBOL procedure statement as described below.

In accordance with the invention, at program execution time, control is given to the first procedure in the program. This is the mainline procedure. From then on, the flow of procedure execution is controlled by the logic contained in the procedures themselves.

Each procedure statement begins with a TBOL keyword called a verb. However, as noted above, the name of a procedure can also act as the verb in a procedure statement, exactly as if it were a TBOL verb. In such case, the data in any statement operand is moved into parameter registers and control is passed to the other procedure. No special linkage or parameter passing conventions are needed. As will be appreciated by those skilled in the art, this is a powerful feature which enables the application programmer to extend the language vocabulary to include his own library of application-oriented verb commands and commonly used procedures.

When control is transferred to another procedure, as noted, the "called" procedure returns control to the "calling" procedure with a RETURN or END_PROC statement, where RETURN and END_PROC are TBOL verbs described more fully hereafter. Upon return, the "calling" procedure's parameter data, if any, is restored in the parameter registers, and program execution resumes with the next statement. Recursive logic is possible by using the name of the current procedure as the verb in a procedure statement, thus causing the procedure to "call" itself.

In accordance with the design of TBOL, any procedure statement may be preceded with one or more identifying labels. A label consists of an Identifier followed by a colon (:). For example:

(stmt_label: . . . ) statement where "stmt_label" is an Identifier, for the statement, and "statement" is a TBOL procedure statement.

Procedure statement labels are used for transferring control to another statement within the same procedure using a GOTO or GOTO_DEPENDING_ON statement (TBOL verbs described more fully hereafter).

GOTO and or GOTO_DEPENDING_ON statement can also be used to transfer control to another procedure. Transfer to another procedure is done by using the target procedure name as the verb in a statement.

Also in accordance with the design of TBOL, all procedural logic is constructed from statements designed to execute in three basic patterns: sequential, conditional, or repetitive. In the case of a sequential pattern, the sequential program logic consists of one or more procedure statements. In the case of a conditional pattern, the conditional program logic is constructed using IF . . . THEN . . . ELSE and GOTO_DEPENDING_ON key words, described more fully hereafter. Finally, in the case of a repetitive pattern, the repetitive program logic is constructed using WHILE . . . THEN key words or IF . . . THEN . . . ELSE and GOTO key words also described more fully hereafter.

In accordance with the TBOL design, a procedure statement may contain operand following the verb. In the case of procedure statements, there are five types of procedure statement operand; data names; group data names; system registers, label identifiers, and literals. In this arrangement, data names are the names of variables, and data name operand can be either field names; field numbers with subscripts or array names with subscripts. In the case of filed names, a field name is the identifier used as the name of a variable in a data structure in the data section of the program, or the name of TBOL-defined variable in an external data structure.

For field names with subscripts, a field name followed by a subscript enclosed in parentheses (( )) refers to a following field. The subscript must be an integer number expressed as a literal or contained in a variable field. The subscript base is 1. For example: CUST_NAME(1) refers to the field CUST_NAME, and CUST_NAME(2) refers to the field following CUST_NAME.

For array names with subscripts, an array name is the identifier used as the name of an array in a data structure in the data section of the program. An array name followed by a subscript enclosed in parentheses (( )), refers to an individual element in the array. The subscript must be an integer number expressed as a literal or contained in a variable field. The subscript base in 1, so the first element in an array is referenced with a subscript of 1.

In the case of procedure statement group data name operand, the group data names are the names of data structures or arrays. Group data names are used in statements where the verb allows data structures or arrays to be treated as a single unit. For example, the TBOL MOVE verb allows the use of group data name operand. If the names of two arrays as group data operand are used, the contents of each element in the source array is moved to the corresponding element in the destination array. Here the array names are specified without subscripts. However, if the names of two data structures as group data operand are used, the contents of each variable in the source data structure is moved to the corresponding variable in the destination data structure.

With regard to system register operand, they can be either integer registers I1 through I8, or decimal registers D1 through D8, or parameter registers P1 through P8.

In the case of label identifiers, the label identifiers are the identifiers used as procedure statement labels described above.

Continuing, literal operand can be either, integer numbers, decimal numbers or character strings. Where the literal operand are integer numbers, the integer is composed of the digits 0 through 9. Where a negative integer is to be represented, a minus sign (−) is allowed in the left-most position. However, a decimal point is not allowed.

Accordingly, the minimum value that can be represented is −32,767, and the maximum value is 32,767. Where the literal operand is a decimal number, the decimal number is composed of the digits 0 through 9 with a decimal point (.) where desired. A minus sign (−) is allowed in the left-most position. Thus the minimum allowable value is −9999999999999.99999999999999, and the maximum value is 9999999999999.9999999999999.

Further, where the literal operand is a character string, the character string is composed of any printable characters or control characters. Character strings are enclosed in single quotes ('). To include a single quote character in a character string, it must be preceded with the backslash character (\). For example: \'. To include a new line character in a character string, the control character \n is used. For example; 'this causes a new line: \n'. To include binary data in a character string, the hex representation of the binary data is preceded with the backslash character (\). For example; 'this is binary 01110111:\77'.

The syntax of a complete TBOL program is illustrated in the following example program.

```
HEADER SECTION   PROGRAM program_name;
DATA SECTION     DATA
:                     data_structure_name-1= {1st data structure}
:                .
:                     variable_name_1,
:                .
:                     variable names
:                .
:                     variable_name_n;
:                .
:                data structures
:                .
:                     data_structure_name_n= {nth data structure}
:                .
:                     variable_name_1,
:                .
:                     variable names followed by commas
:                .
:                     variable_name_n;
CODE SECTION     PROC proc_name_1={main1ine procedure}
:                .
:                procedure statements
:                .
:                IF x = x THEN EXIT: {if done,ret to:RS Sys}
:                procedure stateinents
:                .
:                END-PROC; {end of mainline procedure}
:                .
:                procedures
:                .
:                PROC proc_name_n= {nth procedures}
:                .
:                procedure statements
:                .
:                IF x = x THEN RETURN; {if done,ret to:
                 "calling"proc}.
:                procedure statements.
                 END-PROC; {end of nth-procedure}
                 {end of program}
```

In accordance with the invention, the TBOL compiler enables portability of TBOL programs. Specifically, the TBOL compiler is capable of generating compact data streams from the TBOL source code that can be interpreted by any reception system configured in accordance with the invention, i.e., a personal computer running the reception system application software. For this arrangement, the compiler input file containing the TBOL source code may have any name. For example, the extension .SRC can be used.

During the compilation, three files are generated. Their names are the same as the source code file; their extensions identify their contents. For example, when the file names INPUT.SRC is compiled the following files are generated by the compiler: INPUT.SYM which contains a symTBOL directory; IN-PUT.COD which contains the compiled code; and INPUT.LST which contains the listing.

In order to resolve an undefined procedure, the TBOL compiler automatically search the local MS-DOS directory TBOLLIB for a file named procname.LIB, where procname is the name of the unresolved procedure. IF procname.LIB is found, the compiler will automatically copy it into the source code stream after the program source text has ended.

In addition to the undefined procedures facility above noted, the TBOL compiler also may be caused to substitute one text string for another. This accomplished by a DEFINE directive.

Wherever the text pattern specified in operand 1 is found in the source code stream, it is replaced by the compiler with the text pattern specified in operand 2. The syntax for the procedure is:

DEFINE source_pattern,replacement_pattern;
where "source_pattern" is the text in the source code which the compiler is to replace, and "replacement_pattern" is the text the compiler will use to replace source_pattern.

If source_pattern or replacement_pattern contain any blank (space) characters, the text must be enclosed in single quotes ('). Further, the compiler can be made to eliminate certain text from the input source stream by using a null text string for the replacement_pattern (' ').

It is to be noted that while DEFINE directives are normally placed in the data section, they can also be placed anywhere in the source code stream. For example, if the name CUST_NUMBER has been used in a TBOL application program to refer to a partition external variable named &6. The DEFINE statement DEFINE CUST_NUMBER,.&6 would cause the compiler to substitute &6 whenever it encounters CUST_NUMBER in subsequent statements.

As a further illustration, if the words MAX and MIN are defined with numeric values, DEFINE MAX,1279; and DEFINE MIN,500; MAX and MIN can be used throughout the program source code rather than the actual numeric values. If the values of MAX and MIN change in the future, only the DEFINE statements will need to be changed.

Still further, the compiler can also be caused to copy source code from some other file into the compiler input source code stream. This can be accomplished with a directive entitled COPY. With the use of the COPY directive, the source code contained in the file specified in operand 1 is copied into the source code stream at the point where the COPY statement is read by the compiler. For example, the syntax would be:

COPY 'file_name';
where "file_name" is the name of the file containing source code to be inserted in the source code steam at the point of the COPY statement. In this arrangement, file_name must be enclosed in single quotes ('), and file_name must conform to the operating system file naming rules (in the current preferred embodiment, those of MS-DOS). Further, the file referenced in a COPY statement must reside in the TBOL-LIB directory on the compilation machine. In accordance with the invention the COPY statement can be placed anywhere in the source code stream.

By way of illustration, the COPY statement COPY 'TBOL.SYS'; causes the compiler to insert source text from the file TBOL.SYS. This file is maintained by the TBOL Database Administrator, and contains DEFINE statements which assign meaningful names to the TBOL system variables in the global external data structure.

As shown in Table 2, 25 verbs are associated with data processing; 15 with program flow; 5 with communications; 6 with file management, 5 with screen management; 1 with object management and 2 with program structure for a total of 59. Alphabetical listing of the TBOL verbs, together with a description of its function and illustration of its syntax.

RECEPTION SYSTEM OPERATION

RS 400 of computer system network 10 uses software called native code modules (to be described below) to enable the user to select options and functions presented on the monitor screen 414 of personal computer 405, to execute partitioned applications and to process user created events, enabling the partitioned application to interact with interactive system 10. Through this interaction, the user is able to input data into fields provided as part of the display, or may individually select choices causing a standard or personalized page to be built (as explained below) for display on the monitor of personal computer 405. Such inputs will cause RS 400 to interpret events and trigger pre-processors or post-processors, retrieve specified objects, communicate with system components, control user options, cause the display of advertising on a page, open or close window partitions to provide additional navigation possibilities, and collect and report data about events, including certain types of objects processed. For example, the user may select a particular option, such as opening or closing window partition 275, which is present on the monitor and follow the selection with a completion key stroke, such as ENTER. When the completion keystroke is made, the selection is translated into a logical event that triggers the execution of a post-processor, (i.e., a partitioned application program object) to process the contents of the field.

Functions supporting the user-partitioned application interface can be performed using the command bar 290, or its equivalent using pull down windows or an overlapping cascade of windows. These functions can be implemented as part of the RS native functions or can be treated as another partition(s) defined for every page for which an appropriate set of supporting objects exist and remain resident at RS 400. If the functions are part of RS 400, they can be altered or extended by verbs defined in the RS virtual machine that permit the execution of program objects to be triggered when certain functions are called, providing maximum flexibility.

To explain the functions the use of a command bar is assumed. Command bar 290 is shown in FIGS. 3*a* and 3*b* and includes a NEXT command 291, a BACK command 292, a PATH command 293, a MENU command 294, an ACTION command 295, a JUMP command 296, a HELP command 297, and an EXIT command 298.

NEXT command 291 causes the next page in the current page set to be built. If the last page of a page set has already been reached, NEXT command 291 is disabled by RS 400, avoiding the presentation of an invalid option.

BACK command 292 causes the previous page of the current page set to be built. If the present page is the first in the page set, BACK command 292 is disabled, since it is not a valid option.

A filter program can be attached to both the NEXT or BACK functions to modify their implicit sequential nature based upon the value of the occurrence in the object set id.

PATH command 293 causes the next page to be built and displayed from a list of pages that the user has entered, starting from the first entry for every new session.

MENU command 294 causes the page presenting the previous set of choices to be rebuilt.

ACTION command 295 initiates an application dependent operation such as causing a new application partition to be interpreted, a window partition 275 to be opened and enables the user to input any information required which may result in a transaction or selection of another window or page.

JUMP command 296 causes window partition 275 to be opened, allowing the user to input a keyword or to specify one from an index that may be selected for display.

HELP command 297 causes a new application partition to be interpreted such as a HELP window pertaining to where the cursor is positioned to be displayed in order to assist the user regarding the present page, a particular partition, or a field in a page element.

EXIT command 298 causes a LOGOFF page template object (PTO) to be built, and a page logoff sequence to be presented at RS 400 monitor screen 414.

NAVIGATION INTERFACE

Continuing, as a further feature, the method aspect of the invention includes an improved procedure for searching and retrieving applications from the store of applications distributed throughout network 10; e.g., server 205, cache/concentrator 302 and RS 400. More specifically, the procedure features use of pre-created search tables which represent subsets of the information on the network arranged with reference to the page template objects (PTO) and object-ids of the available applications so that in accordance with the procedure, the relevant tables and associated objects can be provided to and searched at the requesting RS 400 without need to search the entire store of applications on the network. As will be appreciated, this reduces the demand on the server 205 for locating and retrieving applications for display at monitor 412.

In conventional time-sharing networks that support large conventional databases, the host receives user requests for data records; locates them; and transmits them back to the users. Accordingly, the host is obliged to undertake the data processing necessary to isolate and supply the requested information. And, as noted earlier, where large numbers of users are to be served, the many user requests can bottleneck at the host, taxing resources and leading to response slowdown.

Further, users have experienced difficulty in searching data bases maintained on conventional time-sharing networks. For example, difficulties have resulted from the complex and varied way previously known database suppliers have organized and presented their information. Particularly, some database providers require searching be done only in selected fields of the data base, thus requiring the user to be fully familiar with the record structure. Others have organized their databases on hierarchial structures which require the user understand the way the records are grouped. Still further, yet other database suppliers rely upon keyword indices to facilitate searching of their records, thus requiring the user to be knowledgeable regarding the particular keywords used by the database provider.

The method aspect of the present invention, however, serves to avoid such difficulties. In the preferred embodiment, the invention includes procedures for creating preliminary searches which represent subsets of the network applications users are believed likely to investigate. Particularly, in accordance with these procedures, for the active applications available on network 10, a library of tables is prepared, and maintained within each of which a plurality of so called "keywords" are provided that are correlated with page template objects and object-ids of the entry screen (typically the first screen) for the respective application. In the preferred embodiment, approximately 1,000 tables are used, each having approximately 10 to 20 keywords arranged in alphabetical order to abstract the applications on the network. Further, the object-id for each table is associated with a code in the form of a character string mnemonic which is arranged in a set of alphabetically sequenced mnemonics termed the sequence set so that on entry of a character string at an RS 400, the object-id for the relevant keyword table can be obtained from the sequence set. Once the table object-id is identified, the keyword table corresponding to the desired subset of the objects and associated applications can then be obtained from network 10. Subsequently the table can be presented to the user's RS 400, where the RS 400 can provide the data processing required to present the potentially relevant keywords, objects and associated applications to the user for further review and determination as to whether more searching is required. As will be appreciated, this procedure reduces demand on server 205 and thereby permits it to be less complex and costly, and further, reduces the likelihood of host overtaxing that may cause network response slowdown.

As a further feature of this procedure, the library of keywords and their associated PTOs and objects may be generated by a plurality of operations which appear at the user's screen as different search techniques. This permits the user to select a search technique he is most comfortable with, thus expediting his inquiry.

More particularly, in accordance with the invention, the user is allowed to invoke the procedure by calling up a variety of operations. The various operations have different names and seemingly present different search strategies. Specifically, the user may invoke the procedure by initiating a "Jump" command at RS 400. Thereafter, in connection with the Jump operation, the user, when prompted, may enter a word of the user's choosing at monitor screen 414 relating to the matter he is interested in locating; i.e., a subject matter search of the network applications. Additionally, the users may invoke the procedure by alternatively calling up an operation termed "Index" with selection of the Index command. When selected, the Index command presents the user with an alphabetical listing of keywords from the tables noted above which the user can select from; i.e., an alphabetical search of the network applications. Further, the user may evoke the procedure by initiating an operation termed "Guide." By selecting the Guide command, the user is provided with a series of graphic displays that presents a physical description of the network applications; e.g., department floor plan for a store the user may be electronically shopping in. Still further, the user may invoke the procedures by initiating an operation termed "Directory." By selecting the Directory command, the user is presented with the applications available on the network as a series of hierarchial menus which present the content of the network information in commonly understood categories. Finally, the user may invoke the procedure by selecting the "Path" command, which accesses a list of keywords the user has previously selected; i.e., a personally tailored form of the Index command described above. As described hereafter, Path further includes a Viewpath operation which permits the user to visually access and manage the Path list of keywords. In preferred form, where the user has not selected a list of personalized keywords, a default set is provided which includes a predetermined list and associated applications deemed by network 10 as likely to be of interest to the user.

In accordance with the invention, this ability to convert these apparently different search strategies in a single procedure for accessing pre-created library tables is accomplished by translating the procedural elements of the different search techniques into a single set of procedures that will produce a mnemonic; i.e., code word, which can first be searched at the sequence set, described above to identify the object-id for the appropriate library table and, thereafter, enable access of the appropriate table to permit selection of the desired keyword and associated PTO and object-ids. That is to say, the reception system native code simply relates the user-entered character string, alphabetical range, category, or list item of respectively, "Jump", "Index", "Directory", or "Path" to the table codes through the sequence set, so that the appropriate table can be provided to the reception system and application keyword selected. Thus, while the search techniques may appear different to the user and in fact accommodate the user's preferences and sophistication level, they nonetheless invoke the same efficient procedure of relying upon pre-created searches which identify related application PTOs and object-ids so that the table and objects may be collected and presented at the user's RS 400 where they can be processed, thereby relieving server 205.

In preferred form, however, in order to enhance presentation speed the Guide operation is specially configured. Rather than relating the keyword mnemonic to a sequence set to identify the table object-id and range of keywords corresponding to the entry PTO and associated object-ids, the Guide operation presents a series of overlapping windows that physically describe the "store" in which shopping is being conducted or the "building" from which information is being provided. The successive windows increase in degree of detail, with the final window presenting a listing of relevant keywords. Further, the PTO and object-ids for the application entry screen are directly related to the graphic presentation of the keywords. This eliminates the need to provide variable fields in the windows for each of the keywords and enables the entry screen to be correlated directly with the window graphic. As will be appreciated, this reduces the number of objects that would otherwise be required to be staged at RS 400 to support pretention of the keyword listing at monitor screen 414, and thus speeds network response.

Figure 11:
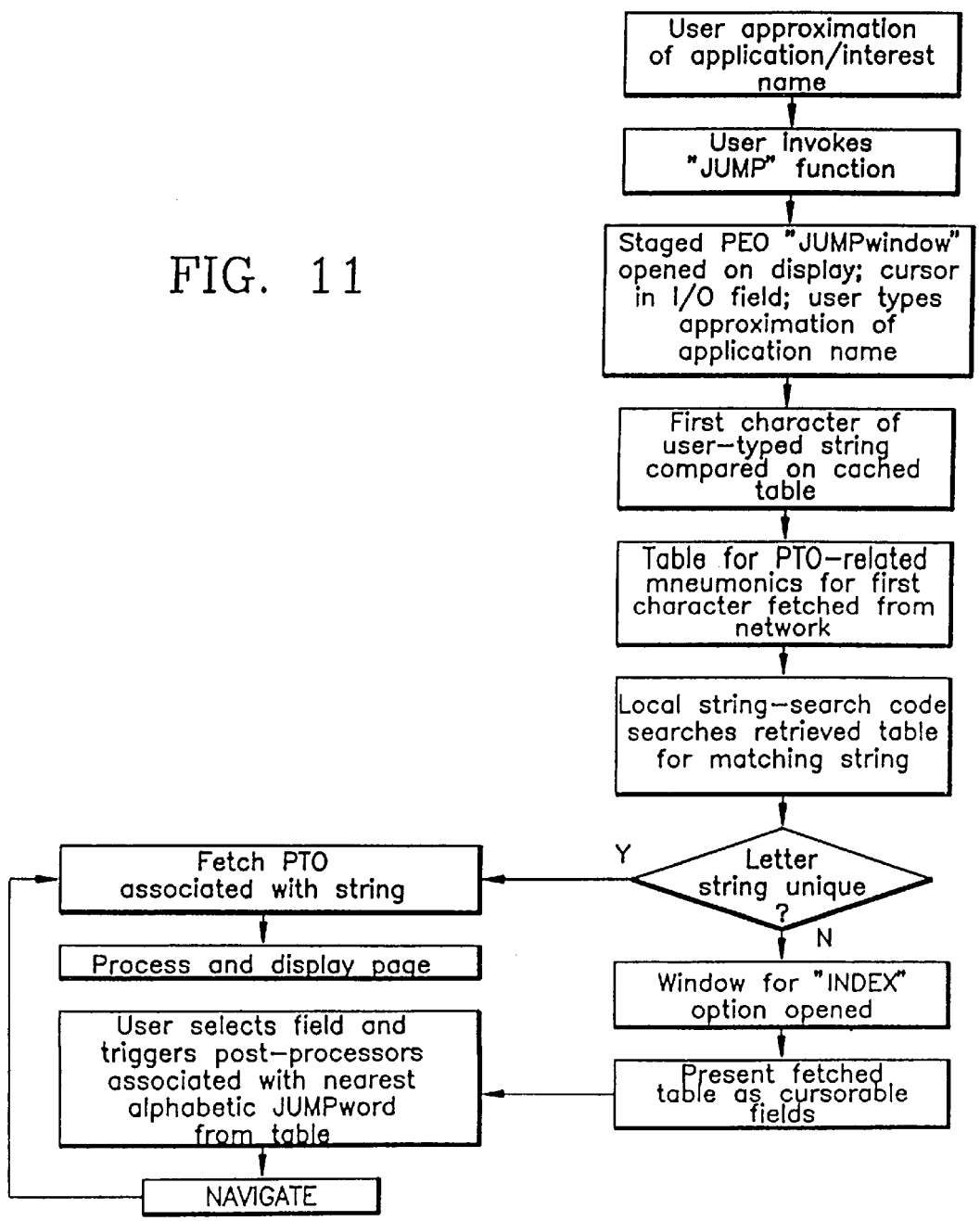
FIG. 11 is a flow diagram for an aspect of the navigation method in accordance with the invention.

A more detailed understanding of the procedure may be had upon a reading of the following description and review of accompanying FIGS. 2, 3*a* and particularly FIG. 11 which presents a flow diagram for the Jump sequence of the search procedure.

To select a particular partitioned application from among thousands of such applications residing either at the RS 400 or within delivery system 20, the present invention avoids the need for a user to know or understand, prior to a search, the organization of such partitioned applications and the query techniques necessary to access them. This is accomplished using a collection of related commands, as described below.

The Jump command 296 as seen in FIG. 3*a*, can be selected, by the user from command bar 290. When Jump command 296 is selected, a window partition 275 is opened. In window 275, the user is presented and may select from a variety of displayed options that include among others, the Directory command, the Index command, and the Guide command, which when selected, have the effect noted above. Additionally, the user can select a command termed Viewpath which will presents the keywords that currently make up the list of keywords associated with the user's Path command, and from which list the user can select a desired keyword. Still further, and with reference FIG. 11, which shows the sequence where a user offers a term to identify a subject of interest, the user may enter a keyword at display field 270 within window partition 275 as a "best guess" of the mnemonic character string that is assigned to a partitioned application the user desires (e.g., the user may input such english words as "news," "pet food," "games," etcetera). Where the user enters a character string it is displayed in field 270, and then searched by RS 400 native code (discussed below) against the sequence sets above noted to identify the object-id for the appropriate table of keywords (not shown) that RS 400 may request from host 205. While as noted above, a table may include 10 to 20 keywords, in the preferred embodiment, for the sake of speed and convenience, a typical keyword table includes approximately 12 keywords.

If the string entered by the user matches a keyword existing one of the keyword tables, and is thus associated with a specific PTO, RS 400 fetches and displays associated objects of the partitioned applications and builds the entry page in accordance with the page composition dictated by the target PTO.

If the string entered by the user does not match a specific keyword, RS 400 presents the user with the option of displaying the table of keywords approximating the specific keyword. The approximate keywords are presented as initialized, cursorable selector fields of the type provided in connection with a Index command. The user may then move the cursor to the nearest approximation of the mnemonic he originally selected, and trigger navigation to the PTO associated with that keyword, navigation being as described hereafter in connection with the RS 400 native code.

If, after selecting the Jump command, the user selects the Index command, RS 400 will retrieve the keyword table residing at RS 400, and will again build a page with initialized, cursorable fields of keywords. The table fetched upon invoking the Index command will be comprised of alphabetic keywords that occur within the range of the keywords associated with the page template object (PTO) from which the user invoked the Index command. As discussed above, the user may select to navigate to any of this range of PTOs by selecting the relevant keyword from the display. Alternatively, the user can, thereafter, select another range of alphabetical keywords by entering an appropriate character string in a screen field provided or move forward or backward in the collection by selecting the corresponding option.

By selecting the Directory command, RS 400 can be caused to fetch a table of keywords, grouped by categories, to which the PTO of the current partitioned application (as specified by the object set field 630 of the current PEO) belongs. Particularly, by selecting the Directory command, RS 400, is causes to displays a series of screens each of which contains alphabetically arranged general subject categories from which the user may select. Following selection of a category, a series of keywords associated with the specified category are displayed in further screens together with descriptive statements about the application associated with the keywords. Thereafter, the user can, in the manner previously discussed with regard to the Index command, select from and navigate to the PTOs of keywords which are related to the present page set by subject.

The Guide command provides a navigation method related to a hierarchical organization of applications provided on network 10, and are described by a series of sequentially presented overlaying windows of a type known in the art, each of which presents an increasing degree of detail for a particular subject area, terminating in a final window that gives keywords associated with the relevant applications. The Guide command makes use of the keyword segment which describes the location of the PTO in a hierarchy (referred to, in the preferred embodiment, as the "BFD," or Building-Floor-Department) as well an associated keyword character string. The BFD describes the set of menus that are to be displayed on the screen as the sequence of pop-up windows. The Guide command may be invoked by requesting it from the Jump window described above, or by selecting the Menu command on Command Bar 290. As noted above, in the case of the Guide command on the PTO and object-ids for the application entry screen are directly associated with the graphic of the keyword presented in the final pop-up window. This enables direct access of the application entry screen without need to access the sequence set and keyword table, and thus, reduces response time by reducing the number of objects that must be processed at RS 400.

Activation of the Path command accesses the user's list of pre-selected keywords without their display, and permits the user to step through the list viewing the respective applications by repeatedly invoking the Path command. As will be appreciated, the user can set a priority for selecting keywords and viewing their associated applications by virtue of where on the list the user places the keywords. More specifically, if the user has several application of particular interest; e.g., news, weather, etc., the user can place them at the top of the list, and quickly step through them with the Path command. Further, the user can view and randomly access the keywords of his list with the Viewpath operation noted above. On activation of Viewpath, the user's Path keywords are displayed and the user can cursor through them in a conventional manner to select a desired one. Further, the user can amend the list as desired by changing the keywords on the list and/or adjusting their relative position. This is readily accomplished by entering the amendments to the list presented at the screen 414 with a series of amendment options presented in a conventional fashion with the list. As noted, the list may be personally selected by the user in the manner described, or created as a default by network 10.

Collectively, the Jump command, Index command, Directory command, Guide command, and Path command as described enable the user to quickly and easily ascertain the "location" of either the partitioned application presently displayed or the "location" of a desired partitioned application. "Location," as used in reference to the preferred embodiment of the invention, means the specific relationships that a particular partitioned application bears to other such applications, and the method for selecting particular partitioned applications from such relationships. The techniques for querying a database of objects, embodied in the present invention, is an advance over the prior art, insofar as no foreknowledge of either database structure or query technique or syntax is necessary, the structure and search techniques being made manifest to the user in the course of use of the commands.

RS APPLICATION PROTOCOL

RS protocol defines the way the RS supports user application conversation (input and output) and the way RS 400 processes a partitioned application. Partitioned applications are constructed knowing that this protocol will be supported unless modified by the application. The protocol is illustrated FIG. 6. The boxes in FIG. 6 identify processing states that the RS 400 passes through and the arrows indicate the transitions permitted between the various states and are annotated with the reason for the transition.

The various states are: (A) Initialize RS, (B) Process Objects, (C) Interpretively Execute Pre-processors, (D) Wait for Event, (E) Process Event, and (F) Interpretively Execute Function Extension and/or Post-processors.

The transitions between states are: (1a) Logon Page Template Object Identification (PTO-id), (1b) Object Identification, (2) Trigger Program Object identification (PO-id) & return, (3) Page Partition Template (PPT) or Window Stack Processing complete, (4) Event Occurrence, and (5) Trigger PO-id and Return.

Transition (1a) from Initialize RS (A) to Process Objects (B) occurs when an initialization routine passes the object-id of the logon PTO to object interpreter 435, when the service is first invoked. Transition (1b) from Process Event (E) to Process Object (B) occurs whenever a navigation event causes a new page template object identification (PTO-id) to be passed to object interpreter 435; or when a open window event (verb or function key) occurs passing a window object-id to the object interpreter 435; or a close window event (verb or function key) occurs causing the current top-most window to be closed.

Figure 10:
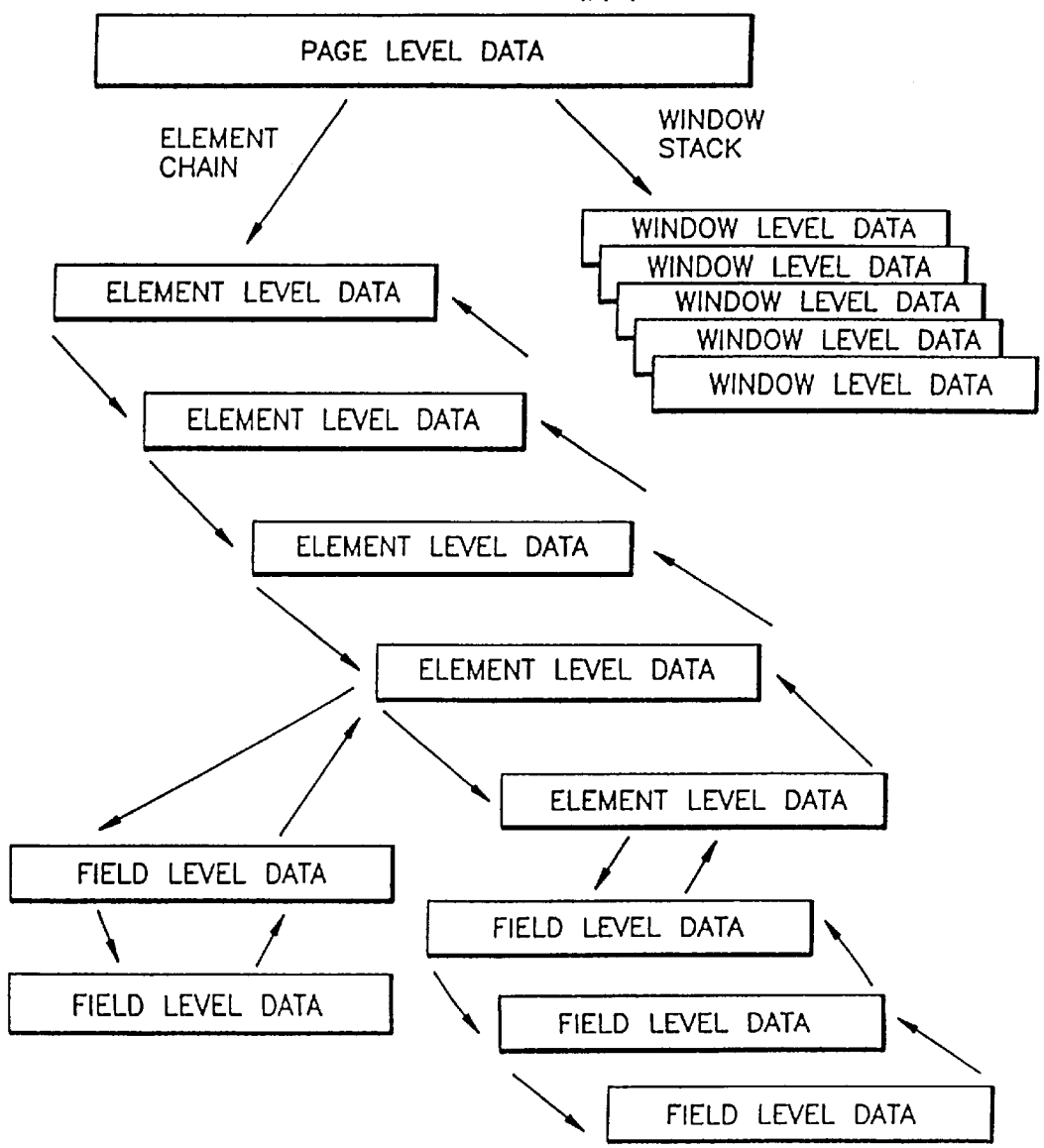
FIG. 10 illustrates generation of a page with a page processing table in accordance with the invention.

While in the process object state, object interpreter 435 will request any objects that are identified by external references in call segments. Objects are processed by parsing and interpreting the object and its segments according to the specific object architecture. As object interpreter 435 processes objects, it builds a linked list structure called a page processing table (PPT), shown in FIG. 10, to reflect the structure of the page, each page partition, Page Element Objects (PEOs) required, program objects (POs) required and each window object (WO) that could be called. Object interpreter 435 requests all objects required to build a page except objects that could be called as the result of some event, such as a HELP window object.

Transition (2) from Process Objects (B) to Interpretively Execute Pre-processors (C) occurs when the object interpreter 435 determines that a pre-processor is to be triggered. Object processor 436 then passes the object-id of the program object to the TBOL interpreter 438. TBOL interpreter 438 uses the RS virtual machine to interpretively execute the program object. The PO can represent either a selector or an initializer. When execution is complete, a transition automatically occurs back to Process Objects (B).

Selectors are used to dynamically link and load other objects such as PEOs or other PDOs based upon parameters that they are passed when they are called. Such parameters are specified in call segments or selector segments. This feature enables RS 400 to conditionally deliver information to the user base upon predetermined parameters such as his personal demographics or locale. For example, the parameters specified may be the transaction codes required to retrieve the user's age, sex, and personal interest codes from records contained in user profiles stored at the switch/file server layer 200. Initializers are used to set up the application processing environment for a partitioned application and determine what events RS 400 may respond to and what the action will be.

Transition (3) from Process Objects (B) to Wait for Event (D) occurs when object interpreter 435 is finished processing objects associated with the page currently being built or opening or closing a window on a page. In the Wait for Event state (D), an input manager, which in the preferred form shown includes keyboard manager 434 seen in FIG. 8, accepts user inputs. All keystrokes are mapped from their physical codes to logical keystrokes by the Keyboard Manager 434, representing keystrokes recognized by the RS virtual machine.

When the cursor is located in a field of a page element keystrokes are mapped to the field and the partitioned external variable (PEV) specified in the page element object (PEO) field definition segment by the cooperative action of keyboard manager, 434 and display manager 461. Certain inputs, such as RETURN or mouse clicks in particular fields, are mapped to logical events by keyboard manager 434, which are called completion (or commit) events. Completion events signify the completion of some selection or specification process associated with the partitioned application and trigger a partition level and/or page level post-processor to process the "action" parameters associated with the user's selection and commit event.

Such parameters are associated with each possible choice or input, and are set up by the earlier interpretive execution of an initializer pre-processor in state (C). Parameters usually specify actions to perform a calculation such as the balance due on an order of several items with various prices using sales tax for the user's location, navigate to PTO-id, open window WO-id or close window. Actions parameters that involve the specification of a page or window object will result in transition (1b) to the Process Objects (B) state after the post-processor is invoked as explained below.

Function keys are used to specify one or more functions which are called when the user strikes these keys. Function keys can include the occurrence of logical events, as explained above. Additionally certain functions may be "filtered", that is, extended or altered by SET_FUNCTION or TRIGGER_FUNCTION verbs recognized by the RS virtual machine. Function keys cause the PO specified as a parameter of the verb to be interpretively executed whenever that function is called. Applications use this technique to modify or extend the functions provided by the RS.

Transition (5) from Process Event (E) to Interpretively Execute Pre-processors (F) occurs when Process Event State determines that a post-processor or function extension PDO is to be triggered. The id of the program object is then passed to the TBOL interpreter 438. The TBOL interpreter 438 uses the RS virtual machine to interpretively execute the PO. When execution is complete a transition automatically occurs back to Process Event (E).

RECEPTION SYSTEM SOFTWARE

The reception system 400 software is the interface between the user of personal computer 405 and interactive network 10. The object of reception system software is to minimize mainframe processing, minimize transmission across the network, and support application extendibility and portability.

Figure 7:
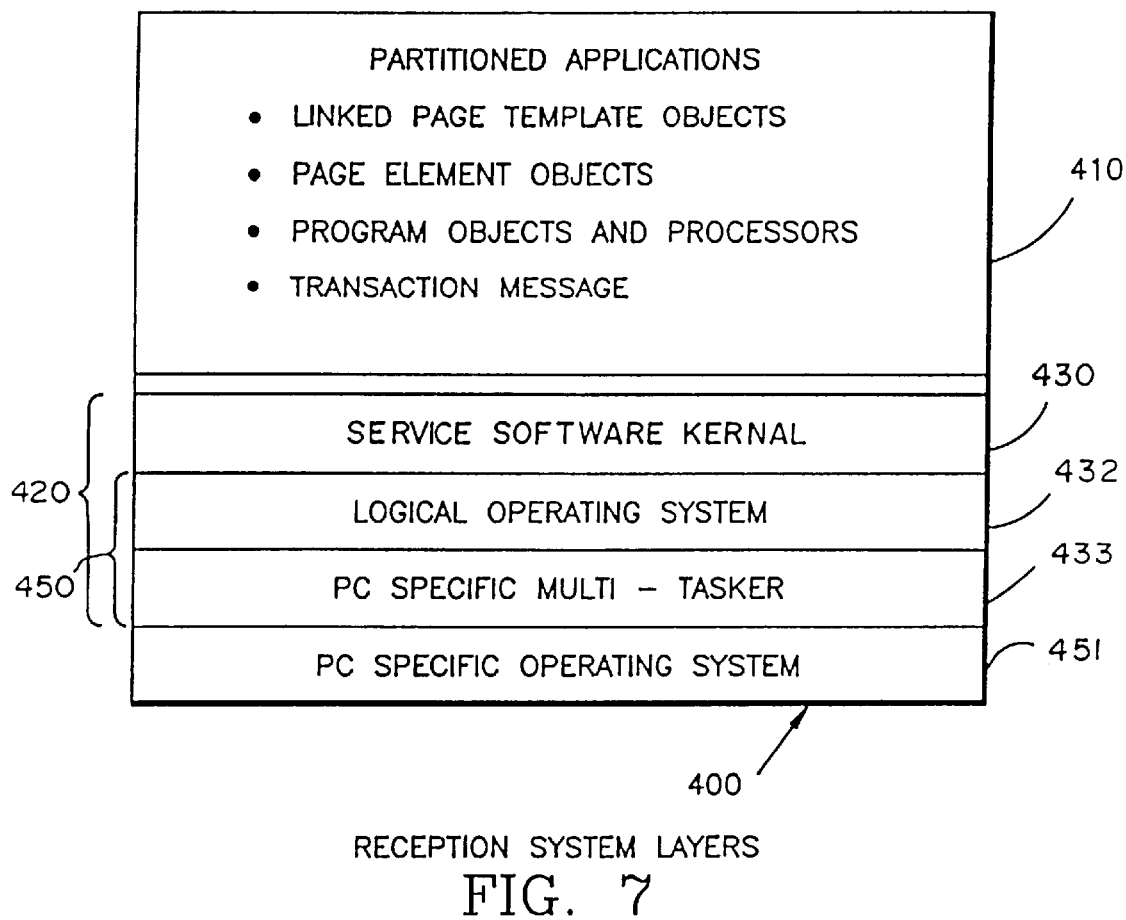
FIG. 7 is a schematic diagram that illustrates major layers of the reception system in accordance with the invention.

RS 400 software is composed of several layers, as shown in FIG. 7. It includes external software 451, which is composed of elements well known to the art such as device drivers, the native operating systems; i.e., MS-DOS, machine-specific assembler functions (in the preferred embodiment; e.g., CRC error checking), and "C" runtime library functions; native software 420; and partitioned applications 410.

Again with reference to FIG. 7, native software 420 is compiled from the "C" language into a target machine-specific executable, and is composed of two components: the service software 430 and the operating environment 450.

Operating environment 450 is comprised of the Logical Operating System 432, or LOS; and a multitasker 433. Service software 430 provides functions specific to providing interaction between the user and interactive network 10, while the operating environment 450 provides pseudo multitasking and access to local physical resources in support of service software 430. Both layers of native software 420 contain kernel, or device independent functions 430 and 432, and machine-specific or device dependent functions 433. All device dependencies are in code resident at RS 400, and are limited to implementing only those functions that are not common across machine types, to enable interactive network 10 to provide a single data stream to all makes of personal computer which are of the IBM or IBM compatible type. Source code for the native software 420 is included in parent application Ser. No. 388,156 now issued as U.S. Pat. No. 5,347,632, the contents of which patent are incorporated herein by reference. Those interested in a more detailed description of the reception system software may refer to the source code provided in the referenced patent.

Figure 8:
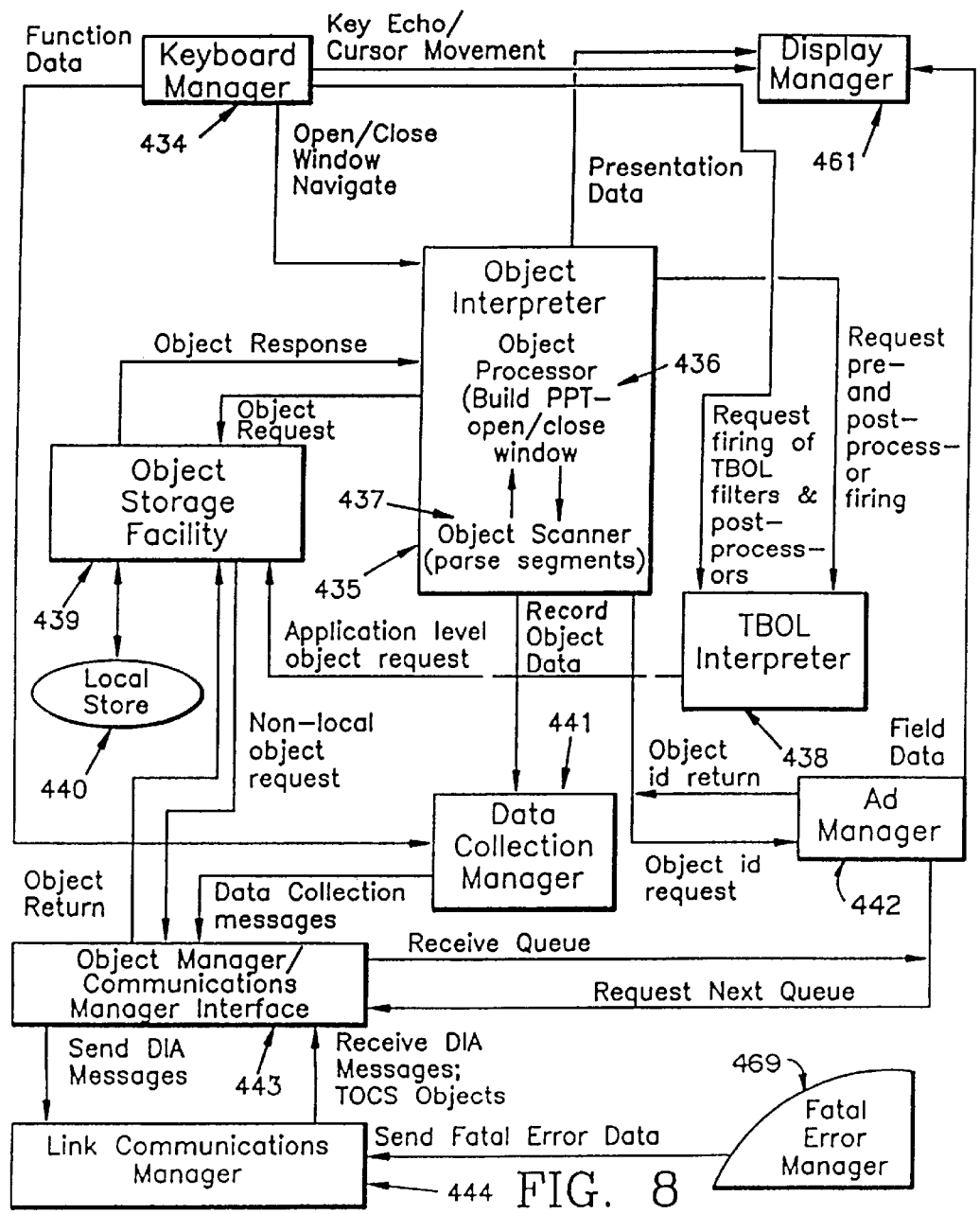
FIG. 8 is a block diagram that illustrates native code modules of the reception system in accordance with the invention.

Service software 430 is comprised of modules, which are device-independent software components that together obtain, interpret and store partitioned applications existing as a collection of objects. The functions performed by, and the relationship between, the service software 430 module is shown in FIG. 8 and discussed further below.

Through facilities provided by LOS 432 and multitasker 433, here called collectively operating environment 450, device-independent multitasking and access to local machine resources, such as multitasking, timers, buffer management, dynamic memory management, file storage and access, keyboard and mouse input, and printer output are provided. The operating environment 450 manages communication and synchronization of service software 430, by supporting a request/response protocol and managing the interface between the native software 420 and external software 437.

Applications software layer 410 consists of programs and data written in an interpretive language, "TRINTEX Basic Object Language" or "TBOL," described above. TBOL was written specifically for use in RS 400 and interactive network 10 to facilitate videotext-specific commands and achieve machine-independent compiling. TBOL is constructed as objects, which in interaction with one another comprise partitioned applications.

RS native software 420 provides a virtual machine interface for partitioned applications, such that all objects comprising partitioned applications "see" the same machine. RS native software provides support for the following functions: (1) keyboard and mouse input; (2) text and graphics display; (3) application interpretation; (4) application database management; (5) local application storage; (6) network and link level communications; (7) user activity data collection; and (8) advertising management.

With reference to FIG. 8, service software 430 is comprised of the following modules: start-up (not shown); keyboard manger 434; object interpreter 435; TBOL interpreter 438; object storage facility 439; display manager 461; data collection manager 441; ad manager 442; object/communications manager interface 443; link communications manager 444; and fatal error manager 469. Each of these modules has responsibility for managing a different aspect of RS 400.

Startup reads RS 400 customization options into RAM, including modem, device driver and telephone number options, from the file CONFIG.SM. Startup invokes all RS 400 component startup functions, including navigation to the first page, a logon screen display containing fields initialized to accept the user's id and password. Since Startup is invoked only at initialization, for simplicity, it has not been shown in FIG. 8.

The principal function of keyboard manger 434 is to translate personal computer dependent physical input into a consistent set of logical keys and to invoke processors associated with these keys. Depending on the LOS key, and the associated function attached to it, navigation, opening of windows, and initiation of filter or post-processor TBOL programs may occur as the result input events handled by the keyboard manger 434. In addition, keyboard manger 434 determines inter and intra field cursor movement, and coordinates the display of field text and cursor entered by the user with display manager 461, and sends information regarding such inputs to data collection manager 441.

Object interpreter 435 is responsible for building and recursively processing a table called the "Page Processing Table," or PPT. Object interpreter 435 also manages the opening and closing of windows at the current page. Object interpreter 435 is implemented as two sub-components: the object processor 436 and object scanner 437.

Object processor 436 provides an interface to keyboard manger 434 for navigation to new pages, and for opening and closing windows in the current page. Object processor 436 makes a request to object storage facility 439 for a page template object (PTO) or window object (WO), as requested by keyboard manger 434, and for objects and their segments which comprise the PTO or WO returned by object storage facility 439 to object processor 436. Based on the particular segments comprising the object(s) making up the new PTO or WO, object processor 436 builds or adds to the page processing table (PPT), which is an internal, linked list, global data structure reflecting the structure of the page or page format object (PFO), each page partition or page element object (PEO), and program objects (POs) required and each window object (WO) that could be called. Objects are processed by parsing and interpreting each object and its segment(s) according to their particular structure as formalized in the data object architecture (DOA). While in the process object state, (state "B" of FIG. 6), object processor 436 will request any objects specified by the PTO that are identified by external references in call segments (e.g. field level program call 518, page element selector call 524, page format call 526 program call 532, page element call 522 segments) of such objects, and will, through a request to TBOL interpreter 438, fire initializers and selectors contained in program data segments of all PTO constituent program objects, at the page, element, and field levels. Object processor 436 requests all objects required to build a page, except objects that could only be called as the result of some event external to the current partitioned application, such as a HELP window object. When in the course of building or adding to the PPT and opening/closing WOs, object processor encounters a call to an "ADSLOT" object id, the next advertising object id at ad manager 442 is fetched, and the identified advertising object is retrieved either locally, if available, or otherwise from the network, so that the presentation data for the advertising can be sent to display manager 461 along with the rest of the presentation data for the other objects to enable display to the user. Object processor 436 also passes to data collection manager 441 all object ids that were requested and object ids that were viewed. Upon completion of page or window processing, object processor 436 enters the wait for event state, and control is returned to keyboard manger 434.

The second component of object interpreter 435, object scanner 437, provides a file-like interface, shared with object storage facility 439, to objects currently in use at RS 400, to enable object processor 436 to maintain and update the PPT. Through facilities provided by object scanner 437, object processor recursively constructs a page or window in the requested or current partitioned application, respectively.

Object storage facility 439 provides an interface through which object interpreter 435 and TBOL interpreter 438 either synchronously request (using the TBOL verb operator "GET") objects without which processing in either module cannot continue, or asynchronously request (using the TBOL verb operator "FETCH") objects in anticipation of later use. Object storage facility 439 returns the requested objects to the requesting module once retrieved from either local store 440 or interactive network 10. Through control structures shared with the object scanner 437, object storage facility determines whether the requested object resides locally, and if not, makes an attempt to obtain it from interactive network 10 through interaction with link communications manager 444 via object/communications manager interface 443.

When objects are requested from object storage facility 439, only the latest version of the object will be provided to guarantee currency of information to the user. Object storage facility 439 assures currency by requesting version verification from network 10 for those objects which are available locally and by requesting objects which are not locally available from delivery system 20 where currency is maintained.

Version verification increases response time. Therefore, not all objects locally available are version checked each time they are requested. Typically, objects are checked only the first time they are requested during a user session. However, there are occasions, as for example in the case of objects relating to news applications, where currency is always checked to assure integrity of the information.

The frequency with which the currency of objects is checked depends on factors such as the frequency of updating of the object. For example, objects that are designated as ultrastable in a storage control parameter in the header of the object are never version checked unless a special version control object sent to the RS as part of logon indicates that all such objects must be version checked. Object storage facility 439 marks all object entries with such a stability category in all directories indicating that they must be version checked the next time they are requested.

Object storage facility 439 manages objects locally in local store 440, comprised of a cache (segmented between available RAM and a fixed size disk file), and stage (fixed size disk file). Ram and disk cached objects are retained only during user sessions, while objects stored in the stage file are retained between sessions. The storage control field, located in the header portion of an object, described more fully hereafter as the object "storage candidacy", indicates whether the object is stageable, cacheable or trashable.

Stageable objects must not be subject to frequent change or update. They are retained between user sessions on the system, provided storage space is available and the object has not discarded by a least-recently-used (LRU) algorithm of a conventional type; e.g., see *Operating System Theory*, by Coffman, Jr. and Denning, Prentice Hall Publishers, New York, 1973, which in accordance with the invention, operates in combination with the storage candidacy value to determine the object storage priority, thus rendering the stage self-configuring as described more fully hereafter.

Over time, the self-configuring stage will have the effect of retaining within local disk storage those objects which the user has accessed most often. The objects retained locally are thus optimized to each individual user's usage of the applications in the system. Response time to such objects is optimized since they need not be retrieved from the interactive computer system.

Cacheable objects can be retained during the current user session, but cannot be retained between sessions. These objects usually have a moderate update frequency. Object storage facility 439 retains objects in the cache according to the LRU storage retention algorithm. Object storage facility 439 uses the LRU algorithm to ensure that objects that are least frequently used forfeit their storage to objects that are more frequently used.

Trashable objects can be retained only while the user is in the context of the partitioned application in which the object was requested. Trashable objects usually have a very high update frequency and must not be retained to ensure that the user has access to the most current data.

More particularly and, as noted above, in order to render a public informational and transactional network of the type considered here attractive, the network must be both economical to use and fast. That is to say, the network must supply information and transactional support to the user at minimal costs and with a minimal response time. In accordance with the present invention, these objectives are sought to be achieved by locating as many information and transactional support objects which the user is likely to request, as close to the user as possible; i.e., primarily at the user's RS 400 and secondarily at delivery system 20. In this way, the user will be able to access objects required to support a desired application with minimal intervention of delivery system 20, thus reducing the cost of the session and speeding the response time.

However, the number of objects that can be maintained at RS 400 is restricted by at least two factors: the RS 400 storage capacity; i.e., RAM and disk sizes, and the need to maintain the stored objects current.

In accordance with the method aspect of the invention, in order to optimize the effectiveness of the limited storage space at RS 400, the collection of objects is restricted to those likely to be requested by the user; i.e., tailored to the user's tastes—and to those least likely to be time sensitive; i.e., objects which are stable. To accomplish this, objects are coded for storage candidacy to identify when they will be permitted at RS 400, and subject to the LRU algorithm to maintain presence at RS 400. Additionally, to assure currency of the information and transaction support provided at RS 400, objects are further coded for version identification and checking in accordance with a system of priorities that are reflected in the storage candidacy coding.

Specifically, to effect object storage management, objects are provided with a coded version id made up of the storage control byte and version control bytes identified above as elements of the object header, specifically, bytes 16 and 18 shown in FIG. 4*b*. In preferred form, the version id is comprised of bytes 16 and 18 to define two fields, a first 13 bit field to identify the object version and a second three bite field to identify the object storage candidacy. In this arrangement, the storage candidacy value of the object is addressed to not only the question of storage preference but also object currency. Specifically, the storage candidacy value establishes the basis upon which the object will be maintained at RS 400 and also identifies the susceptibility of the object to becoming stale by dictating when the object will be version checked to determine currency.

The version value of the object on the other hand, provides a parameter that can be checked against predetermined values available from delivery system 20 to determine whether an object stored at RS 400 is sufficiently current to permit its continued use, or whether the object has become stale and needs to be replaced with a current object from delivery system 20.

Still further, in accordance with the invention, object storage management procedure further includes use of the LRU algorithm, for combination with the storage and version coding to enable discarding of objects which are not sufficiently used to warrant retention, thus personalizing the store of objects at RS 400 to the user's tastes. Particularly, object storage facility 439, in accordance with the LRU algorithm maintains a usage list for objects. As objects are called to support the user's applications requests, the objects are moved to the top of a usage list. As other objects are called, they push previously called objects down in the list. If an object is pushed to the bottom of the list before being recalled, it will be forfeited from the list if necessary to make room for the next called object. As will be appreciated, should a previously called object be again called before it is displaced from the list, it will be promoted to the top of the list, and once more be subject to depression in the list and possible forfeiture as other objects are called.

As pointed out above, in the course of building the screens presented to the user, objects will reside at various locations in RS 400. For example, objects may reside in the RS 400 RAM where the object is supporting a particular application screen then running or in a cache maintained at either RAM or disk 424 where the object is being held for an executing application or staged on the fixed size file on disk 424 noted above where the object is being held for use in application likely to be called by the user in the future.

In operation, the LRU algorithm is applied to all these regions and serves to move an object from RAM cache to disk cache to disk file, and potentially off RS 400 depending on object usage.

With regard to the storage candidacy value, in this arrangement, the objects stored at RS 400 include a limited set of permanent objects; e.g., those supporting logon and logoff, and other non-permanent objects which are subject to the LRU algorithm to determine whether the objects should be forfeited from RS 400 as other objects are added. Thus, in time, and based on the operation of the LRU algorithm and the storage candidacy value, the collection of objects at RS 400 will be tailored to the usage characteristics of the subscriber; i.e., self-configuring.

More particularly, the 3-bit field of the version id that contains the storage candidacy parameter can have 8 different values. A first candidacy value is applied where the object is very sensitive to time; e.g., news items, volatile pricing information such as might apply to stock quotes, etc. In accordance with this first value, the object will not be permitted to be stored on RS 400, and RS 400 will have to request such objects from delivery system 20 each time it is accessed, thus, assuring currency. A second value is applied where the object is sensitive to time but less so than the first case; e.g., the price of apples in a grocery shopping application. Here, while the price might change from day to day, it is unlikely to change during a session. Accordingly the object will be permitted to persist in RAM or at the disk cache during a session, but will not be permitted to be maintained at RS 400 between sessions.

Continuing down the hierarchy of time sensitivity, where the object concerns information sufficiently stable to be maintained between sessions, a third storage candidacy value is set to permit the object to be stored at RS 400 between sessions, on condition that the object will be version check the first time it is accessed in a subsequent session. As will be appreciated, during a session, and under the effect of the LRU algorithm, lack of use at RS 400 of the object may result in it being forfeited entirely to accommodate new objects called for execution at RS 400.

Still further, a fourth value of storage candidacy is applied where the object is considered sufficiently stable as not to require version checking between sessions; e.g., objects concerning page layouts not anticipated to change. In this case, the storage candidacy value may be encoded to permit the object to be retained from session to session without version checking. Here again, however, the LRU algorithm may cause the object to forfeit its storage for lack of use.

Where the object is of a type required to be stored at RS 400, as for example, objects needed to support standard screens, it is coded for storage between sessions and not subject to the LRU algorithm forfeiture. However, where such objects are likely to change in the future they may be required to be version checked the first time they are accessed in a session and thus be given a fifth storage candidacy value. If, on the other hand, the required stored object is considered likely to be stable and not require even version checking; e.g., logon screens, it will be coded with a sixth storage candidacy value for storage without version checking so as to create a substantially permanent object.

Continuing, where a RS 400 includes a large amount of combined RAM and disk capacity, it would permit more objects to be stored. However, if objects were simply coded in anticipation of the larger capacity, the objects would potentially experience difficulty, as for example, undesired forfeiture due to capacity limitations if such objects were supplied to RS 400 units having smaller RAM and disk sizes. Accordingly, to take advantage of the increased capacity of certain RS 400 units without creating difficulty in lower capacity units, objects suitable for storage in large capacity units can be so coded for retention between sessions with a seventh and eighth storage candidacy value depending upon whether the stored large capacity object requires version checking or not. Here, however, the coding will be interpreted by smaller capacity units to permit only cacheable storage to avoid undesirable forfeiture that might result from over filling the smaller capacity units.

Where an object is coded for no version checking need may nonetheless arise for a version check at some point. To permit version checking of such objects, a control object is provided at RS 400 that may be version checked on receipt of a special communication from delivery system 20. If the control object fails version check then a one shot version checking attribute is associated with all existing objects in RS 400 that have no version checking attributes. Thereafter, the respective objects are version checked, the one shot check attribute is removed and the object is caused to either revert to its previous state if considered current or be replaced if stale.

Still further, objects required to be stored at RS 400 which are not version checked either because of lack of requirement or because of no version check without a control object, as described above, can accumulate in RS 400 as dead objects. To eliminate such accumulation all object having required storage are version checked over time. Particularly, the least recently used required object is version checked during a session thus promoting the object to the top of the usage list if it is still to be retained at RS 400.

Accordingly, one such object will be checked per session and over time, all required objects will be version checked thereby eliminating the accumulation of dead objects.

However, in order to work efficiently, the version check attribute of the object should be ignored, so that even required object can be version checked. Yet, in certain circumstances, e.g., during deployment of new versions of the reception system software containing new objects not yet supported on delivery system 20 which may be transferred to the fixed storage file of RS 400 when the new version is loaded, unconditional version checking may prematurely deletes the object from the RS 400 as not found on delivery system 20. To avoid this problem, a sweeper control segment in the control object noted above can be used to act as a switch to turn the sweep of dead objects on and off.

With respect to version checking for currency, where an object stored at RS 400 is initially fetched or accessed during a session a request to delivery system 20 is made for the object by specifying the version id of the object stored at RS 400.

In response, delivery system 20 will advise the reception system 400 either that the version id of the stored object matches the currency value; i.e., the stored object is acceptable, or deliver a current object that will replace the stored object shown to be stale Alternatively, the response may be that the object was not found. If the version of the stored object is current, the stored object will be used until verified again in accordance with its storage candidacy. If the stored object is stale, the new object delivered will replace the old one and support the desired screen. If the response is object not found, the stored object will be deleted.

Therefore, based on the above description, the method aspect of the invention is seen to include steps for execution at storage facility 439 which enables object reception, update and deletion by means of a combination of operation of the LRU algorithm and interpretation of the storage candidacy and version control values. In turn, these procedures cooperate to assure a competent supply of objects at RS 400 so as to reduce the need for intervention of delivery system 20, thus reducing cost of information supply and transactional support so as to speed the response to user requests.

TBOL interpreter 438 shown in FIG. 8 provides the means for executing program objects, which have been written using an interpretive language, TBOL described above. TBOL interpreter 438 interprets operators and operand contained in program object 508, manages TBOL variables and data, maintains buffer and stack facilities, and provides a runtime library of TBOL verbs.

TBOL verbs provide support for data processing, program flow control, file management, object management, communications, text display, command bar control, open/close window, page navigation and sound. TBOL interpreter also interacts with other native modules through commands contained in TBOL verbs. For example: the verb "navigate" will cause TBOL interpreter 438 to request object interpreter 435 to build a PPT based on the PTO id contained in the operand of the NAVIGATE verb; "fetch" or "GET" will cause TBOL interpreter 438 to request an object from object storage facility 439; "SET_FUNCTION" will assign a filter to events occurring at the keyboard manger 434; and "FORMAT," "SEND," and "RECEIVE" will cause TBOL interpreter 438 to send application level requests to object/communications manager interface 433.

Data areas managed by TBOL interpreter 438 and available to TBOL programs are Global External Variables (GEVs), Partition External Variables (PEVs), and Runtime Data Arrays (RDAs).

GEVs contain global and system data, and are accessible to all program objects as they are executed. GEVs provide a means by which program objects may communicate with other program objects or with the RS native code, if declared in the program object. GEVs are character string variables that take the size of the variables they contain GEVs may preferably contain a maximum of 32,000 variables and are typically used to store such information as program return code, system date and time, or user sex or age. TBOL interpreter 438 stores such information in GEVs when requested by the program which initiated a transaction to obtain these records from the RS or user's profile stored in the interactive system.

Partition external variables (PEVs) have a scope restricted to the page partition on which they are defined. PEVs are used to hold screen field data such that when PEOs and window objects are defined, the fields in the page partitions with which these objects are to be associated are each assigned to a PEV. When applications are executed, TBOL interpreter 438 transfers data between screen fields and their associated PEV. When the contents of a PEV are modified by user action or by program direction, TBOL interpreter 428 makes a request to display manager 461 to update the screen field to reflect the change. PEVs are also used to hold partition specific application data, such as tables of information needed by a program to process an expected screen input.

Because the scope of PEVs is restricted to program objects associated with the page partition in which they are defined, data that is to be shared between page partitions or is to be available to a page-level processor must be placed in GEVs or RDAs.

RDAs are internal stack and save buffers used as general program work areas. RDAs are dynamically defined at program object "runtime" and are used for communication and transfer of data between programs when the data to be passed is not amenable to the other techniques available. Both GEVs and RDAs include, in the preferred embodiment, 8 integer registers and 8 decimal registers. Preferably, there are also 9 parameter registers limited in scope to the current procedure of a program object.

All variables may be specified as operand of verbs used by the virtual machine. The integer and decimal registers may be specified as operand for traditional data processing. The parameter registers are used for passing parameters to "called" procedures. The contents of these registers are saved on an internal program stack when a procedure is called, and are restored when control returns to the "calling" procedure from the "called" procedure.

TBOL interpreter 438, keyboard manger 434, object interpreter 435, and object storage facility 439, together with device control provided by operating environment 450, have principal responsibility for the management and execution of partitioned applications at the RS 400. The remaining native code modules function in support and ancillary roles to provide RS 400 with the ability display partitioned applications to the user (display manager 461), display advertising (ad manager 442), to collect usage data for distribution to interactive network 10 for purposes of targeting such advertising (data collection manager 441), and prepare for sending, and send, objects and messages to interactive network 10 (object/communications manager interface 443 and link communications manager 444) Finally the fatal error manager exists for one purpose: to inform the user of RS 400 and transmit to interactive network 10 the inability of RS 400 to recover from a system error.

Display manager 461 interfaces with a decoder using the North American Presentation Level Protocol Syntax (NAPLPS), a standard for encoding graphics data, or text code, such as ASCII, which are displayed on monitor 412 of the user's personal computer 405 as pictorial codes. Codes for other presentation media, such as audio, can be specified by using the appropriate type code in the presentation data segments. Display manager 461 supports the following functions: send NAPLPS strings to the decoder; echo text from a PEV; move the cursor within and between fields; destructive or non-destructive input field character deletion; "ghost" and "unghost" fields (a ghosted field is considered unavailable, unghosted available); turn off or on the current field cursor; open, close, save and restore bit maps for a graphics window; update all current screen fields by displaying the contents of their PEVs, reset the NAPLPS decoder to a known state; and erase an area of the screen by generating and sending NAPLPS to draw a rectangle over that area. Display manager 461 also provides a function to generate a beep through an interface with a machine-dependent sound driver.

Ad manager 442 is invoked by object interpreter 435 to return the object id of the next available advertising to be displayed. Ad manager 442 maintains a queue of advertising object id's targeted to the specific user currently accessing interactive network 10. Advertising objects are pre-fetched from interactive system 10 from a personalized queue of advertising that is constructed using data previously collected from user generated events and/or reports of objects used in the building of pages or windows, compiled by data collection manager 466 and transmitted to interactive system 10.

Advertising objects 510 are PEOs that, through user invocation of a "LOOK" command, cause navigation to partitioned applications that may themselves support, for example, ordering and purchasing of merchandise.

An advertising list, or "ad queue," is requested in a transaction message to delivery system 20 by ad manager 442 immediately after the initial logon response. The logon application at RS 400 places the advertising list in a specific RS global storage area called a SYS_GEV (system global external variable), which is accessible to all applications as well as to the native RS code). The Logon application also obtains the first two ad object id's form the queue and provides them to object storage facility 439 so the advertising objects can be requested. However, at logon, since no advertising objects are available at RS local storage facilities 440, ad objects, in accordance with the described storage candidacy, not being retained at the reception system between sessions, they must be requested from interactive network 10.

In a preferred embodiment, the following parametric values are established for ad manager 442: advertising queue capacity, replenishment threshold for advertising object id's and replenishment threshold for number of outstanding pre-fetched advertising objects. These parameters are set up in GEVs of the RS virtual machine by the logon application program object from the logon response from high function system 110. The parameters are then also accessible to the ad manager 442. Preferred values are an advertising queue capacity of 15, replenishment value of 10 empty queue positions and a pre-fetched advertising threshold of 3.

Ad manager 442 pre-fetches advertising object by passing advertising object id's from the advertising queue to object storage facility 439 which then retrieves the object from the interactive system if the object is not available locally. Advertising objects are pre-fetched, so they are available in RS local store 440 when requested by object interpreter 435 as it builds a page. The ad manager 442 pre-fetches additional advertising objects whenever the number of pre-fetched advertising objects not called by object interpreter 435; i.e. the number of remaining advertising objects, falls below the pre-fetch advertising threshold.

Whenever the advertising i.d. queue has more empty positions than replenishment threshold value, a call is made to the advertising queue application in high function system 110 shown in FIG. 2, via object/communications manager interface 443 for a number of advertising object id's equal to the threshold value. The response message from system 110 includes a list of advertising object id's, which ad manager 442 enqueues.

Object interpreter 435 requests the object id of the next advertising from ad manager 442 when object interpreter 435 is building a page and encounters an object call for a partition and the specified object-id equals the code word, "ADSLOT." If this is the first request for an advertising object id that ad manager 442 has received during this user's session, ad manager 442 moves the advertising list from the GEV into its own storage area, which it uses as an advertising queue and sets up its queue management pointers, knowing that the first two advertising objects have been pre-fetched.

Ad manager 442 then queries object storage facility 439, irrespective of whether it was the first request of the session. The query asks if the specified advertising object id pre-fetch has been completed, i.e., is the object available locally at the RS. If the object is available locally, the object-id is passed to object interpreter 435, which requests it from object storage facility 439. If the advertising object is not available in local store 440, ad manager 442 attempts to recover by asking about the next ad that was pre-fetched. This is accomplished by swapping the top and second entry in the advertising queue and making a query to object storage facility 439 about the new top advertising object id. If that object is not yet available, the top position is swapped with the third position and a query is made about the new top position.

Besides its ability to provide advertising that have been targeted to each individual user, two very important response time problems have been solved by ad manager 442 of the present invention. The first is to eliminate from the new page response time the time it takes to retrieve an advertising object from the host system. This is accomplished by using the aforementioned pre-fetching mechanism.

The second problem is caused by pre-fetching, which results in asynchronous concurrent activities involving the retrieval of objects from interactive system 10. If an advertising is pre-fetched at the same time as other objects required for a page requested, the transmission of the advertising object packets could delay the transmission of the other objects required to complete the current page by the amount of time required to transmit the advertising object(s). This problem is solved by the structuring the requests from object interpreter 435 to the ad manager 442 in the following way:

1. Return next object id of pre-fetched advertising object & pre-fetch another;
2. Return next advertising object id only; and
3. Pre-fetch next advertising object only.

By separating the function request (1) into its two components, (2) and (3), object interpreter 435 is now able to determine when to request advertising object id's and from its knowledge of the page build process, is able to best determine when another advertising object can be pre-fetched, thus causing the least impact on the page response time. For example, by examining the PPT, object interpreter 435 may determine whether any object requests are outstanding. If there are outstanding requests, advertising request type 2 would be used. When all requested objects are retrieved, object interpreter 435 then issues an advertising request type 3. Alternatively, if there are no outstanding requests, object interpreter 435 issues an advertising request type 1. This typically corresponds to the user's "think time" while examining the information presented and when RS 400 is in the Wait for Event state (D).

Data collection manager 441 is invoked by object interpreter 435 and keyboard manger 434 to keep records about what objects a user has obtained (and, if a presentation data segment 530 is present, seen) and what actions users have taken (e.g. "NEXT," "BACK," "LOOK," etc.)

The data collection events that are to be reported during the user's session are sensitized during the logon process. The logon response message carries a data collection indicator with bit flags set to "on" for the events to be reported. These bit flags enabled (on) or disabled (off) for each user based on information contained in the user's profile stored and sent from high function host 110. A user's data collection indicator is valid for the duration of his session. The type of events to be reported can be changed at will in the host data collection application. However, such changes will affect only users who logon after the change.

Data collection manager 441 gathers information concerning a user's individual system usage characteristics. The types of informational services accessed, transactions processed, time information between various events, and the like are collected by data collection manager 441, which compiles the information into message packets (not shown). The message packets are sent to network 10 via object/communication manager interface 443 and link communications manager 444. Message packets are then stored by high function host 110 and sent to an offline processing facility for processing. The characteristics of users are ultimately used as a means to select or target various display objects, such as advertising objects, to be sent to particular users based on consumer marketing strategies, or the like, and for system optimization.

Object/communications manager interface 443 is responsible for sending and receiving DIA (Data Interchange Architecture described above) formatted messages to or from interactive network 10. Object/communications manager 443 also handles the receipt of objects, builds a DIA header for messages being sent and removes the header from received DIA messages or objects, correlates requests and responses, and guarantees proper block sequencing. Object/communications manager interface 443 interacts with other native code modules as follows: object/communications manager 443 (1) receives all RS 400 object requests from object storage facility 439, and forwards objects received from network 10 via link communications manager 444 directly to the requesting modules; (2) receives ad list requests from ad manager 442, which thereafter periodically calls object/communications manager 443 to receive ad list responses; (3) receives data collection messages and send requests from data collection manager 441; (4) receives application-level requests from TBOL interpreter 438, which also periodically calls object/communications manager interface 443 to receive responses (if required); and (5) receives and sends DIA formatted objects and messages from and to link communications manager 444.

Object/communications manager interface 443 sends and receives DIA formatted messages on behalf of TBOL interpreter 438 and sends object requests and receives objects on behalf of object storage facility 439. Communication packets received containing parts of requested objects are passed to object storage facility 439 which assembles the packets into the object before storing it. If the object was requested by object interpreter 435, all packets received by object storage facility 439 are also passed to object interpreter 435 avoiding the delay required to receive an entire object before processing the object. Objects which are pre-fetched are stored by object storage facility 439.

Messages sent to interactive network 10 are directed via DIA to applications in network 10. Messages may include transaction requests for records or additional processing of records or may include records from a partitioned application program object or data collection manager 441. Messages to be received from network 10 usually comprise records requested in a previous message sent to network 10. Requests received from object storage facility 439 include requests for objects from storage in interactive system 10. Responses to object requests contain either the requested object or an error code indicating an error condition.

Object/communications manager 443 is normally the exclusive native code module to interface with link communications manager 444 (except in the rare instance of a fatal error). Link communications manager 444 controls the connecting and disconnecting of the telephone line, telephone dialing, and communications link data protocol. Link communications manager 444 accesses network 10 by means of a communications medium (not shown) link communications manager 444, which is responsible for a dial-up link on the public switched telephone network (PSTN). Alternatively, other communications means, such as cable television or broadcast media, may be used. Link communications manager 444 interfaces with TBOL interpreter for connect and disconnect, and with interactive network 10 for send and receive.

Link communications manager 444 is subdivided into modem control and protocol handler units. Modem control (a software function well known to the art) hands the modem specific handshaking that occurs during connect and disconnect. Protocol handler is responsible fox transmission and receipt of data packets using the TCS (TRINTEX Communications Subsystem) protocol (which is a variety of OSI link level protocol, also well known to the art).

Fatal error manager 469 is invoked by all reception system components upon the occurrence of any condition which precludes recovery. Fatal error manager 469 displays a screen to the user with a textual message and an error code through display manager 461. Fatal error manager 469 sends an error report message through the link communications manager 444 to a subsystem of interactive network 10.

The source code for the reception system software as noted above is described in parent application Ser. No. 388,156 filed Jul. 28, 1989, now issued as U.S. Pat. No. 5,347,632.

SAMPLE APPLICATION

Page 255 illustrated in FIG. 3b corresponds to a partitioned application that permit's a user to purchase apples. It shows how the monitor screen 414 of the reception system 400 might appear to the user. Displayed page 255 includes a number of page partitions and corresponding page elements.

Figure 9:
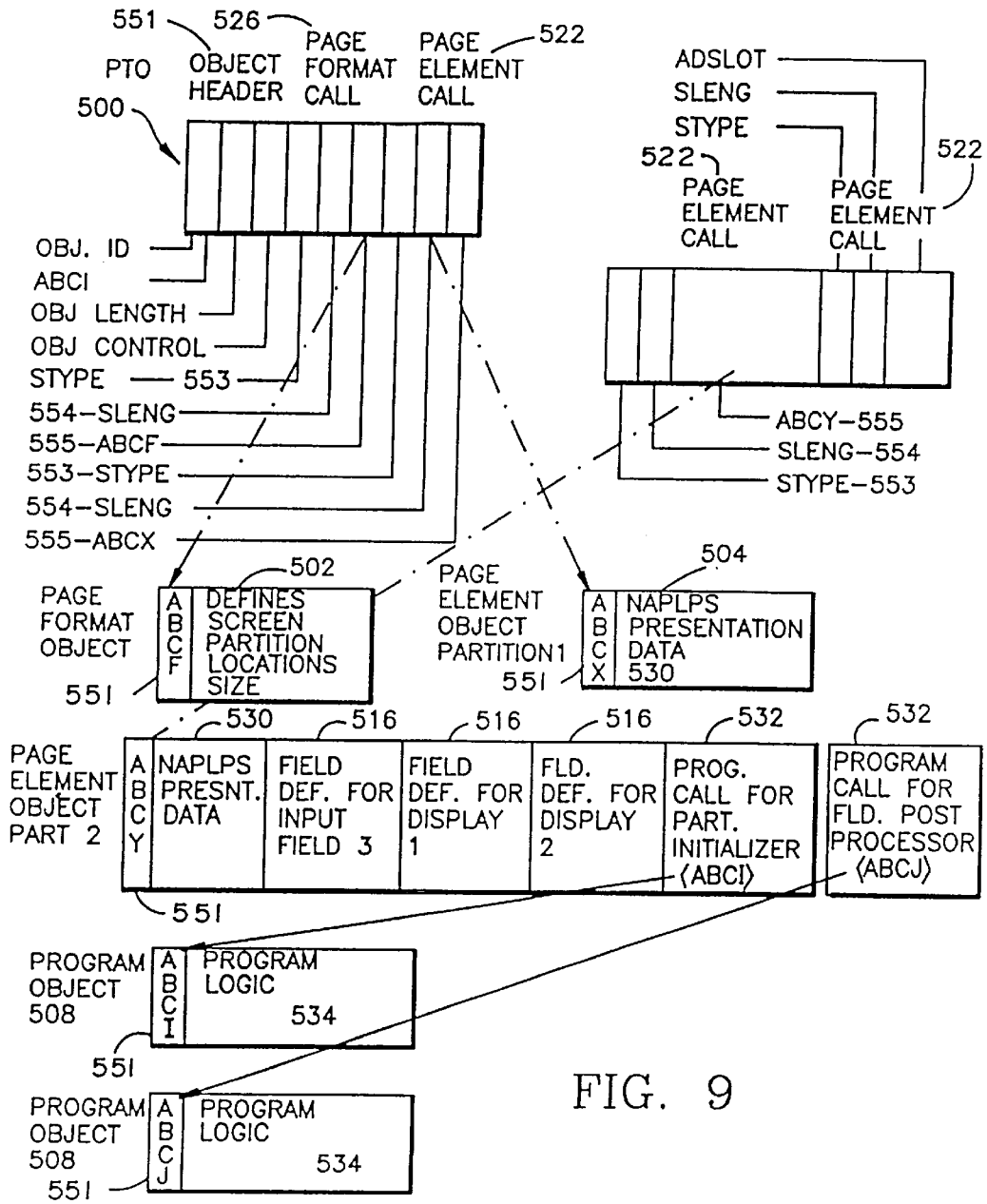
FIG. 9 is a schematic diagram that illustrates an example of a partitioned application to be processed by the reception system in accordance with the invention.

The page template object (PTO) 500 representing page 255 is illustrated in FIG. 9. PTO 500 defines the composition of the page, including header 250, body 260, display fields 270, 271, 272, advertising 280, and command bar 290. Page element objects (PEOs) 504 are associated with page partitions numbered; e.g., 250, 260, 280. They respectively, present information in the header 250, identifying the page topic as ABC APPLES; in the body 260, identifying the cost of apples; and prompt the user to input into fields within body 260 the desired number of apples to be ordered. In advertising 280, presentation data and a field representing a post-processor that will cause the user to navigate to a targetable advertising, is presented.

In FIG. 9, the structure of PTO 500 can be traced. PTO 500 contains a page format call segment 526, which calls page format object (PFO) 502. PFO 502 describes the location and size of partitions on the page and numbers assigned to each partition. The partition number is used in page element call segments 522 so that an association is established between a called page element object (PEO) 504 and the page partition where it is to be displayed. Programs attached to this PEO can be executed only when the cursor is in the page partition designated within the PEO.

PTO 500 contains two page element call segments 522, which reference the PEOs 504 for partitions 250 and 260. Each PEO 504 defines the contents of the partition. The header in partition 250 has only a presentation data segment 530 in its PEO 504. No input, action, or display fields are associated with that partition.

The PEO 504 for partition 260 contains a presentation data segment 530 and field definition segments 516 for the three fields that are defined in that partition. Two of the fields will be used for display only. One field will be used for input of user supplied data.

In the example application, the PEO 504 for body partition 260 specifies that two program objects 508 are part of the body partition. The first program, shown in Display field 270, 271, 272, is called initializer and is invoked unconditionally by TBOL interpreter 438 concurrently with the display of presentation data for the partition. In this application, the function of the initializer is represented by the following pseudo-code:

1. Move default values to input and display fields;
2. "SEND" a transaction to the apple application that resident on interactive system 10;
3. "RECEIVE" the result from interactive system 10; i.e. the current price of an apple;
4. Move the price of an apple to PEV 271 so that it will be displayed;
5. Position the cursor on the input field; and
6. Terminate execution of this logic.

The second program object 508 is a field post-processor. It will be invoked conditionally, depending upon the user keystroke input. In this example, it will be invoked if the user changes the input field contents by entering a number. The pseudo code for this post-processor is as follows:

1. Use the value in PEV 270 (the value associated with the data entered by the user into the second input data field 270) to be the number of apples ordered.
2. Multiply the number of apples ordered times the cost per apple previously obtained by the initializer;
3. Construct a string that contains the message "THE COST OF THE APPLES YOU ORDERED IS $45.34;";
4. Move the string into PEV 272 so that the result will be displayed for the user; and
5. Terminate execution of this logic.

The process by which the "APPLES" application is displayed, initialized, and run is as follows.

The "APPLES" application is initiated when the user navigates from the previous partitioned application, with the navigation target being the object id of the "APPLES" PTO 500 (that is, object id ABC1). This event causes keyboard manager 434 to pass the PTO object id, ABC1, (which may, for example, have been called by the keyword navigation segment 520 within a PEO 504 of the previous partitioned application), to object interpreter 435. With reference to the RS application protocol depicted in FIG. 6, when the partitioned application is initiated, RS 400 enters the Process Object state (B) using transition (1). Object interpreter 435 then sends a synchronous request for the PTO 500 specified in the navigation event to object storage facility 439. Object storage facility 439 attempts to acquire the requested object from local store 440 or from delivery system 20 by means of object/communication manager 443, and returns an error code if the object cannot be acquired.

Figure 4D:
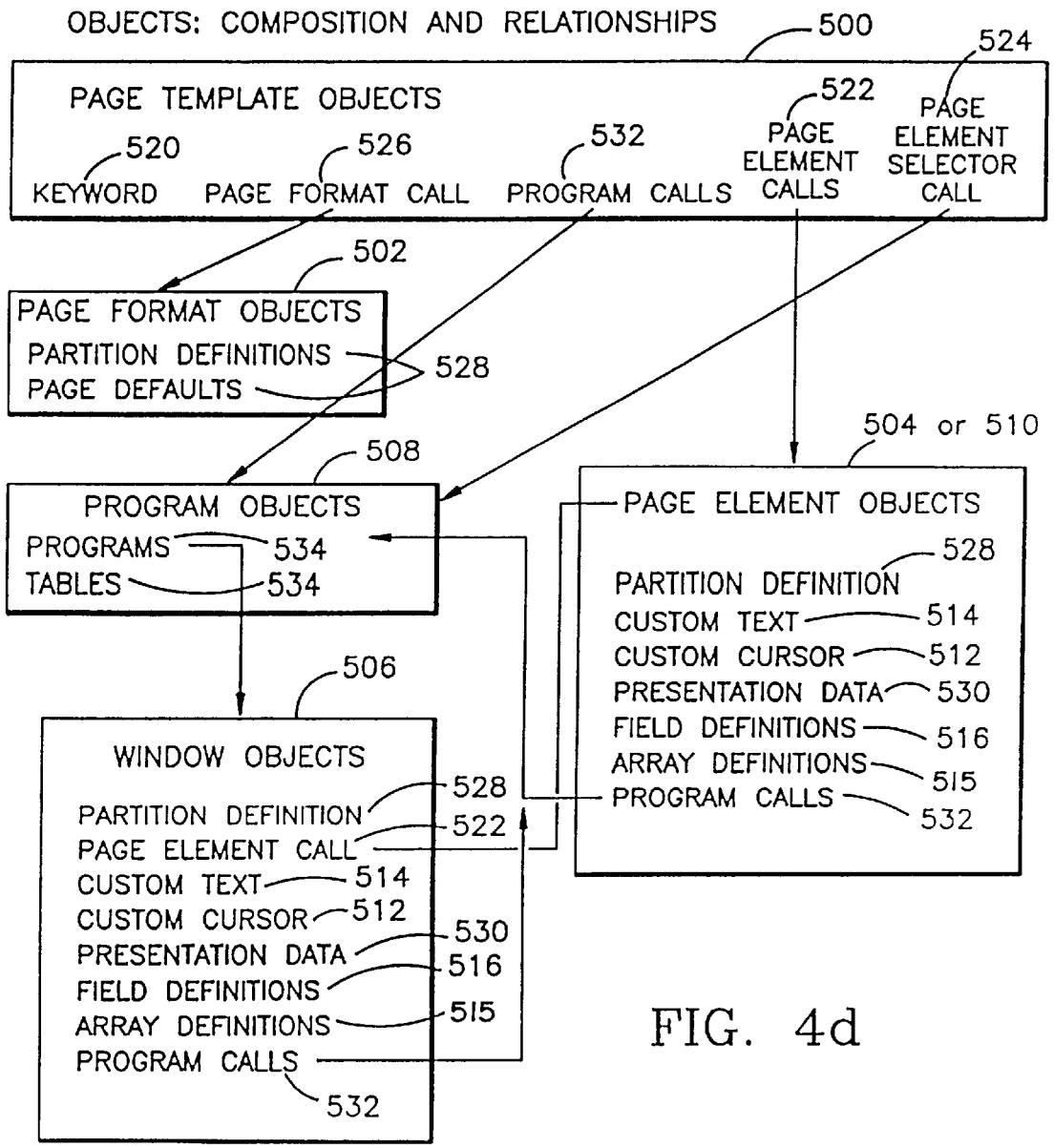
Figure 5A:
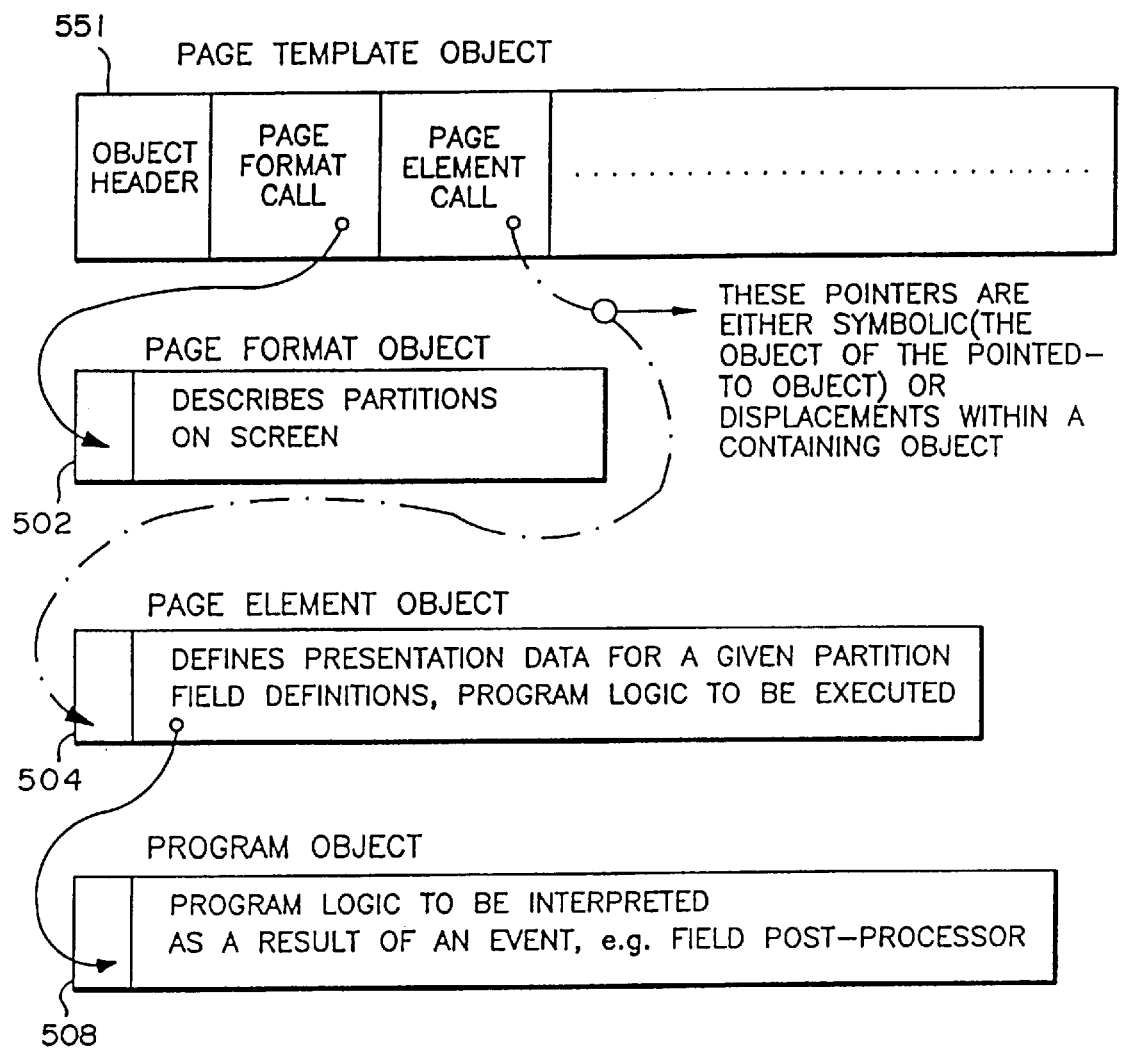
FIG. 5a is a schematic diagram that illustrates the configuration of the page template object in accordance with the invention.
Figure 5B:
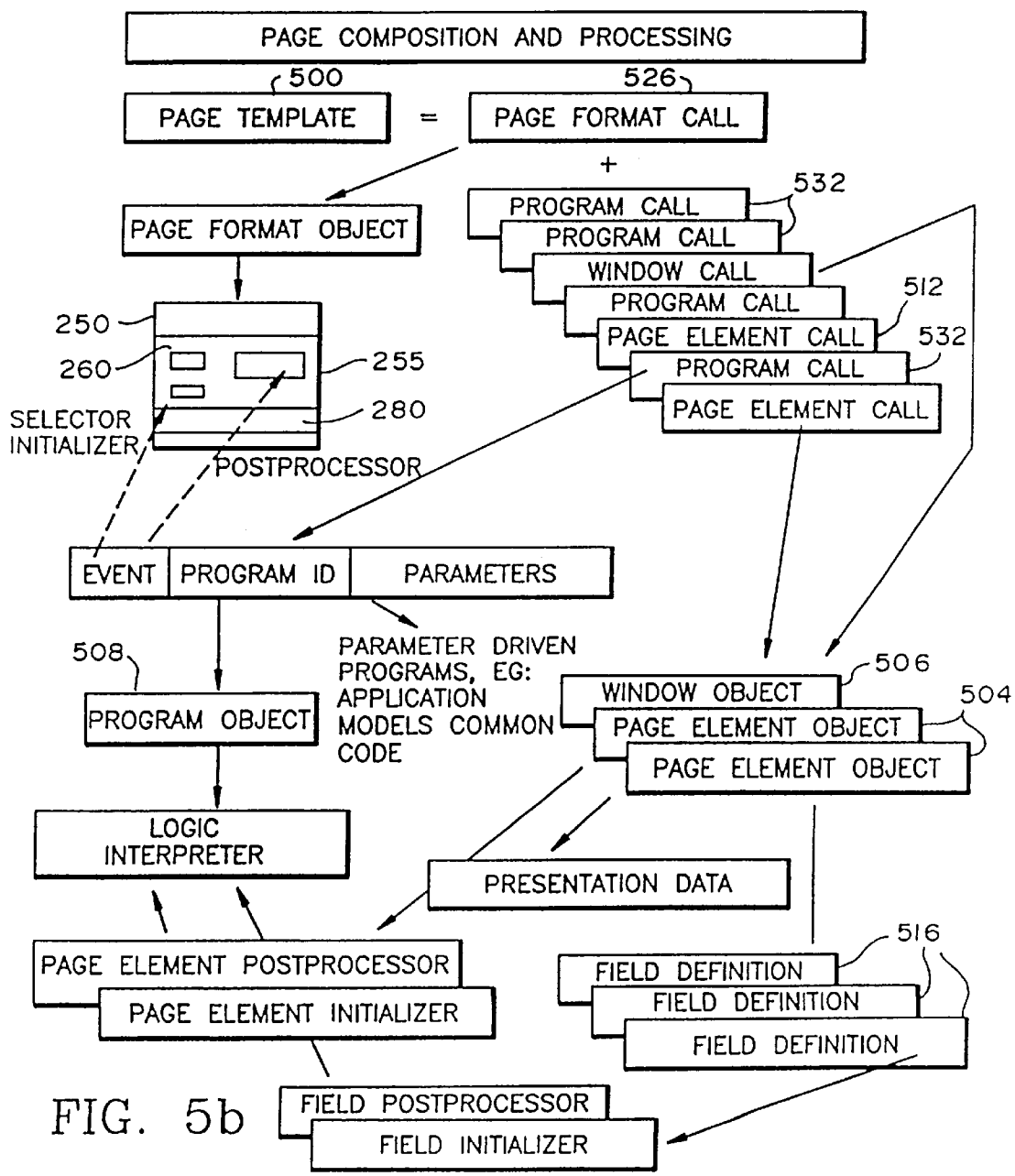
FIG. 5b is a schematic diagram that illustrates page composition in accordance with the invention.

Once the PTO 500 is acquired by object/communications manager 443, object interpreter 435 begins to build PPT by parsing PTO 500 into its constituent segment calls to pages and page elements, as shown in FIG. 4d and interpreting such segments. PFO and PEO call segments 526 and 522 require the acquisition of the corresponding objects with object id's <ABCF>, <ABCX> and <ABCY>. Parsing and interpretation of object ABCY requires the further acquisition of program objects <ABCI> and <ABCJ>.

During the interpretation of the PEOs 504 for partitions 250 and 260, other RS 400 events are triggered. This corresponds to transition (2) to interpret pre-processors state (C) in FIG. 6. Presentation data 530 is sent to display manager 461 for display using a NAPLPS decoder within display manager 461, and, as the PEO <ABCY> for partition 260 is parsed and interpreted by object interpreter 435, parameters in program call segment 532 identify the program object <ABCI> as an initializer. Object interpreter 435 obtains the program object from object storage facility 439, and makes a request to TBOL interpreter 438 to execute the initializer program object 508 <ABCI>. The initializer performs the operations specified above using facilities of the RS virtual machine. TBOL interpreter 438, using operating environment 450, executes initializer program object 506 <ABCI>, and may, if a further program object 508 is required in the execution of the initializer, make a synchronous application level object request to object storage facility 439. When the initializer terminates, control is returned to object interpreter 435, shown as the return path in transition (2) in FIG. 6.

Having returned to the process object state (B), object processor 435 continues processing the objects associated with PTO <ABC1>. Object interpreter continues to construct the PPT, providing RS 400 with an environment for subsequent processing of the PTO <ABC1> by pre-processors and post-processors at the page, partition, and field levels. When the PPT has been constructed and the initializer executed, control is returned to keyboard manager 434, and the RS enters the wait for event (E) State, via transition (4), as shown in FIG. 6.

In the wait for event state, the partitioned application waits for the user to create an event. In any partitioned application, the user has many options. For example, the user may move the cursor to the "JUMP" field 296 on the command bar 290, which is outside the current application, and thus cause subsequent navigation to another application. For purposes of this example, it is assumed that the user enters the number of apples he wishes to order by entering a digit in display field 271.

Keyboard manager 434 translates the input from the user's keyboard to a logical representation independent of any type of personal computer. Keyboard manager 434 saves the data entered by the user in a buffer associated with the current field defined by the location of the cursor. The buffer is indexed by its PEV number, which is the same as the field number assigned to it during the formation of the page element. Keyboard manager 434 determines for each keystroke whether the keystroke corresponds to an input event or to an action or completion event. Input events are logical keystrokes and are sent by keyboard manager to display manager 461, which displays the data at the input field location. Display manager 461 also has access to the field buffer as indexed by its PEV number.

The input data are available to TBOL interpreter 438 for subsequent processing. When the cursor is in a partition, only the PEVs for that partition are accessible to the RS virtual machine. After the input from the user is complete (as indicated by a user action such as pressing the RETURN key or entry of data into a field with an action attribute), RS 400 enters the Process Event state (E) via transition (4).

For purposes of this example, let us assume that the user enters the digit "5" in input field 270. A transition is made to the process event state (E). Keyboard manager 434 and display manager 437 perform a number of actions, such as the display of the keystroke on the screen, the collection of the keystroke for input, and optionally, the validation of the keystroke, i.e. numeric input only in numeric fields. When the keystroke is processed, a return is made to the wait for event state (D). Edit attributes are specified in the field definition segment.

Suppose the user inputs a "6" next. A transition occurs to the PE state and after the "6" is processed, the Wait for Event (D) state is reentered. If the user hits the "completion" key (e.g., ENTER) the Process Event (E) state will be entered. The action attributes associated with field 272 identify this as a system event to trigger post-processor program object <ABCJ>. When the interpretive execution of program object <ABCJ> is complete, the wait for event state (D) will again be entered. The user is then free to enter another value in the input field, or select a command bar function and exit the apples application.

While this invention has been described in its preferred form, it will be appreciated that changes may be made in the form, construction, procedure and arrangement of its various elements and steps without departing from its spirit or scope.

What we claim is:

1. A system for automatically updating a program stored in a remote computer, the system comprising:

a remote computer including a remote memory for storing a program and a remote revision status, the remote program revision status indicating the revision level of the program stored in the remote memory;

a main computer including a main memory for storing the latest revisions of the program and a main program revision status, the main program revision status indicating the revision level of the program stored in the main memory;

means for transmitting the remote program revision status from the remote computer to the main computer;

means for comparing the remote program revision status to the main program revision status;

means for determining which portions of the program stored in a main memory are different from the program stored in the remote memory;

means for transmitting updated portions of the program stored in the main computer to the remote computer;

means for replacing portions of the program stored in the remote computer with updated portions of the program received from the main computer; and means for transmitting the new program revision status from the main computer to the remote computer.

2. The system of claim 1, further comprising means for storing and maintaining variable data and constant data related to a plurality of products in the memory of the main computer, means for storing constant data related to a plurality of products in the memory of the remote computer, means for selecting a product from the remote computer memory for which product information is desired, means for comparing constant data in the memory of the remote computer with constant data in the memory of the main computer, means for determining updated portions of the constant data stored in the main computer that are different than the constant data stored in the remote computer, means for transmitting the updated portions of the constant data stored in the main computer from the main computer to the remote computer, and means for replacing portions of the constant data stored on the remote computer with the updated portions of constant data received from the main computer.

3. The system of claim 2, further comprising means for integrating constant data stored in the memory of the remote computer associated with the selected product with the variable data received from the main computer to provide information related to the selected product including both constant and variable data.

4. The system of claim 2, further comprising means for storing and maintaining a main constant data revision status in the memory of the main computer, the main constant data revision status indicating the revision level of the constant data stored in the main computer, means for storing a remote constant data revision status in the memory of the remote computer, and the remote constant data revision status indicating the revision level of the constant data stored in the remote computer.

5. The system of claim 4, wherein the means for comparing constant data in the memory of the remote computer with constant data in the memory of the main computer compares the remote constant data revision status with the main constant data revision status maintained in the main computer.

6. The system of claim 5, wherein the means for transmitting updated portions of the constant data stored in the main memory from the main computer to the remote computer also transmits an updated remote revision status identical to the main revision status from the main computer to the remote computer.

* * * * *